United States Patent

Inagaki et al.

Patent Number: 6,084,634
Date of Patent: Jul. 4, 2000

[54] ELECTRONIC IMAGING APPARATUS OPERABLE IN TWO MODES, WITH A DIFFERENT OPTICAL BLACK CORRECTION PROCEDURE BEING EFFECTED IN EACH MODE

[75] Inventors: Osamu Inagaki; Toshiyuki Terada; Daikichi Morohashi; Jun Inoue, all of Tokyo, Japan

[73] Assignee: Olympus Optical Co., Ltd., Tokyo, Japan

[21] Appl. No.: 08/746,366

[22] Filed: Nov. 8, 1996

[30] Foreign Application Priority Data

Nov. 10, 1995 [JP] Japan .................................. 7-317540

[51] Int. Cl.[7] .................................................. H04N 3/14
[52] U.S. Cl. ............................................ 348/294; 348/243
[58] Field of Search .................................. 348/294, 311, 348/315, 243, 245, 220, 222, 250, 441, 445

[56] References Cited

U.S. PATENT DOCUMENTS

| | | | |
|---|---|---|---|
| 4,910,599 | 3/1990 | Hashimoto | 348/240 |
| 4,928,137 | 5/1990 | Kinoshita | 348/297 |
| 4,994,917 | 2/1991 | Takayama | 348/243 |
| 5,264,939 | 11/1993 | Chang | 348/322 |
| 5,283,655 | 2/1994 | Usami | 348/257 |
| 5,450,129 | 9/1995 | Matoba et al. | 348/294 |
| 5,486,859 | 1/1996 | Matsuda | 348/311 |
| 5,489,945 | 2/1996 | Kannegundla et al. | 348/222 |
| 5,512,947 | 4/1996 | Sawachi et al. | 348/243 |
| 5,608,455 | 3/1997 | Oda | 348/243 |
| 5,612,739 | 3/1997 | Maki et al. | 348/243 |

*Primary Examiner*—Tuan Ho
*Assistant Examiner*—Aung S. Moe
*Attorney, Agent, or Firm*—Pillsbury Madison & Sutro LLP

[57] ABSTRACT

An electronic imaging apparatus composed of a solid-state sensor element for converting an image focused by an optical system into image data. The apparatus is selectively operable in a first drive mode for reading at least a large number of pixels of image data out of the solid-state sensor element, and in a second drive mode for reading a second number of selected pixels of image data out of the solid-state sensor element, the second number being smaller than the large number and the selected pixels being suited for foreground scene recognition. The apparatus further includes an optical black level correction process changing system for changing a process of detecting an optical black level corresponding to an optical black part of the sensor element and correcting image data according to the detected level, the process being changed according to whether the first drive mode or the second mode is selected to effect a first correction in the first drive mode and a second correction in the second drive mode, the first correction being achieved on the basis of a presently detected optical black level, and the second correction being achieved by a feedback control based on a difference between a previously detected optical black level and a desired optical black level.

2 Claims, 53 Drawing Sheets

OB AREA

EFFECTIVE PIXEL REGION

STILL IMAGE MODE PHOTOGRAPHY AREA

VIEW-FINDER MODE PHOTOGRAPHY AREA

FRAME MEMORY AREA (STILL IMAGE TAKE IN AREA)

FPN DATA TAKE IN AREA IN VIEW-FINDER MODE

VIEW-FINDER IMAGE TAKE IN AREA IN VIEW-FINDER MODE

STILL IMAGE MODE PHOTOGRAPHY AREA

VIEW-FINDER MODE PHOTOGRAPHY AREA

FPN DATA PHOTOGRAPHY AREA

FRAME MEMORY AREA (STILL IMAGE TAKE IN AREA)

FPN DATA TAKE IN AREA IN VIEW-FINDER MODE

VIEW-FINDER IMAGE TAKE IN AREA IN VIEW-FINDER MODE

ELECTRONIC IMAGING APPARATUS OPERABLE IN TWO MODES, WITH A DIFFERENT OPTICAL BLACK CORRECTION PROCEDURE BEING EFFECTED IN EACH MODE

BACKGROUND OF THE INVENTION

This invention relates to electronic imaging apparatuss such as studio digital cameras, electronic image receivers, etc. which generate highly fine image data of foreground scene images.

Electronic imaging apparatuss find applications to studio digital cameras for generating highly fine image data of foreground scene images, image input systems for receiving image data of foreground scene images to generate image data supplied to printers to produce prints of highly fine images, and so forth. Such electronic imaging apparatuss are required to generate a multiple pixel output with a resolution, i.e., fineness, that is higher than in a monitor for monitoring the scene being picked up. In this type of image sensors, the resolution of the monitor is approximately 72 DPI, while the resolution of image data supplied to the printer is approximately 300 DPI. The image sensors use sensor elements with an extremely large number of image elements or pixels.

FIG. 55 is a block diagram showing the construction of a studio digital camera as an example of the pertinent prior art image sensor.

Referring to the figure, a light image of a scene which has been transferred through an optical system 1, is passed through a shutter 2 and incident on a dichroic prism 3. The dichroic prism 3 disassembles the incident light image into original R (red), G (green) and B (blue) colors and focuses these color images on photoelectric surfaces provided on block end surfaces of solid-state sensor elements 4-R, 4-G and 4-B, which provide photoelectric conversion outputs of the respective colors. These photoelectric conversion outputs are supplied to R, G and B analog data processors 5-R, 5-G and 5-B for such processes as OB (optical black) level clamping, and then supplied to A/D converters 6-R, 6-G and 6-B provided in respective color processing circuits for conversion to digital data.

These color digital data are supplied to R, G and B digital data processors 7-R, 7-G and 7-B for such processes as noise cancellation, shading correction, etc., and then stored in frame memories 8-R, 8-G and 8-B in the color processing circuits. The data thus stored are supplied through a LUT (look-up table) 9 to an SCSI driver 10. The LUT 9 varies the input image tones through the gradation conversion according to tables which have initially been set. The studio digital camera 100 and a host PC (personal computer) 200 are connected to each other by an SCSI bus 300, and the image data supplied to the SCSI driver 10 is transferred via the SCSI bus 300 to the host PC 200. The host PC 200 displays images of image data transferred from the studio digital camera 100 on a monitor 400 connected thereto.

The R, G and B analog data processors 5-R, 5-G and 5-B, the A/D converters 6-R, 6-G and 6-B, the R, G and B digital data processors 7-R, 7-G and 7-B, and the frame memories 8-R, 8-G and 8-B noted above, in the studio digital camera 100, are all controlled by a system controller 11.

FIG. 56 is a timing chart illustrating the operation of the system shown in FIG. 55. In accordance with shutter trigger operations in the camera operation, photoelectric conversion outputs (shown as "SENSOR OUTPUT" in the Figure) are sequentially read out from the solid-stage image sensor elements 4-R, 4-G and 4-B, then supplied to the A/D converters 6-R, 6-G and 6-B for conversion into digital signals, then supplied to the R, G and B digital data processors 7-R, 7-G and 7-B for such processes as noise cancellation, shading correction, etc., and then written in the frame memories 8-R, 8G and 8-B. The image data thus written in the frame memories 8-R, 8-G and 8-B, are read out at predetermined timings and supplied through the LUT 9, the SCSI driver 10 and the host PC 200 in the mentioned order to the monitor 400 for display thereon.

In FIG. 56, the timings of writing and reading data in and out of the frame memories 8-R, 8-G and 8-B are shown. As shown, time t1 is taken from the start of sequential reading of the R, G and B frame memory data to the display thereof as a whole. In order to obtain continuous image display on a monitor (such as an electronic view-finder) for picture angle setting or focus adjustment in the photography (or image storing), it is conceivable to curtail time until it is ready to display one monochroic image frame. FIG. 57 is a timing chart illustrating a monochroic image display operation taking a reduced time until it is ready to display one image frame. In the example shown in FIG. 57, only the G data frame memory data is displayed as the monochroic image display. As shown, the time until it is ready to display one image frame is reduced from t1, in the case of the color image display as shown in FIG. 56, to t2. This time t2, however, can not be shorter than the sum of the time taken for writing data in the frame memory and the subsequent time taken for reading out the data, and the frame renewal cycle period may not be sufficiently short.

The solid-state sensor element used for the prior art image sensor system shown in FIG. 55 has about 2,000 by 2,000 pixels to provide the required fineness. In this case, at a usual read rate of about 14 MHz it takes about 0.3 second to read one frame. This means that only about three frames can be read out in one second. In such a case, the image display is inevitably intermittent, thus making it difficult to carry out the picture angle setting or focus adjustment in the photography (or image storing).

As described above, in the prior art image sensor the R, G and B image data stored in the frame memories are sequentially transferred to the host PC through the SCSI bus connected thereto. Therefore, a very long time is necessary from the storing of the images till the display thereof after the transfer as described before in connection with FIG. 56. In the case of adopting the monochroic image display for the picture angle setting or focus adjustment as described before in connection with FIG. 57, despite a desire to obtain nearly continuous image display by increasing the display image number per unit time, a limitation is imposed on the display image number by the sequential transfer of the image data after the storing thereof in the frame memories.

In a further aspect, although the read rate of the solid-state sensor elements is fixed, the data transfer rate of the SCSI bus is not fixed but dependent on the processing capacity of the host PC side. This results in asynchronous coupling between the image sensor side and the host PC side concerning the image data transfer. Therefore, a transfer request may appear before the end of data writing, and also a write request may appear before the end of data transfer. Usually, data cannot be simultaneously written in and read out (or transferred) from the memories, and either operation is caused preferentially. This means that a request for either operation may appear before the end of the other operation. For example, a read request may be generated while an image frame is written. Such a read request results in the coexistence of images with different time axes in one frame.

This is so because the image is updated only up to an intermediate position of the frame.

In a further aspect of the well-known solid-state image sensors, FPN (fixed pattern noise) is generated due to the dark current. FPN is contained in the video signal generated in the photography and deteriorates the image, and its removal is desired. FPN is corresponded by the image output data from the sensor elements in the light-blocked state thereof (hereinafter referred to as light-blocked state image data). Accordingly, for the FPN cancellation the light-blocked state image data are stored and subtracted from the image output data from the sensor elements in the exposed state thereof (hereinafter referred to as exposed state image data). However, since the image data (light-blocked image) corresponding to the FPN in the light-blocked state contains random noise components, the image data corresponding to the FPN taken in one light-blocked state greatly contains random noise components, and therefore can not permit adequate correction.

In the meantime, in the usual still image photography (one-shot photograph), a shutter lag is involved until storing of or taking image data after the shutter trigger. In order to reduce the shutter lag, the light-blocked state photography (i.e., storing of the light-blocked state image data) is executed after carrying out the exposed state photography, and the light-blocked state image data is subtracted from the exposed state image data for the FPN cancellation.

In a mode of continuous image display on a monitor, which is executed for such purpose as the picture angle setting or focus adjustment in the photography (or image storing) (the mode being hereinafter referred to as view-finder mode), it is conceivable to carry out the light-blocked state photography first and then the exposed state photography for image display according to the exposed state image data.

Doing so in the view-finder mode, however, results in a reduced number of exposed state photography frames constituting one frame of image.

In order to increase the sequential monitor image display frequency (field rate) in the view-finder mode, it is conceivable to reduce the read time by causing the reading of thinned-down pixel data of the sensor elements for the picture angle setting, while causing the reading of data in a noted portion (i.e., focal point adjustment subject portion) in the screen for the focal point adjustment. In such a case, however, in the reading of data from a central portion of the screen it is impossible to read the data in OB (optical black) portions. This means that it is impossible to obtain OB clamping, resulting in unstable video signal level.

In the view-finder mode, it is also conceivable to remove FPN by carrying out, in each cycle, storing the light-blocked state image data obtained in a light-blocked state photography in a memory or the like, and correcting the exposed state image data obtained in the exposed state photography by using the stored light-blocked state image data. The light-blocked state image data, however, is changed with temperature changes. Therefore, the light-blocked state image data stored in a memory or the like is progressively deviated from the real time data and gradually disables proper FPN correction.

In the case of reading the partial data in the view-finder mode as described above, a change in the partial data read part of the screen requires storing light-blocked state image data afresh for the proper FPN correction, and the additional data taking (photography) adds an extra complication to the operation.

Besides, a separate memory for storing the light-blocked state image data as the FPN data is required in addition to the exposed state image data memory. This is undesired from the stand point of the memory operation efficiency, as well as adding to the balkiness of the construction.

BRIEF SUMMARY OF THE INVENTION

The present invention was made in view of the various problems discussed above, and it seeks to provide an electronic imaging apparatus, which can be handled very conveniently and permits taking highly fine image data.

In order to achieve the objects, according to one aspect of the invention, there is provided an electronic imaging apparatus comprising:

a solid-state sensor element for converting an image focused by an optical system into image data; and sensor element drive means selectively operable in a first drive mode, in which output image data is taken out through reading of photoelectric conversion outputs from all pixels or a comparatively large number thereof in the solid-state sensor element, and in a second drive mode, in which output image data is taken out through reading of photoelectric conversion outputs from a relatively small number of selected ones of the pixels suited for foreground scene recognition monitor means employed in the electronic imaging apparatus.

According to another aspect of the present invention, there is provided an electronic imaging apparatus comprising:

a solid-state sensor element for converting an image focused by an optical system into image data;

memory means including a plurality of memories for storing color data of original or complementary colors concerning the image data obtained from the sensor element; and color data storing and transferring means for repeating a sequence of operations of storing color data of a predetermined one of the colors in a corresponding one of the memories in the memory means and then transferring the stored color data to a predetermined destination, the sequence of operations being executed sequentially and repeatedly for the memories with a predetermined phase difference provided between adjacent ones of the memories.

According to other aspect of the present invention, there is provided an electronic imaging apparatus comprising:

a solid-state sensor element for converting an image focused by an optical system into image data;

light-blocked state image data holding means for holding light-blocked state image data representing the output of the solid-state sensor element in a light-blocked state thereof; and control means for obtaining light-blocked state image data from the solid-state sensor element in the light-blocked state prior to obtaining successive exposed state image data representing the output of the sensor element in successive exposed states thereof.

According to further aspect of the present invention, there is provided an electronic imaging apparatus comprising:

a solid-state sensor element for converting an image focused by an optical system into image data; and control means selectively operable in a oneshot data mode, in which corrected image data is obtained as one-shot data through the correction of light-blocked state image data, representing the output of the solid-state sensor element in a predetermined exposed state thereof, with respect to the light-blocked state image data representing the output of the sensor element in a light-blocked state thereof, and in a successive data mode, in which corrected image data is obtained as successive data through correction of successive exposed image data, representing the output of the sensor element in successive exposed states thereof, with respect to the light-blocked state image data, the correction being executed in the one-shot data mode by obtaining the light-blocked state image data after obtaining the exposed state image data, the correction being executed in the successive data mode by obtaining the light-blocked state image data before obtaining the exposed state image data.

According to other aspect of the present invention, there is provided an electronic imaging apparatus comprising:

a solid-state sensor element for photoelectrically converting an image focused by an optical system;

correction data holding means for holding correction data representing the output of the solid-state sensor element in a light-blocked state thereof;

correcting means for correcting exposed state image data obtained from the solid-state sensor element in successive exposed states thereof according to the correction data held in the correction data holding means, thereby obtaining successive corrected image data; and correction data updating means for causing updating of the correction data held in the correction data holding means for every predetermined time interval during the processing of the correcting means to obtain the successive corrected image data.

According to still further aspect of the present invention, there is provided the electronic imaging apparatus comprising:

a solid-state sensor element for photoelectrically converting an image focused by an optical system;

partial exposed state image data generating means for generating partial exposed state image data corresponding one of a plurality of different selectable partial areas of a photoelectric surface of the sensor element when an exposure concerning the sensor element is caused;

correcting means for correcting the partial exposed state image data corresponding to the one of a plurality of different selectable partial areas as generated by the partial exposed state image data generating means according to the correction data held in the correction data holding means, thereby obtaining successive corrected image data; and correction data updating means for updating the correction data held in the correction data holding mean in response to a change in the partial selectable partial area selected by the partial exposed state image data generating means.

According to other aspect of the present invention, there is provided an electronic imaging apparatus comprising:

a solid-state sensor element for photoelectrically converting an image focused by an optical system;

correction data holding means for holding correction data representing the output of the solid-state sensor element in a light-blocked state thereof;

accumulated optical black data generating means for generating accumulated optical black data by accumulating successive outputs of an optical black part of the sensor element;

partial exposed state image data generating means for obtaining partial exposed state image data corresponding to a partial area of a photoelectric surface of the sensor element when an exposure concerning the sensor element is caused;

correcting means for correcting the partial exposed state image data corresponding to the partial area generated by the partial exposed state image data generating means according to the correction data held in the correction data holding means, thereby obtaining successive corrected image data; and correction data updating means for causing updating of the correction data held in the correction data holding means when the accumulated optical black data generated by the accumulated optical black data generating means exceeds a predetermined value.

According to other aspect of the present invention, there is provided the electronic imaging apparatus according to one of claims 12 and 13, which further comprises focus adjustment data generating means for generating focus adjustment data in dependence on exposed state image data of the sensor element, and updating prohibiting means for prohibiting the updating of correction data by the correction data updating means when the focus adjustment data generating means is generating the focus adjustment data.

According to other further of the present invention, there is provided an electronic imaging apparatus comprising:

a solid-state sensor element for photoelectrically converting an image focused by the optical system;

correction data holding means including a data memory for holding correction data representing the output of the sensor element in a light-blocked state thereof, the data memory being provided separately from a data memory for holding exposed state image data representing the output of the solid-state sensor element in an exposed state thereof; and correcting means for correcting in an operation mode, in which successive exposed state image data are obtained from the solid-state sensor element in successive exposed states thereof, the successive exposed state image data according to the correction data held in the correction data holding means, thereby obtaining corrected image data.

According to still further aspect of the present invention, there is provided an electronic imaging apparatus comprising:

a solid-state sensor element for photoelectrically converting an image focused by an optical system;

correction data holding means for holding correction data representing the output of the sensor element in a light-blocked state thereof, the correction data being held in a memory area provided in a memory device for holding exposed state image data representing the output of the sensor element in an exposed state thereof, the memory area being provided separately from another memory area for holding the exposed state image data; and correcting means for correcting in an operation mode, in which successive exposed state image data are obtained form the sensor element in successive exposed states thereof, the successive exposed state image data according to the correction data held in the correction data holding means, thereby obtaining corrected image data.

According to other aspect of the present invention, there is provided an electronic imaging apparatus comprising:

a solid-state sensor element for photoelectrically converting an image focused by an optical system;

partial exposed state image data generating means for generating partial exposed state image data corresponding to one of a plurality of different selectable partial areas of a photoelectric surface of the sensor element when an exposure concerning the sensor element is caused;

correction data holding means for obtaining and holding correction data representing the output of a broader area of a photoelectric surface of the sensor element in a light-blocked state thereof, the broader area being broader than the partial area, which the partial exposed state image data generating means generates the partial exposed state image data corresponding to; and correcting means for correcting the exposed state image data from the partial exposed state image data generating means, corresponding to the partial area, according to the correction data held in the correction data holding means, thereby obtaining corrected image data.

Embodiments of the invention will now be made more apparent from the following detailed description with reference to the drawings.

BRIEF DESCRIPTION OF THE SEVERAL VIEWS OF THE DRAWING

FIG. 17 is a timing chart illustrating the operation of the system described before in connection with FIGS. 13 to 15 when the view-finder mode shown in FIG. 16 is switched over to a one-shot mode for still photography or the like.

FIG. 33 is a flow chart illustrating a routine of the system, which is adapted to permit proper correction of data concerning the FPN irrespective of system temperature changes or the like.

DETAILED DESCRIPTION OF THE INVENTION

Figure 1:
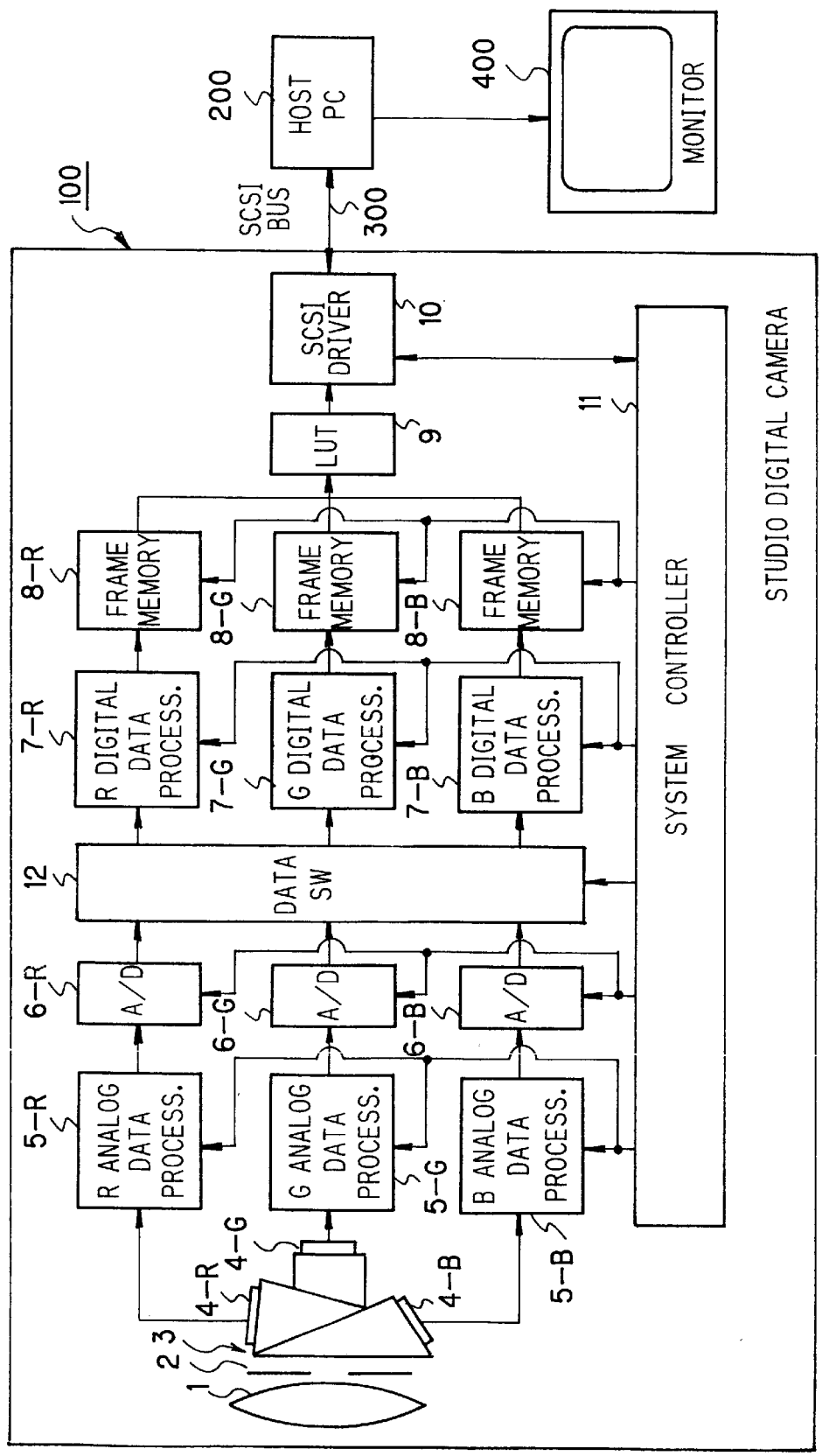
FIG. 1 is a block diagram showing the construction of a studio digital camera as one embodiment of the electronic imaging apparatus according to the invention.

FIG. 1 is a block diagram showing the construction of a studio digital camera as one embodiment of the electronic imaging apparatus according to the invention. In this block diagram, parts corresponding to those in FIG. 55 described above are designated by like reference numerals or symbols.

Referring to FIG. 1, a light image of a scene which has been transferred through an optical system 1, is passed through a shutter 2 and incident on a dichroic prism 3. The dichroic prism 3 disassembles the incident light image into original R (red), G (green) and B (blue) colors and focuses these color images on photoelectric block end surfaces of solid-state sensor elements 4-R, 4-G and 4-B, which provide photoelectric conversion outputs of the respective colors. These photoelectric conversion outputs are supplied to R, G and B analog data processors 5-R, 5-G and 5-B for such processes as OB clamping, and then supplied to A/D converters 6-B, 6-G and 6-B provided in respective color processing circuits for conversion to digital data.

These color digital data are supplied to R, G and B digital data processors 7-R, 7-G and 7-B for such processes as noise cancellation, shading correction, etc., and then stored in frame memories 8-R, 8-G and 8-B in the color processing circuits. The stored data are supplied through an LOT (look-up table) 9 to an SCSI driver 10. The LUT 9 varies the input image tones through gradation conversion according to tables which have been preliminarily set. The studio digital camera 100 and a host PC (personal computer) 200 are connected to each other by an SCSI bus 300, and the image data supplied to the SCSI driver 10 is transferred via the SCSI bus 300 to the host PC 200. The host PC 200 displays the images of the image data transferred from the studio digital camera 100 on a monitor 400 connected thereto.

The R, G and B analog data processors 5-R, 5-G and 5-B, the A/D converters 6-R. 6-G and 6-B. the R, G and B digital data processors 7-R, 7-G and 7-B, and a data switch 12, in the studio digital camera 100, are all controlled by a system controller 11.

Figure 2:
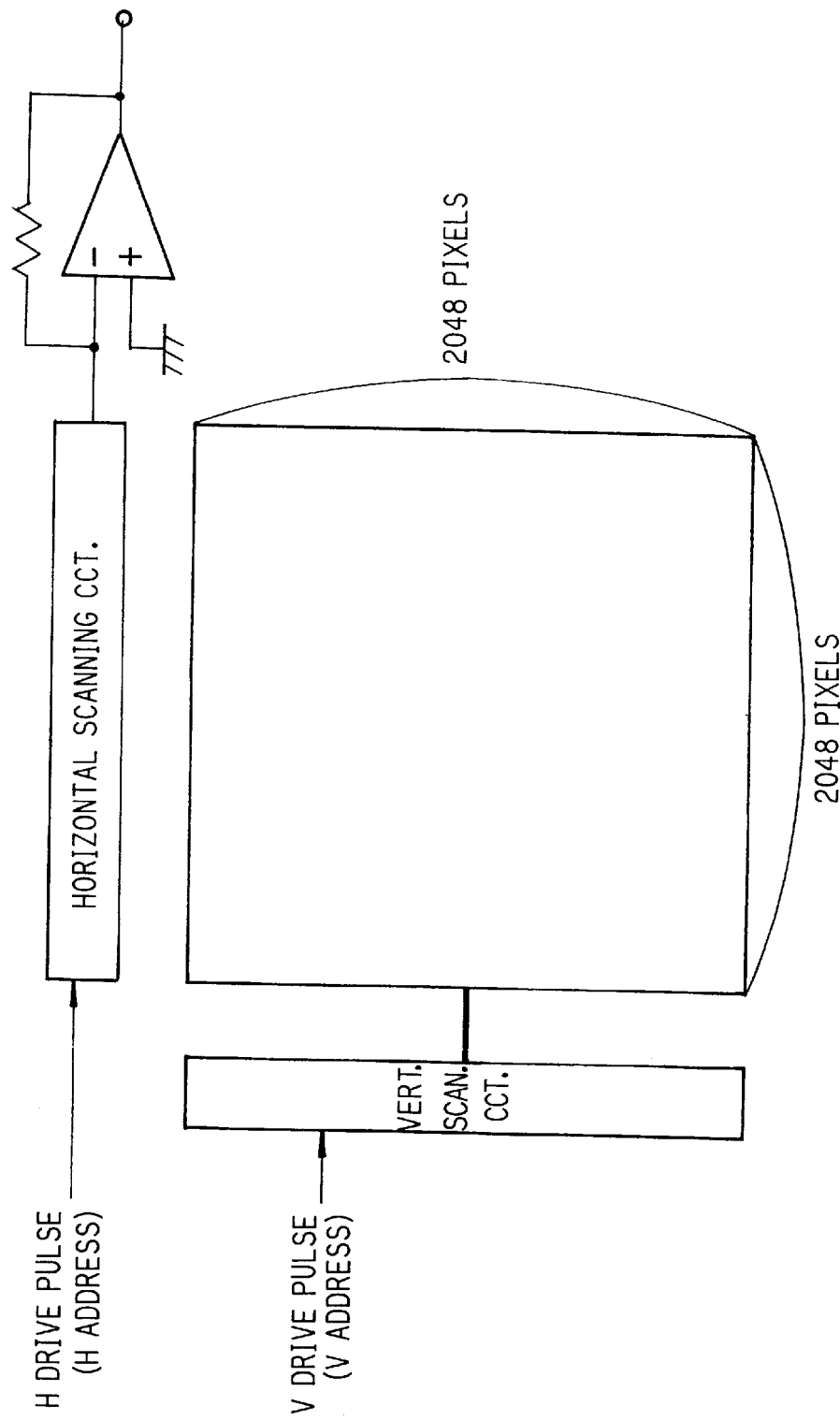
FIG. 2 is a schematic view showing a CMD (Charge Modulated Device) sensor employed as the solid-state sensor element in the electronic imaging apparatus shown in the block diagram of FIG. 1.

FIG. 2 is a schematic view showing a CAD (Charge Modulated Device) sensor of a scale of 2,048 by 2,048 pixels, which is employed as the solid-state sensor element in the electronic imaging apparatus shown in the block diagram of FIG. 1. This sensor element uses an X-Y address read system, that is, it is capable of selectively reading out data of optical charge accumulated in a photoelectric element (or pixel) specified by a V (vertical) address represented by a V (vertical) drive pulse and an H (horizontal) address represented by an H (horizontal) pulse. It is thus capable of selectively reading out the image data from a desired photoelectric surface area. In addition, in the image data reading operation, the accumulated charge is not read out, but a current proportional to the accumulated charge that is produced as the image data. Thus, the image data can be preserved irrespective of whether it is read out or not; it can be read out non-destructively.

Figure 3:
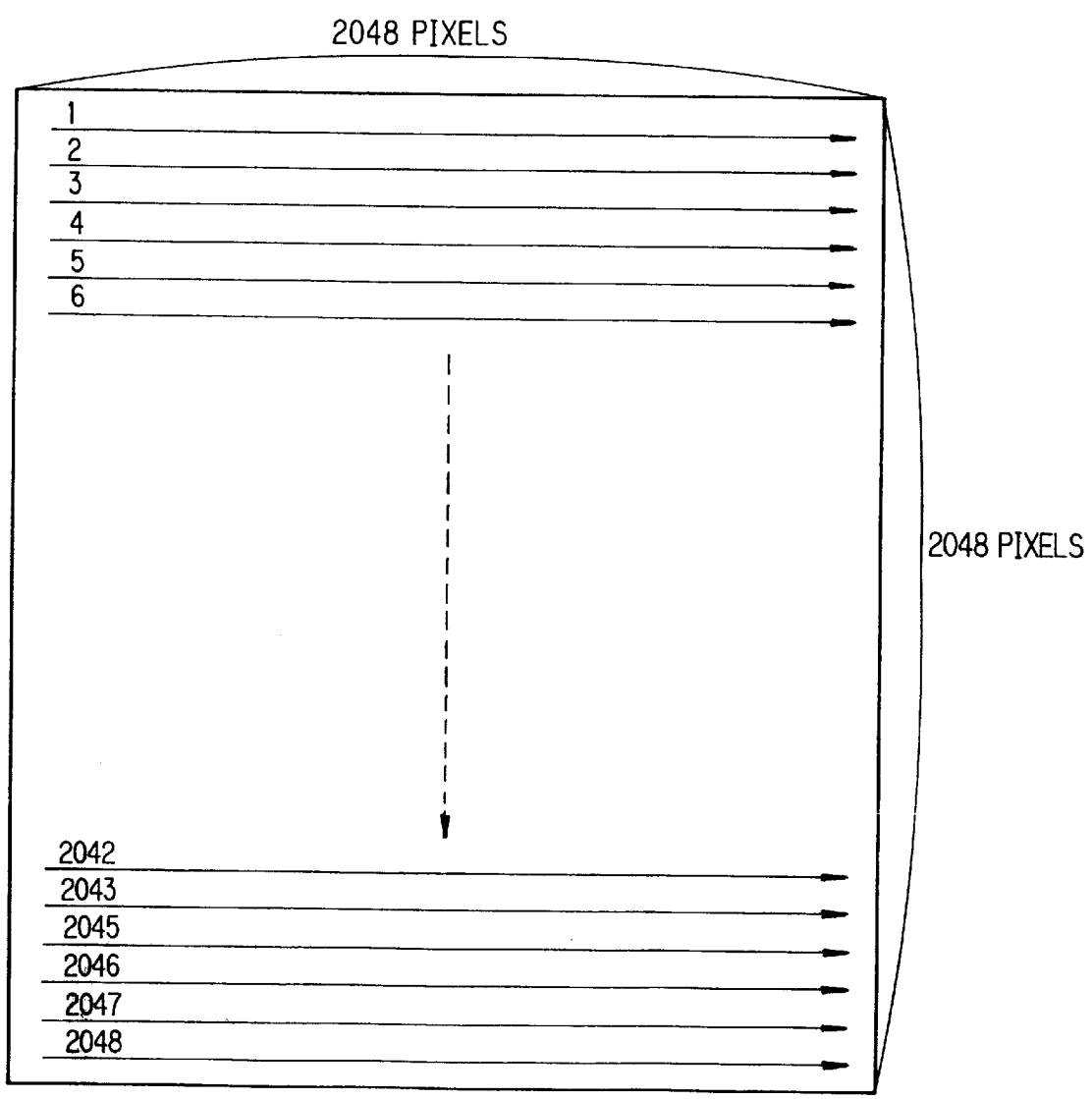
FIG. 3 is a schematic view showing the manner, in which the data is read out from all the pixels in the CMD sensor shown in FIG. 2 in the usual read system.

FIG. 3 is a schematic view showing the manner, in which the data is read out from all the pixels in the COD sensor shown in FIG. 2 in the usual read system. One horizontal line of data can be read out by fixing a V address and up-counting the H address. The reading of one horizontal line data in this way, is executed successively by up-counting the V address, whereby all the pixel data can be read out.

In the usual still image photography, all the pixel data are read out in the above way. With as many as 2,048 by 2.048 pixels as noted above, the above reading system takes 0.3 second to read all the pixel data even at as high drive frequency as 14.3 MHz.

FIG. 4 is a schematic view showing a technique according to the invention to reduce the read out time by adopting a different read system from the usual read system shown in FIG. 3, with which it is difficult to reduce the read time.

Figures 4A, 4B:
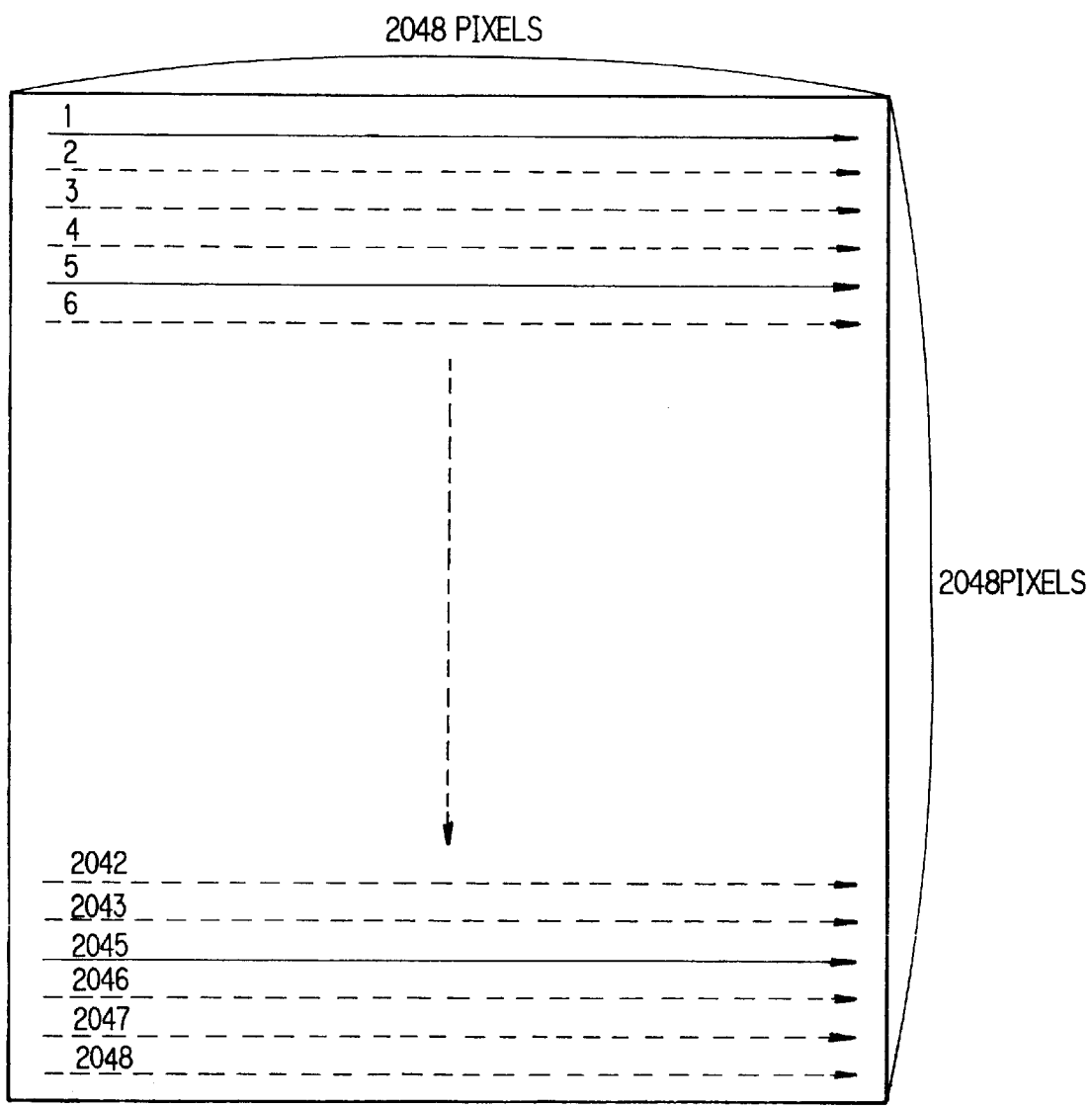
FIGS. 4(A) to 4(B) are a schematic view showing a technique according to the invention to reduce the read out time by adopting a different read system from the usual read system shown in FIG. 3, with which it is difficult to reduce the read time.

The sensor construction is the same as in the case of FIG. 3, with as many as 2,048 by 2,048 pixels. As shown in FIG. 4(A), the lines shown by the dashed lines are skipped by reading only the lines shown by the solid line. As shown in FIG. 4(B), in the read lines the pixels shown by the cross marks are skipped by reading only the pixels shown by the circle marks. As is seen, the pixels are thinned down for reading the data. For example, the V address is set to start the read from the first horizontal line, then read the next line spaced apart by three lines, and so forth. In reading each horizontal line, the H address is up-counted to read pixels spaced apart by three pixels.

By adopting the read system as shown in FIG. 4, the pixels to be read out are reduced in number to one fourth in the vertical direction and also in the horizontal direction. That is, the pixels are thinned down to one sixteenth in number. Thus, the time for reading data from the pixels constituting one image frame is reduced to one sixteenth compared to the case of reading all the pixels as shown in FIG. 3. This means that the number of image frames obtainable in unit time is increased to sixteen times, and it is thus possible to obtain smooth motion of images displayed on the monitor. It is thus possible to provide an advantage of ensuring natural movement of displayed images in a continuous display mode, which successively and continuously obtains the exposed state image data representing the output value in the successive exposed state of the solid-state sensor elements.

Figure 5:
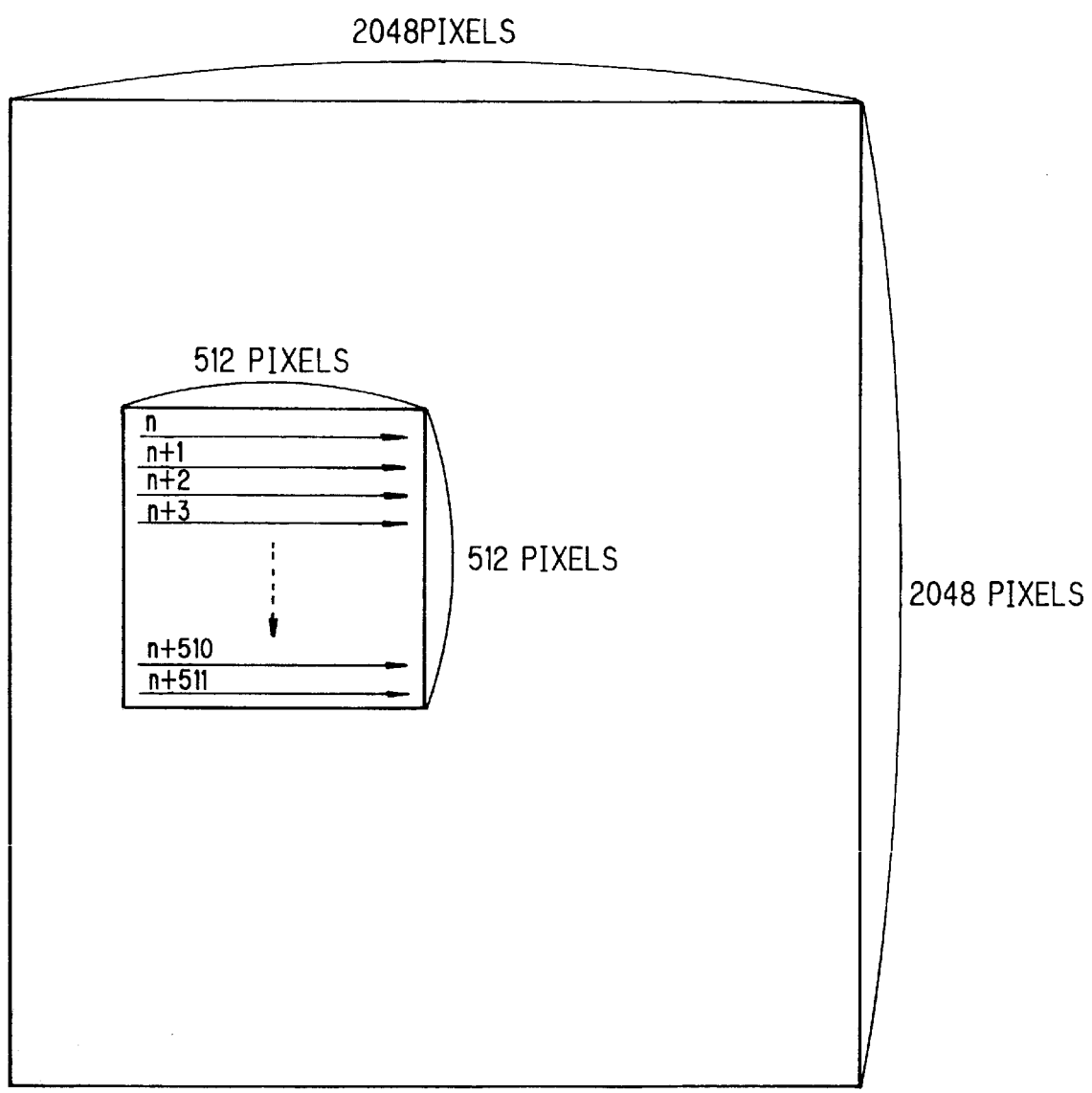
FIG. 5 is a schematic view showing a different technique according to the invention to reduce the read out time by adopting another read out system different from the usual read out system shown in FIG. 3, with which it is difficult to reduce the read out time.

FIG. 5 is a schematic view showing a different technique according to the invention to reduce the read out time by adopting another read out system different from the usual read out system shown in FIG. 3, with which it is difficult to reduce the read out time.

In the preceding read out system shown in FIG. 4, the pixels are thinned down for reading out the data. In the read out system shown in FIG. 5, the image data is read out from a local area with 512 by 512 pixels, which is one fourth, both vertically and horizontally, of the photoelectric area with 2,048 by 2,048 pixels of the CAD sensor as in the case of FIG. 3. When the V address given in this case is N. for instance, the read start position (pixel address) in the N-th horizontal line is prescribed by an H address. From this position the pixel data are read out pixel after pixel. When the read of 512 pixel data are completed, the next V address is given, and the same H address as for the N-th line is given. In this way, the data is read out from a local image area with 512 by 512 pixels as shown without thinning down pixels.

This local area is one fourth, both vertically and horizontally, of the original photoelectric area size. Thus, like the case of FIG. 4, the time for reading out the pixels constituting one image frame is reduced to one sixteenth compared to the case of reading all the pixels as shown in FIG. 3, thus increasing the number of images obtained in unit time to sixteen times. It is thus possible to obtain smooth motion of the images displayed on the monitor. As described above in connection with the case of FIG. 4, this leads to an advantage of ensuring natural movement of displayed images in a continuous display mode, i.e., display of exposed state image data output obtained successively and continuously from the solid-state sensor elements.

Figure 6:
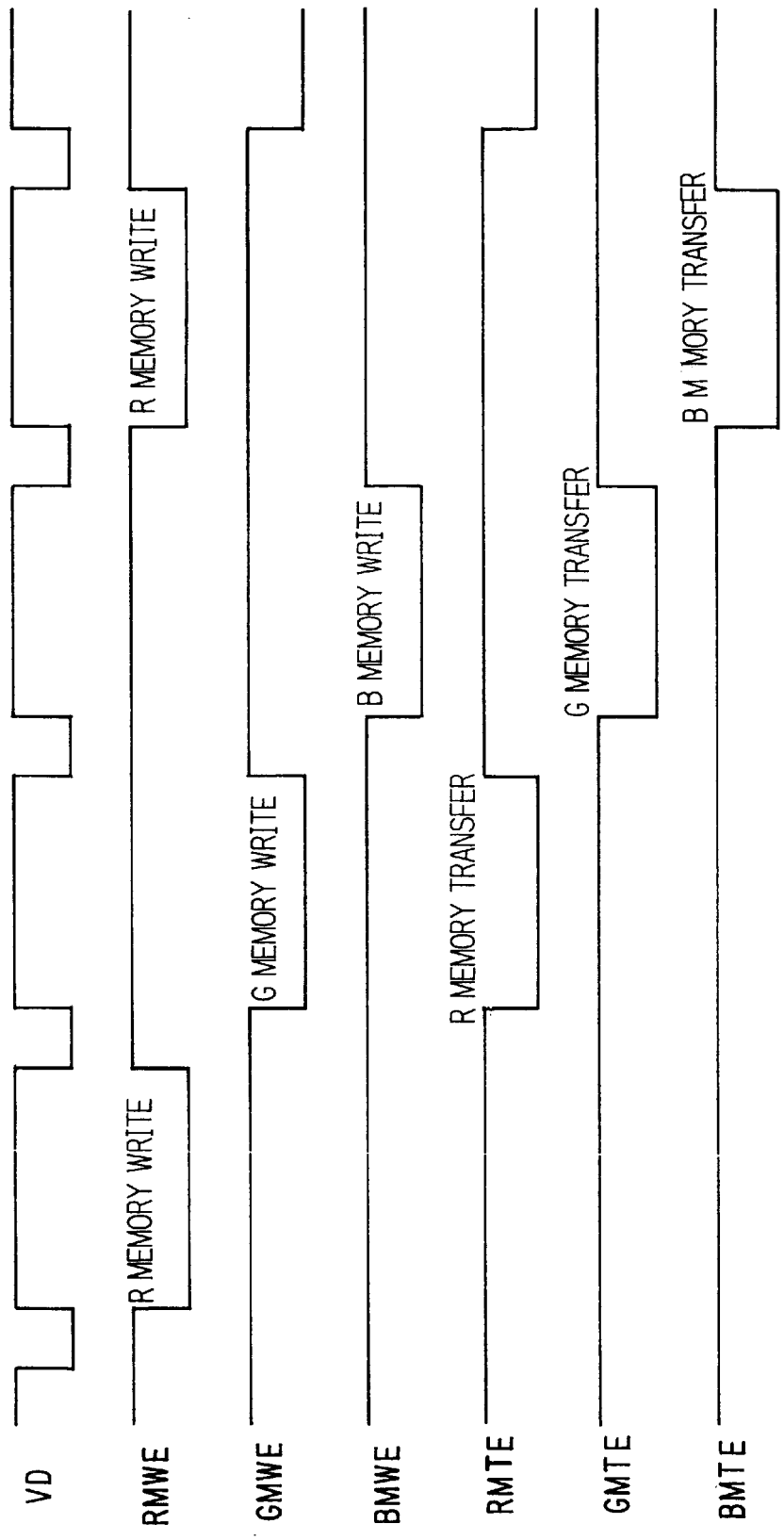
FIG. 6 is a timing chart illustrating the operation of the system shown in FIG. 1.

FIG. 6 is a timing chart illustrating the operation of the system shown in FIG. 1. As 39 described before, in the system shown in FIG. 1 in response to a shutter trigger operation of the photography the photoelectric conversion data are sequentially read out from the solid-state sensor elements 4-R, 4-G and 4-B and converted in the A/D converters 6-R, 6-G and 6-B into digital data. These digital data are supplied through the data switch 12 to the R, G and B digital data processors 7-R, 7-G and 7-B for such processes as noise cancellation, shading correction, etc. The resultant image data are written in the frame memories 8-R, 8-G and 8-B. These written image data are read out from the frame memories 8-R, 8-G and 8-B at predetermined timings and supplied through the LUT 9, the SCSI driver 10, the SCSI bus 300 and the host PC 200 to the monitor 400 for display thereon.

In FIG. 6, timings of the writing and reading of data in and out of the frame memories 8-R, 8-G and 8-B are shown. These write and read timings concern the case when a continuous image display mode (i.e., view-finder mode 1) of the system is selected, in which the exposed state image data output is obtained successively and continuously from the solid-state sensor elements 4-R, 4-G and 4-B. The cycle period of display of one frame is synchronized to a VD signal (corresponding to the vertical sync signal). Referring to FIG. 6, labeled ROWE is a signal permitting the writing of data in the R data frame memory 8-R, GMWE is a signal permitting the writing of data in the B data frame memory 8-G, and BMWE is a signal permitting the writing of data in the B data frame memory 8-B. Labeled RATE is a signal permitting the transfer of the stored data in the R data frame memory 8-R, GATE is a signal permitting the transfer of the stored data in the G data frame memory 8-G, and RATE is a signal permitting the stored data in the B data frame memory 8-B.

As shown, a first solid-state sensor element output image data is written at a certain instant in the R data frame memory 8-R. A subsequent output image data is written in the G data frame memory 8-G. A further output image data is written in the B data frame memory 8-B. The image data which has been written in the R data frame memory 8-R at the VD signal timing noted above, is read out and transferred at the next timing, the data being transferred through the LUT 9, the SCSI driver 10 and the SCSI bus 300 to the host PC 200. At the subsequent timing of the VD signal, the image data having likewise been written in the G data frame memory 8-G is transferred to the host PC 200. In synchronism to this timing, the writing of image data in the B data frame memory 8-B is executed. At the yet subsequent timing, the image data having been written in the B data frame memory 8-B is transferred to the host PC 200, and in synchronism to this timing the writing (or updating) of data in the R data frame memory 8-R is executed.

Figure 56:
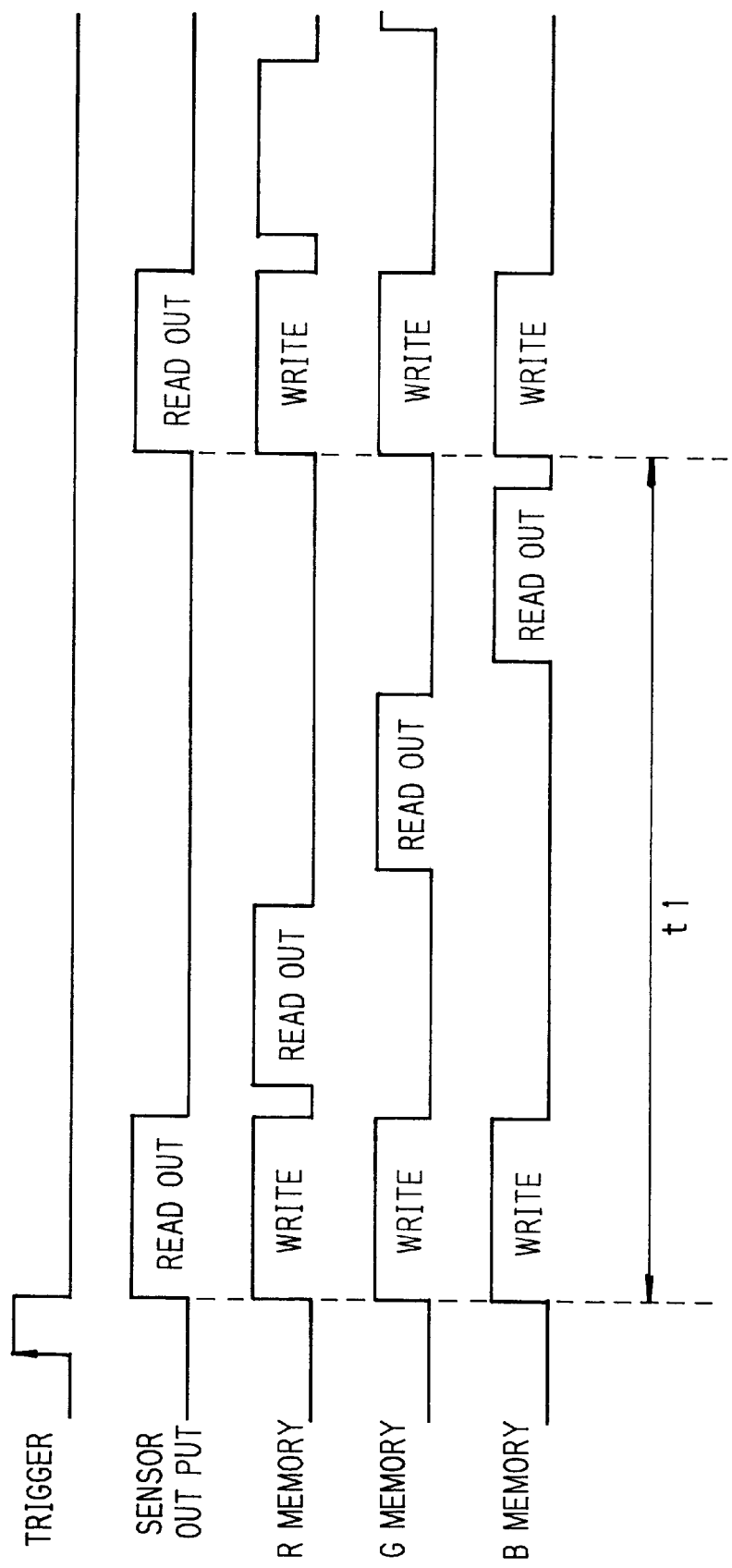
FIG. 56 is a timing chart illustrating the monochroic image frame.
Figure 57:
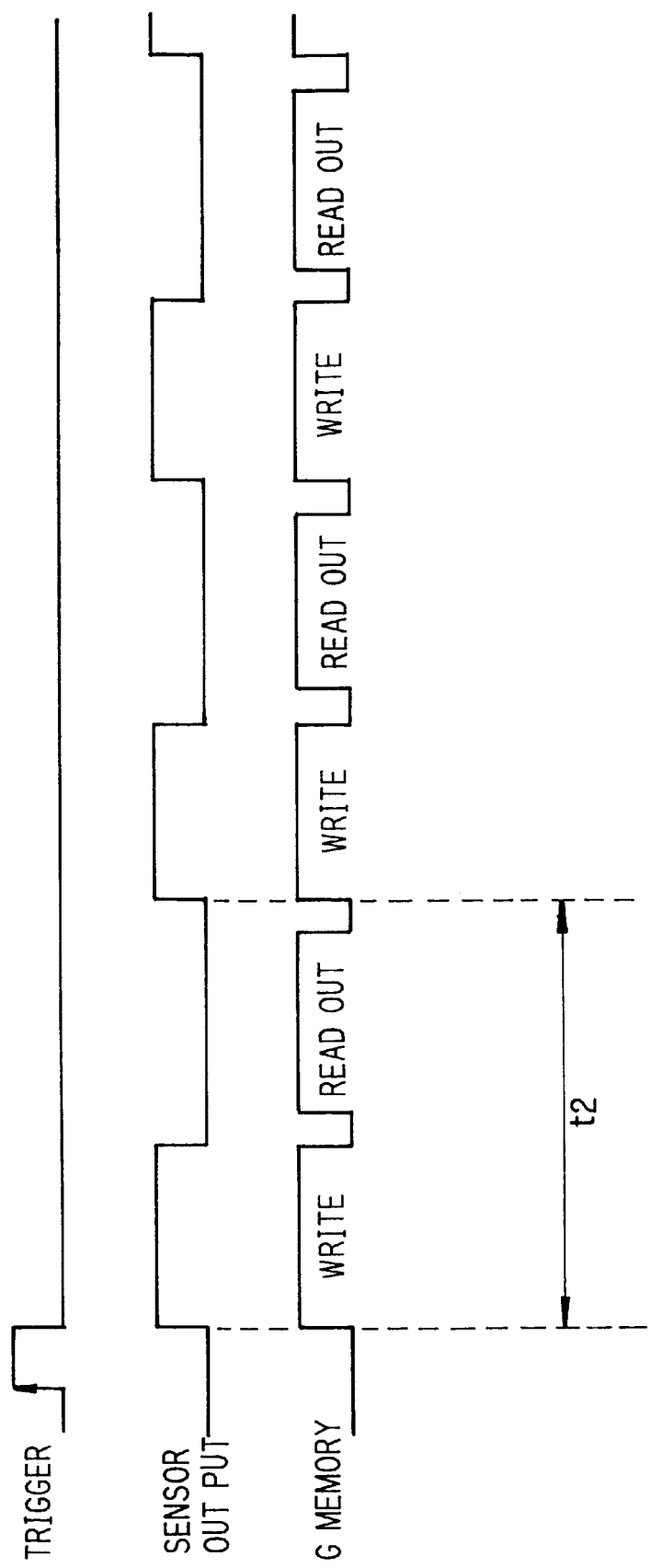
FIG. 57 is a timing chart illustrating the operation of the system shown in FIG. 55.

In the above way, the writing and reading of data in and out of the frame memories 8-R, 8-G and 8-B are carried out successively and repeatedly. other words, with respect to each of a plurality of memories a series of operations of storing color data and transferring the same to a predetermined destination, is executed successively with a predetermined phase difference provided among the memories. Specifically, the operations of storing color data, reading the same and transferring the same to the host PC 200, are executed successively and repeatedly with a phase difference of one VD signal cycle period provided between the frame memories 8-R and 8-G, the same phase difference provided between the frame memories between the frame memories 8-G and 8-B and the same phase difference provided between the frame memories 8-B and 8-R.

Where the operation timings as described above in connection with FIG. 6 are adopted, the image data of a certain color which has been stored in a frame memory in synchronism to a VD signal timing, is read out and transferred to the host PC 200 at the next VD signal timing, and this operation is executed successively and repeatedly with a phase difference of one VD signal cycle period provided with respect to the image data of the other colors. Thus, compared to the example described before in connection with FIG. 56, the data updating cycle period for each color can be reduced, that is, the number of image frames obtained per second is increased in effect, permitting more natural image display to be reproduced.

Figure 7:
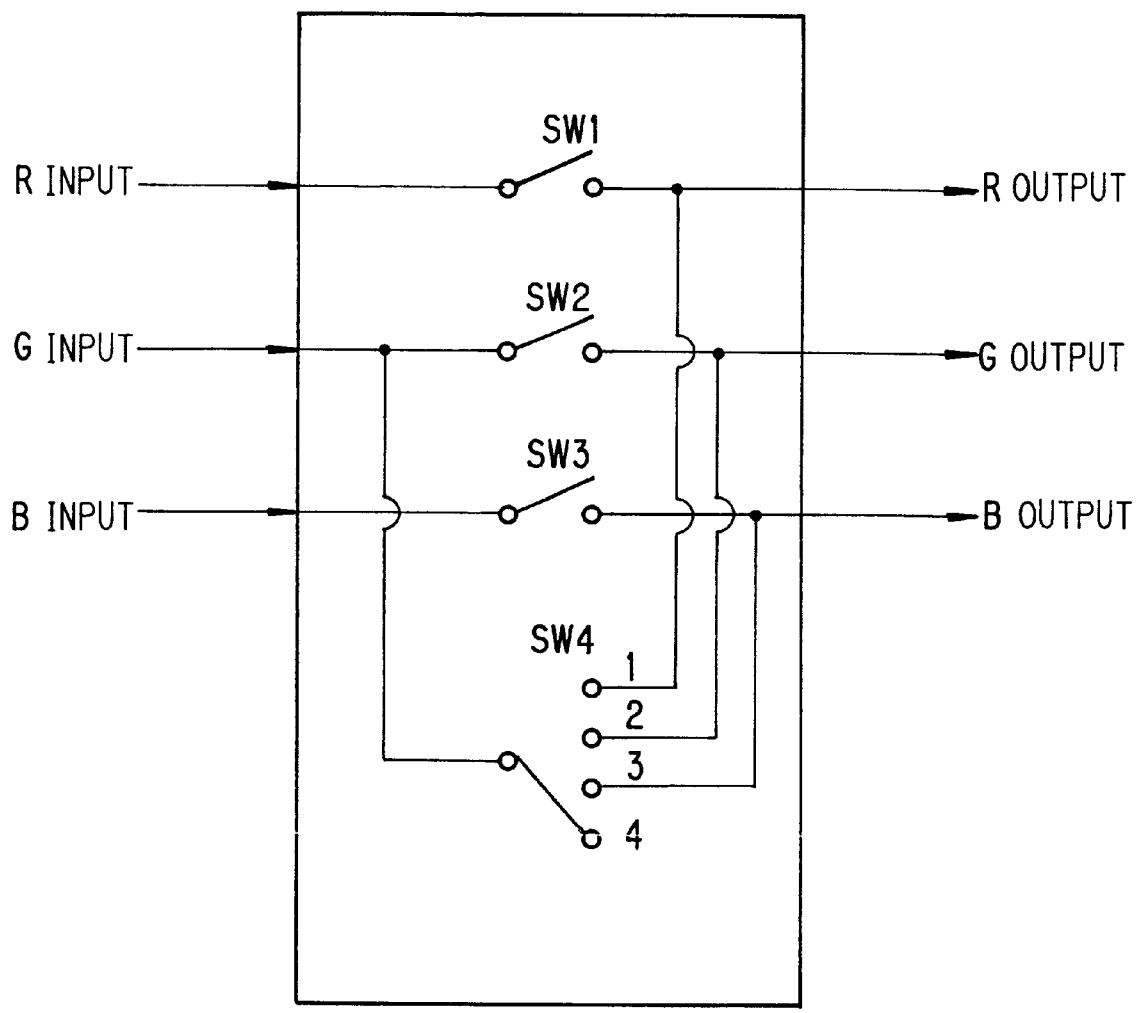
FIG. 7 is a circuit diagram showing an example of the data switch 12 in the system shown in FIG. 1.

FIG. 7 is a circuit diagram showing an example of the data switch 12 in the system shown in FIG. 1.

Referring to FIG. 7, the output data of the A/D converters 6-R, 6-G and 6-B are supplied as R, G and B inputs. R, G and B outputs are supplied to the R, G and B digital data processors 7-R, 7-G and 7-B.

In the usual still image photography, switches SW1 to SW3 are closed, and the R, G and B inputs are directly outputted as the R, G and B outputs. In this case, a switch SW 4 is held at the position of a contact 4 and not connected to any output line. In this state, the digital data corresponding to the outputs of the solid-state sensor elements 4-R, 4-G and 4-B are written in the respective frame memories 8-R, 8-G and 8-B.

In an operation of obtaining successive and continuous monochroic images (view-finder mode 2), in order to increase the number of image frames per unit time, the G channel data is used for the monochroic image display. In this case, the switches SW1 to SW3 are all held "off". In this state, at the first timing the switch SW4 is set in the position of a contact 1. The G channel input data is thus outputted as the R output and written in the frame memory 8-R. At the timing when one image frame has been written, the switch SW4 is switched over to the position of a contact 2. The G channel input data is thus outputted as the G output and written in the frame memory 8-G. At the timing when one image frame has been written in the frame memory 8-G, the switch SW4 is switched over to the position of a contact 3. The G channel input data is thus outputted as the B output and written in the frame memory 8-B.

According to the execution of the above sequence of operations repeatedly, the G channel image data can be written in each of the frame memories 8-R, 8-G and 8-B. By obtaining the image display on the basis of the G image data written in the frame memories 8-R, 8-G and 8-B in the above 44 way, the number of image frames obtained per unit time, i.e., the image updating rate, can be increased to obtain smooth motion images.

Figure 8:
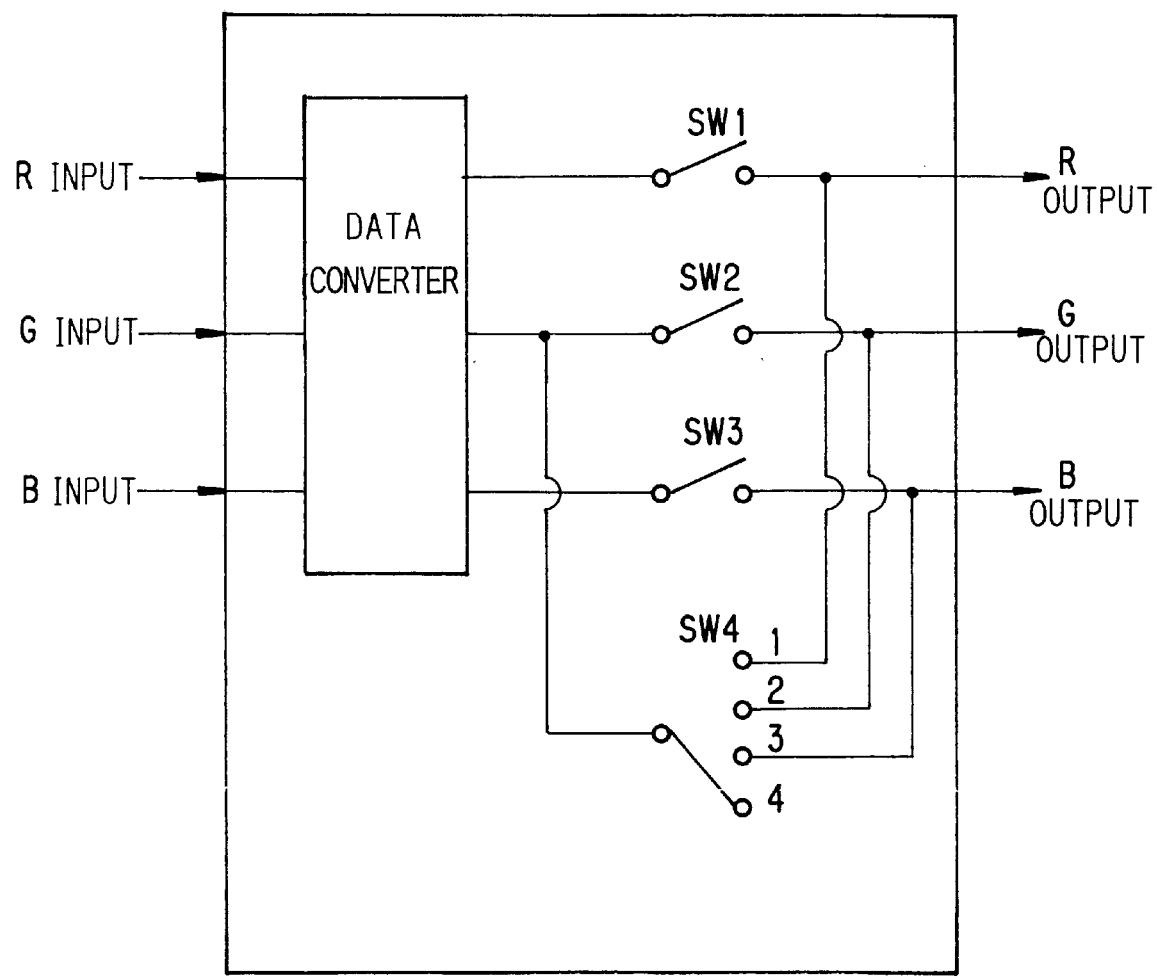
FIG. 8 is a circuit diagram showing a different embodiment of the data switch 12 shown in FIG. 1.

FIG. 8 is a circuit diagram showing a different embodiment of the data switch 12 shown in FIG. 1. The data switch 12 in FIG. 8 has a construction as shown in which the data converter is provided between the side of the R, G and B inputs and the input sides of the switches SW1 to SW4 of the data switch in FIG. 7. The switches SW1 to SW4 are operable in the same manner as described before in connection with FIG. 7.

Figure 9:
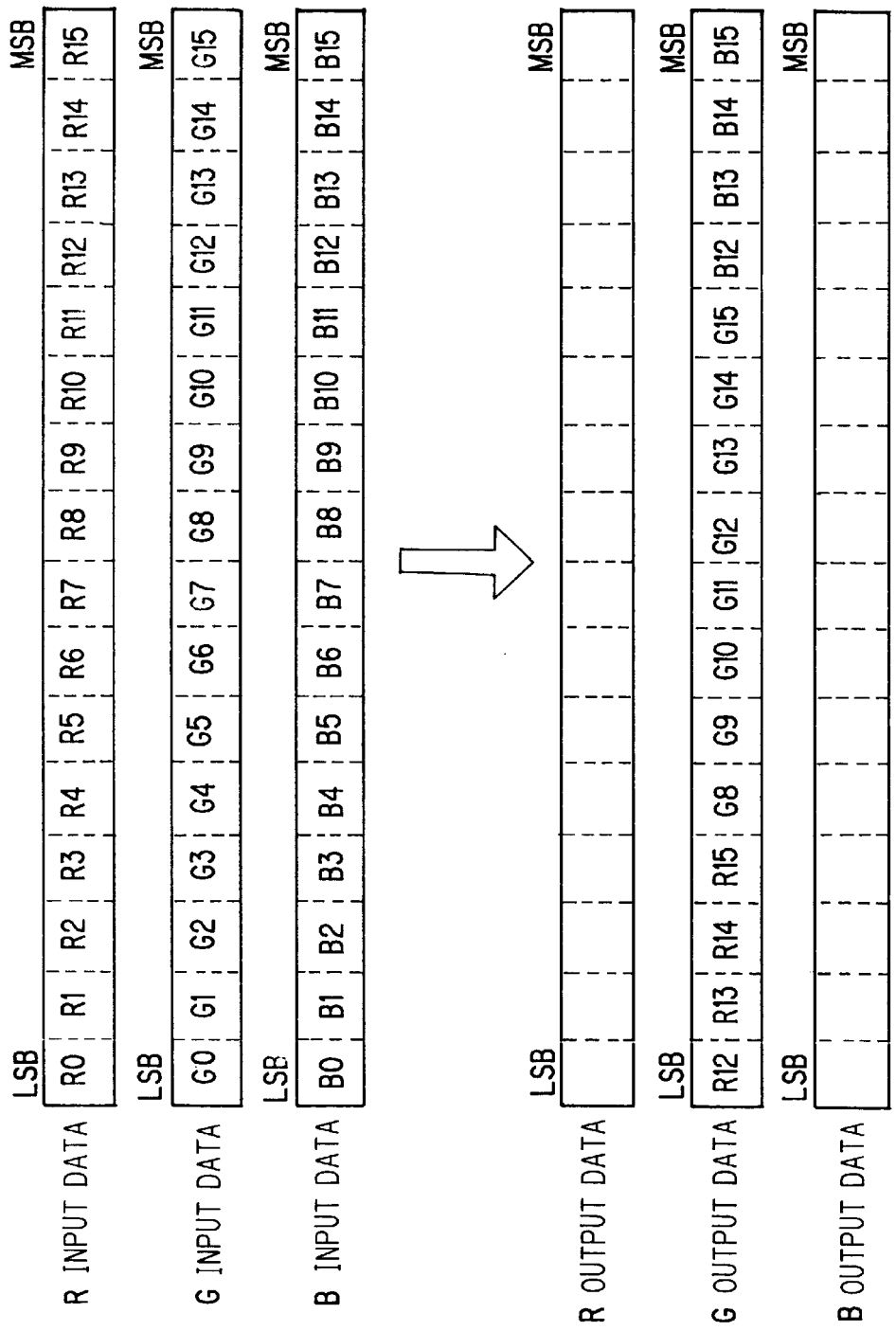
FIG. 9 is an operation of the data converter in the data switch

FIG. 9 illustrates the operation of the data converter in the data switch 12 shown in FIG. 8. FIG. 9 is a drawing for explaining a case where the R, G and B image data are each constituted by 16 bits. As shown, the R input data is constituted by bits from the LSB (least significant bit) RO to the MSB (most significant bit) R15. The G input data is constituted by bits from the LSB GO to the MSB G15. The B input data is constituted by the LSB BO to the MSB B15. In still photography (one-shot mode), the R, G and B image data each of 16 bits are directly outputted.

In an operation in which the color images are obtained successively and continuously by increasing the number of image frames per unit time (view-finder mode 3), only predetermined upper bits of the 16-bit R, G and B image data are collectively assigned to the G channel to obtain a single channel output data for display. In the illustrated example, upper 4 bits of each of the R and B image data and upper 8 bits of the G image data are extracted.

By extracting the upper bits in the above way the color image data which is reduced in gradation is collected on the G channel, and this G channel data is used for the display of the reduced gradation color images through the switching of the switches SW1 to SW4 in a manner like the operation in the case shown in FIG. 7, in which the monochroic images are obtained successively and continuously (view-finder mode 2). In this mode, the color image display on an electronic view-finder or a monitor can be obtained by increasing the number of image frames per unit time. Thus, smooth motion color image display can be obtained.

While the above example concerned with 16-bit input image data, a similar technique is of course applicable to the case dealing with 8-bit or 12-bit input image data. In addition, while in the above example the extracted upper bit proportions of the R, G and B image data were set to 4:8:4, it is possible to adequately select appropriate extracted upper bit proportions.

Earlier, it has been described in connection with the prior art that a problem arises when an image data transfer request is generated on the host PC side during the writing of image data due to the asynchronous between the timings of the image data output from the solid-state sensor elements and the data transfer request. The asynchronous generation of the request results in mixing of images with different times axes in one image frame. This problem also arises in the operation described in connection with FIG. 6 unless some means for avoiding this is provided.

Figure 10:
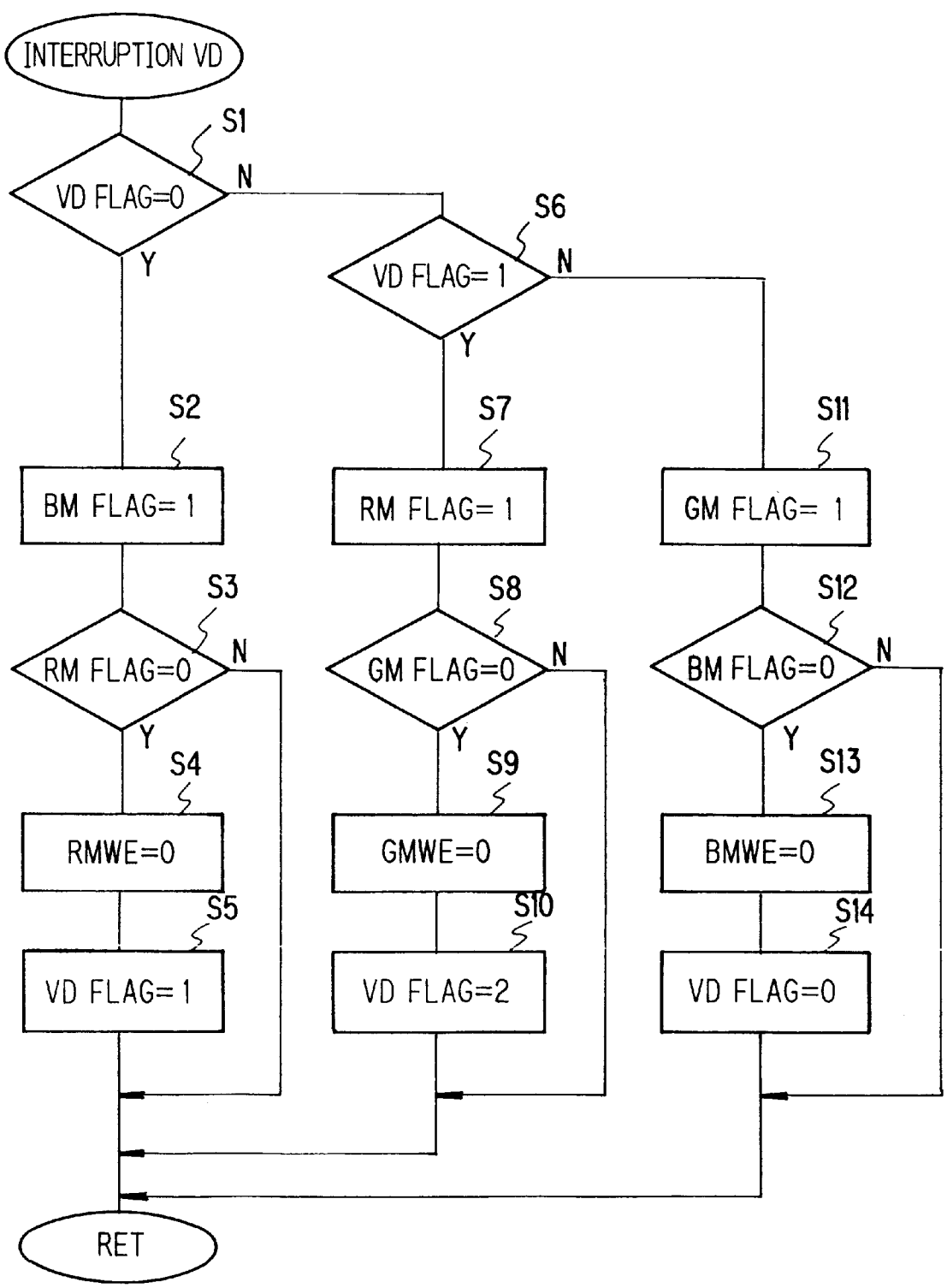
FIG. 10 is a flow chart for describing routine as a measure for avoiding the above problem of mixing of images with different time axes in one image frame.
Figure 11:
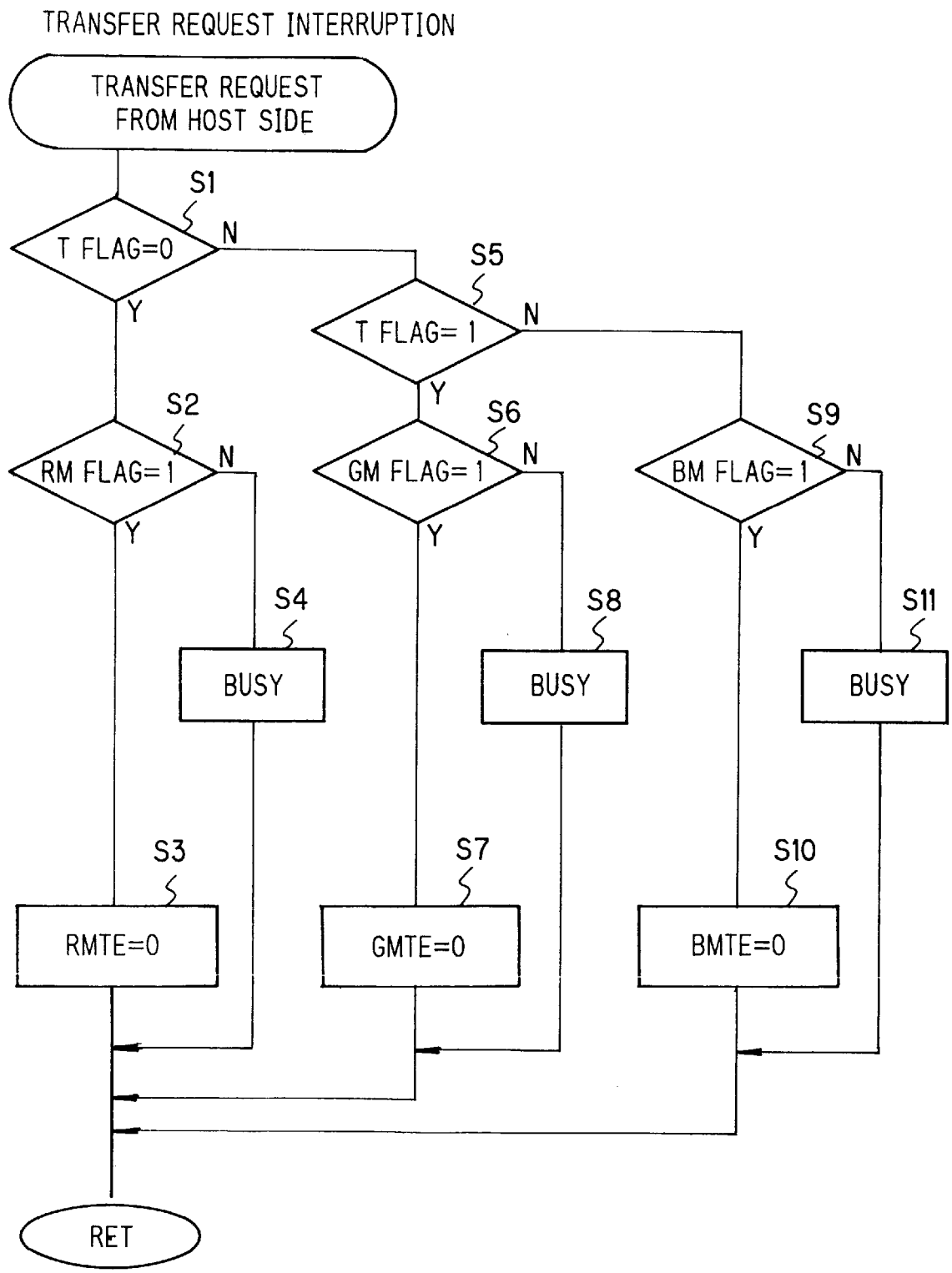
FIG. 11 is a flow chart for describing routine as a measure for avoiding the above problem of mixing of images with different time axes in one image frame.
Figure 12:
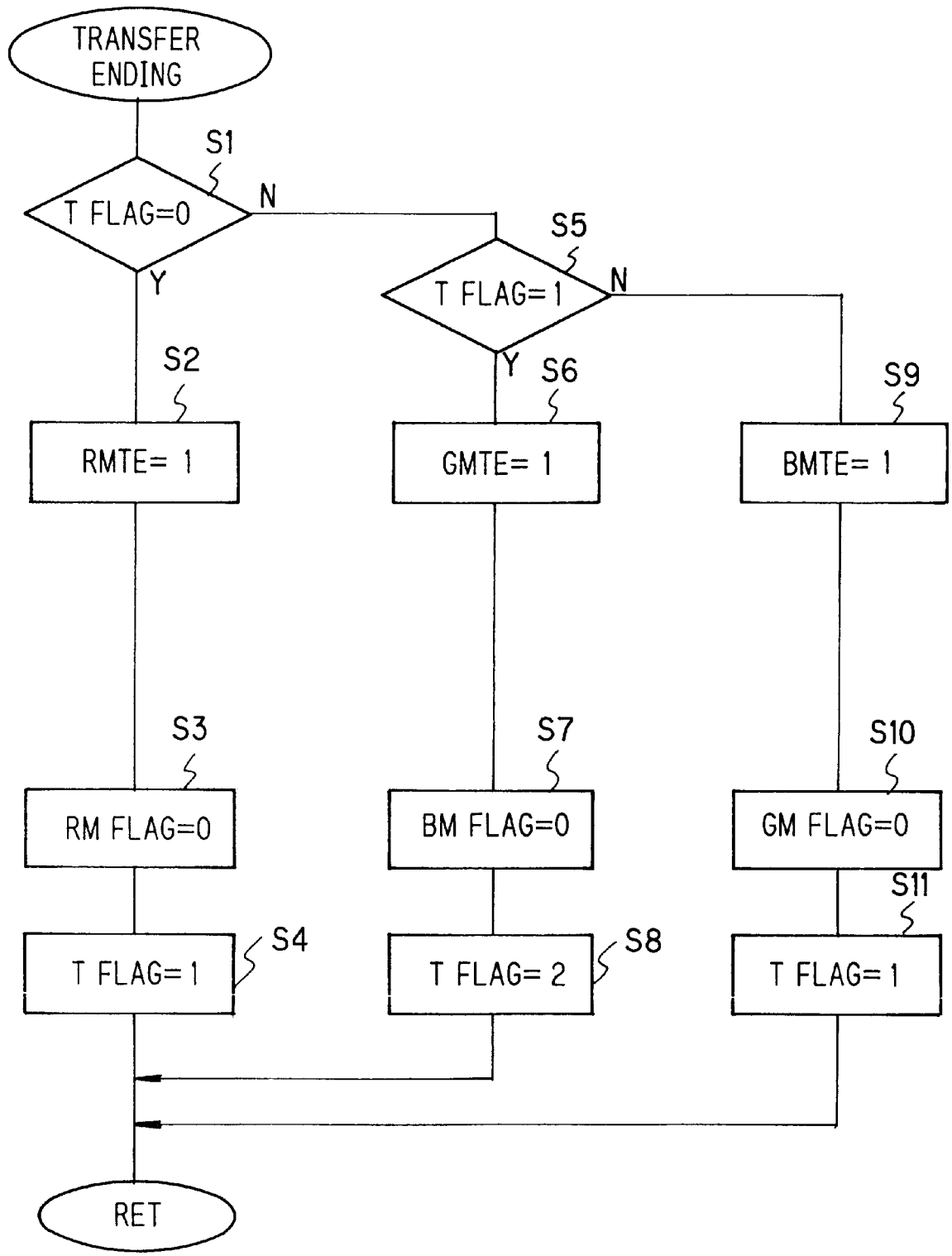
FIG. 12 is a flow chart for describing routine as a measure for avoiding the above problem of mixing of images with different time axes in one image frame.

FIGS. 10 to 12 are flow charts for describing routines as a measure for avoiding the above problem of mixing of images with different time axes in one image frame.

In FIG. 10, upon arrival of a VD signal specifying the start of one image frame, a VD interruption is generated. A VD flag in a step S1 is for checking whether the image data is to be written at the pertinent timing in the R, G or B frame memory 8-R, 8-G or 8-B. When the VD flag is "0" (i.e., when "Y" is provided in the step S1), the image data is written in the R data frame memory 8R. When the flag is "1" (i.e., when "N" is provided in the step S1 and "Y" is provided in a step S6), the data is written in the G data frame memory 8-G. Otherwise (i.e., when "N" is provided in the step S1 and "N" is provided in the step S6), the data is written in the B data frame memory 8-B.

The frame memories have respective flags, i.e., the R, G and B data frame memories 8-R, 8-G and 8-B have RM, GM and BM flags, respectively. These flags are referred to check whether the effective image data are present in their own memories.

When the image data has been written in, for instance, the R data frame memory 8-R (i.e., when it is found in the step S1 that the VD flag is "0"), the process with respect to the B data frame memory 8-B on which the image data is previously written has been ended. Thus, the BM flag in the frame memory 8-B is set to "1" (step S2). Then, the RM flag is referred to (step S3). When this flag is "0", image data is written (step S4). In the step S4 image data is written in the R data frame memory 8-R with image data write permit signal RMWE of "0". This is so because the signal ROWE is of the negative logic.

When it is found in the step S3 that the RM flag is RM=1, no data is written.

After the issuance of the image data write permit signal of ROWE=0 with respect to the R data frame memory 8-R, the VD flag is set to "1" (step S5) to write the next color image data in the G data frame memory 8-G.

While in the above case it was assumed that image data is written in the R data frame memory 8-R at the outset, the mode of the routine is the same with respect to the G data frame memory 8-G (G channel steps S7 top S10) and the B data frame memory 8-B (B channel steps S11 to S14) as well except for the next color designating operation. After the image data has been written in the frame memory, the color as the subject of the process is identified by referring to the VD flag, and then the flag in the frame memory with the image data just having been written therein is set to "1". The memory flags BM, RM and GM are thus "1" when the effective image data is held in their own frame memories. In the above operation, the image data is written in the frame memories.

FIG. 11 illustrates a routine which is executed when a transfer request is generated.

The transfer request is issued from the host PC side as an image transfer request. In response to the image transfer request from the host PC side, an interruption is generated. A T flag in a step S1 specifies the color to be transferred. When the T flag is "0" (i.e., when "Y" is provided in the step S1), the image data in the R data frame memory 8-R is transferred. When the T flag is "1" (i.e., when "N" is provided in the step S1 and "Y" is provided in a step S1), the image data in the G data frame memory 8-G is transferred. Otherwise (i.e., when "N" is provided in the step S1 and "N" is provided in the step S5), the image data in the B data frame memory 8-B is transferred.

When the image data in the frame memory 8-R is to be transferred (i.e., when it is found in the step S1 that the T flag is "0"), the RM flag as described before in connection with FIG. 10 is referred to (step S2). As described before, when the RM flag is "1", the effective image data is stored in the R data frame memory 8-R. Thus, the image data transfer permit signal RMTE is outputted (i.e., RMTE is set to "0" in a step S3).

When it is found in the step S2 that the RM flag is not "1", no effective image data is stored in the R data frame memory 8-R. Thus, a signal BUSY indicating no data to be transferred to the host PC side is outputted (step S4), thus bringing an end to the routine. While in the above case it was the image data in the R data frame memory 8-R that is first to be transferred, the same process is executed in the case of the G data frame memory 8-G (steps S6 to S8) and the B data frame memory 8-R (steps S9 to S11).

FIG. 12 illustrates a routine which is executed after the transfer.

When image data transfer started in the above routine shown in FIG. 11 is ended, a transfer ending signal is generated to cause a transfer ending interruption routine. This interruption routine is brought about when one image frame image data has been transferred.

In this interruption routine, the process channel is determined with reference to a T flag which specifies the color to be transferred as described before in connection with FIG. 11 (step S1). When it is found in the step S1 that the T flag is "0" (i.e., when "Y" is provided in the step S1), an R data transfer ending process is executed. When the T flag is found to be "1" (i.e., when "N" is provided in the step S1 and "Y" is provided in the step S5), a G data transfer ending process is executed. Otherwise (i.e., when "N" is provided in the step S1 and "N" is provided in the step S5), a B data transfer ending process is executed.

When the R data transfer ending process is to be executed (i.e., when it is found in the step S1 that the T flag is "0"), the transfer is ended by setting the R data transfer permit signal RMTE to "1" (i.e., setting RMTE=1 in a step S2). At this instant, one frame image data has been transferred, and the image data in the R data frame memory 8-R has already been ineffective. Thus, the RM flag with respect top the frame memory 8-R is set to "0" (step S3). Subsequently, the T flag defining the color of the next process is set to a value corresponding to the color (step S4), thus bringing an end to the routine.

As described above in connection with FIGS. 10 to 12, when the RM, GM and BM flags provided for the frame memories 8-R, 8-G and 8-B are "1", the image data in their own frame memories are effective, and when they are "0", new data can be written in their own memories. The RM, GM and BM are updated when the pertinent image data have been transferred. The VD signal appears as the end of one image frame. At this time, a check as to whether the image data can be written in a frame memory is made with reference to the pertinent flag as described before. This means that the end of a data writing process is always set to the start of one image frame, and the state of the data writing process is not changed during the image frame. Thus, the image data with different time axes can not coexist in one image frame.

Without possibility of the coexistence of image data with different time axes in one image frame, it is possible to ensure natural display of images.

Figure 13:
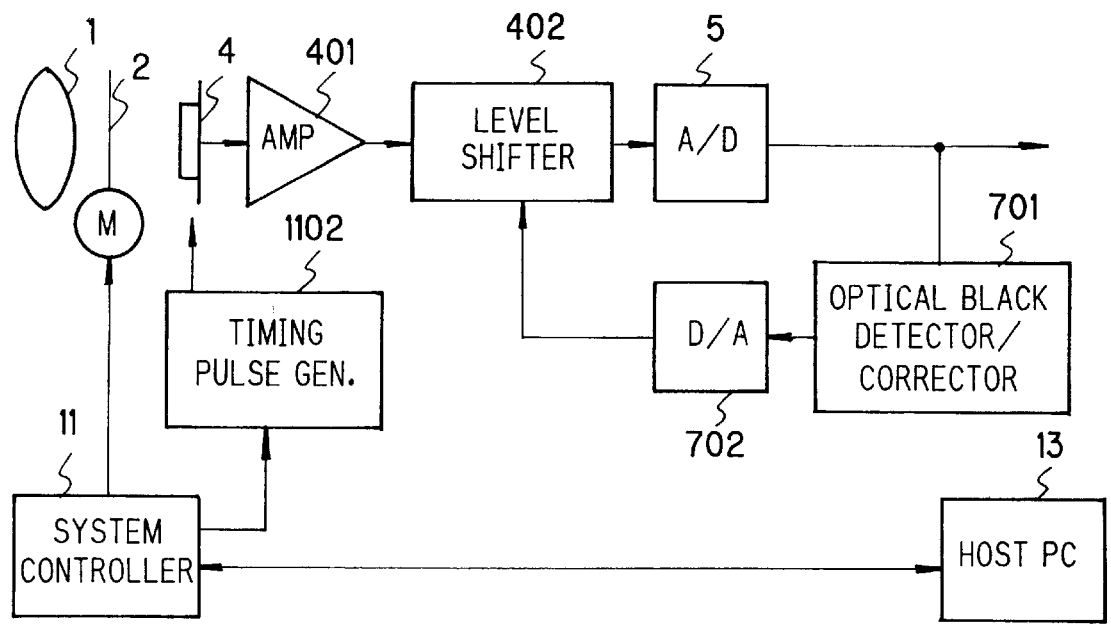
FIG. 13 is a block diagram showing a usual system of the type pertaining to the system according to the invention.
Figure 55:
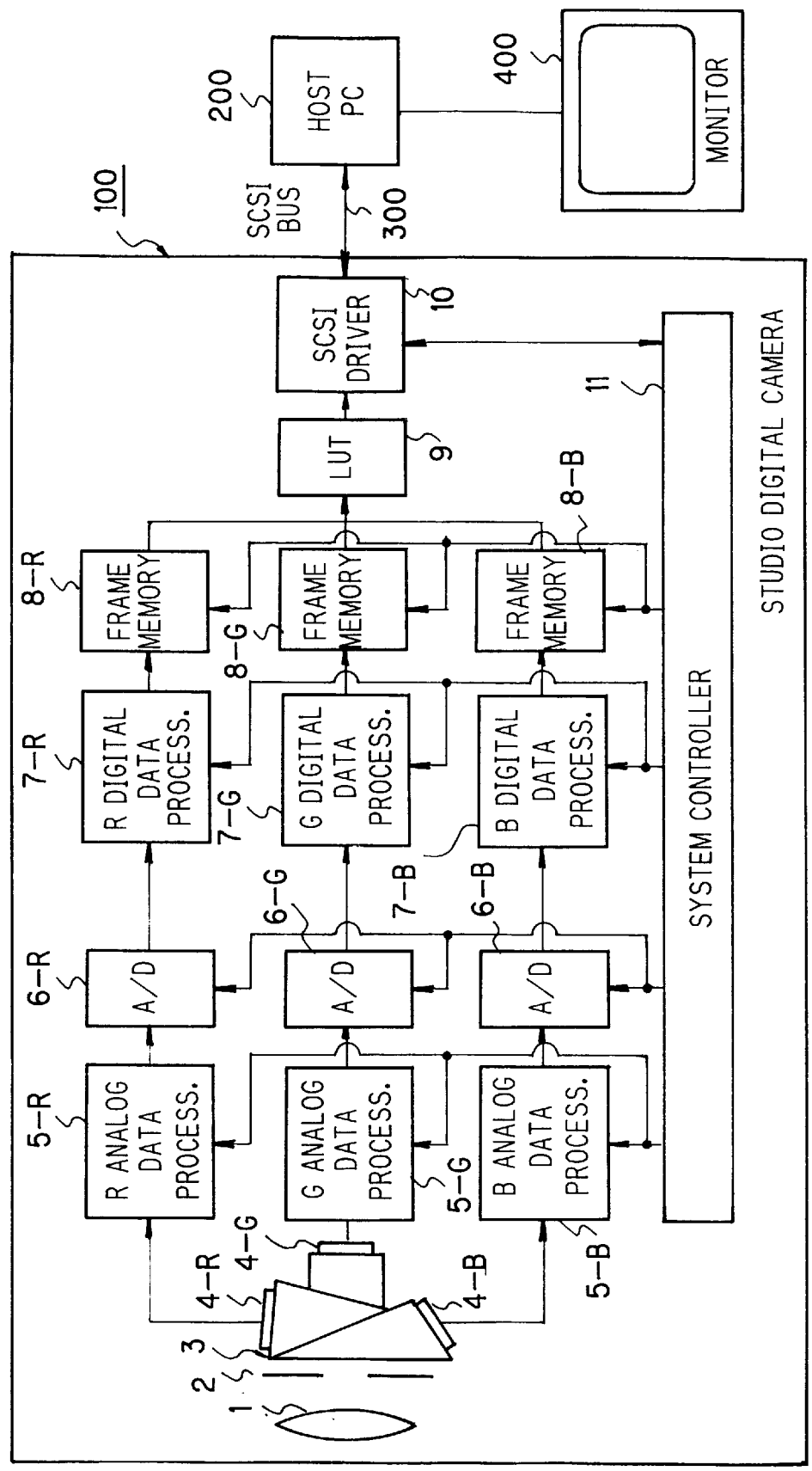
FIG. 55 is a block diagram showing the construction of a studio digital camera as an example of the pertinent prior art image sensor.

FIG. 13 is a block diagram showing a usual system of the type pertaining to the system according to the invention. In the figure, parts corresponding to those in FIGS. 55 and 1 are designated by like reference numerals. A shutter 2 is opened when a host PC 13 sets a view-finder mode in a system controller 11, the view-finder mode being such that a solid-state image sensor element output, i.e., a photoelectric conversion output, is read out at a relatively high rate to continuously derive relatively low fineness output image data. When the shutter 2 is opened, the light transferred through a lens 1 is focused as a light image on the photoelectric surface of a solid-state image sensor element 4.

When the view-finder mode which is set in the system controller 11 for continuously obtaining the output image data at a relatively high rate is a mode for reading thinned-down pixels in the solid-state image sensor element 4, the system controller 11 controls a timing pulse generator 1102 to generate a thinning-down read drive pulse signal.

The solid-state image sensor output which is obtained by such thinned-down pixel reading, is gain controlled in an amplified 401 and then supplied to a level shifter 402. The level shifter 402 shifts the DC level of the input according to compensating data from an OB (optical black) level detector/corrector 701 such that its output supplied as input to an A/D converter 5 is properly in a dynamic range thereof, i.e., that the OB level of the input to the A/D converter 5 is coincident with a lower set limit of the A/D conversion. The OB level detector/corrector 701 which receives the output of the A/D converter 5, detects a component of the output of the solid-state image sensor element 4 corresponding to the OB. The OB level detector/corrector 701 outputs the digital data as a detection output, which is converted in a D/A converter to analog data which is supplied as a level shift amount control signal to the level shifter 402.

It will be seen that the level shifter 402, the A/D converter 5, the OB detector/corrector 701 and the D/A converter 702 together form a feedback system. This feedback system provides a control to make the digital data level of the detection output of the OB level detector/corrector 701 to be coincident with a desired level close to video signal zero level and thus stabilize the black of video.

Figure 14:
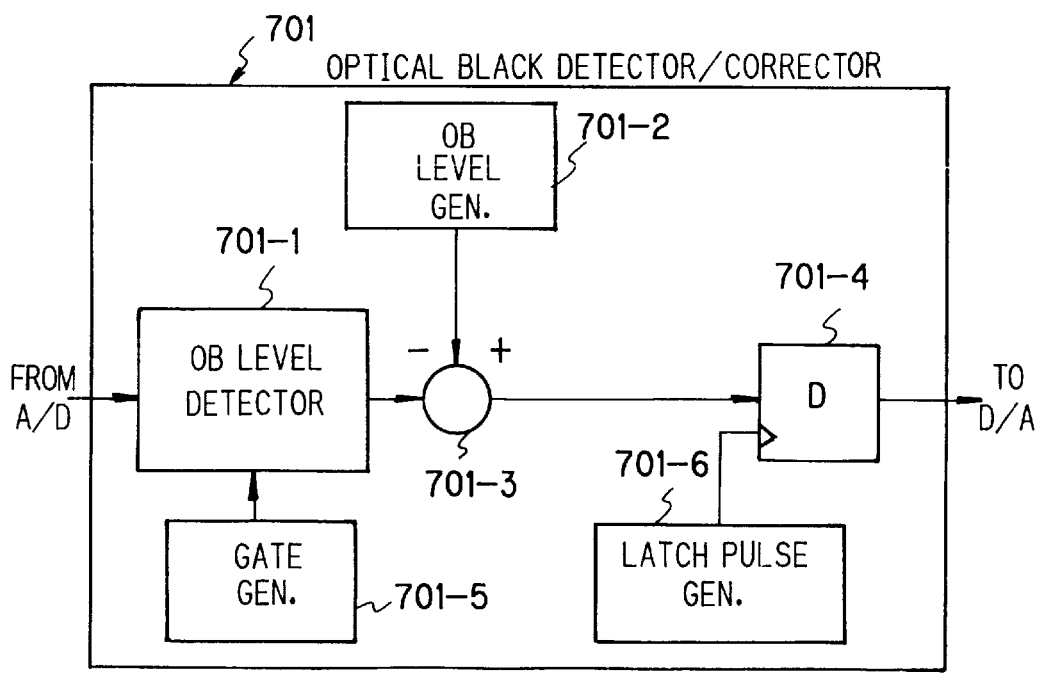
FIG. 14 is a block diagram showing the internal construction of the OB level detector/corrector 701 shown in FIG. 13.

FIG. 14 is a block diagram showing the internal construction of the OB level detector/corrector 701 shown in FIG. 13.

The digital video output of the A/D converter 5 shown in FIG. 13 is inputted to an OB level detector 701-1. To the OB level detector 701-1 is supplied a gate pulse output from a gate pulse generator 701-5 for extracting the output of the solid-state image sensor element 4 during time intervals corresponding to the OB portions. This gate pulse signal permits the average level of signal portions corresponding to the OB to be detected as detected OB level from the digital video signal input noted above.

The detected OB level is supplied as a negative input to a subtracter 701-3 and subtracted from a desired OB level signal supplied from a desired OB level generator 701-2 as a positive input to the subtracter 701-3 to provide the difference between the desired and detected OB levels. This difference is latched in a latch 701-4 at the timing of a latch pulse, which is provided in the field cycle from a latch pulse generator 701-6. The output of the latch 701-4 is the output of the OB level detector/corrector 701. In other words, the output of the OB level detector/corrector 701 is updated in the field cycle as the difference between the desired OB level provided as a reference level from the desired OB generator 701-2 and the level of the output of the solid-state image sensor element 4 during an interval corresponding to an OB area.

In the usual system shown in FIG. 13 as described above, when the view-finder mode that is set is a mode for reading thinned-down pixels of the solid-state image sensor element 4, like the case of obtaining the usual dynamic image output, the solid-state image sensor is always driven, and the exposure time is fixed in correspondence to the driving rate. In this state, the above control for stabilizing the black level by deriving the detected OB is made.

Figure 15:
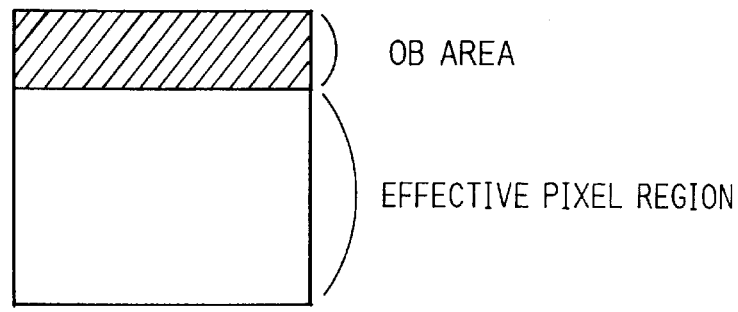
FIG. 15 is a view showing the array of photoelectric element pixels in the solid-state image sensor element used in the system shown in FIG. 13.

FIG. 15 is a view showing the array of photoelectric element pixels in the solid-state image sensor element used in the system shown in FIG. 13. The upper shaded area of the effective pixel region as shown, is the OB area.

Figure 16:
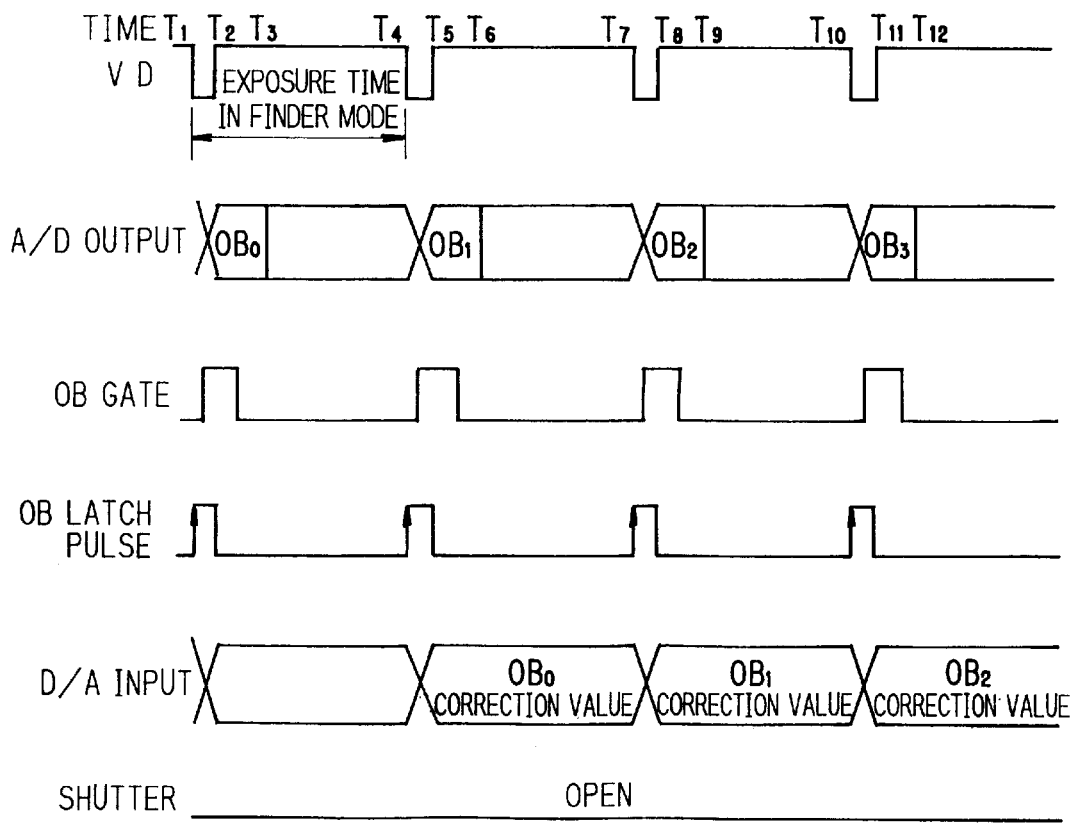
FIG. 16 is a timing chart illustrating the operation of the system described before with reference to FIGS. 13 to 15.

FIG. 16 is a timing chart illustrating the operation of the system described before with reference to FIGS. 13 to 15.

In the figure, labeled VD is the vertical sync signal. The first VD pulse falls at instant t1 and rises at instant t2. The interval between adjacent falls or rises, for instance the interval between instants t1 and t4, is one field cycle. Labeled A/D OUTPUT is the digital video output supplied in field cycles from the A/D converter 5. A portion from the outset instant t2 to t3 (as well as a portion from t5 to t6, a portion from t8 to t9, and so forth) is the OB portion. A portion from t3 to t4 (as well as a portion from t6 to t7, a portion from t9 to t10, and so forth), succeeding the OB portion, is the effective image portion.

The OB portion in each field is extracted by a gate pulse (labeled OB GATE) from the gate pulse generator 701-5 described before in connection with FIG. 14. The difference of the detected OB level thus extracted from the desired OB level (labeled CORRECTED OB VALUE), is latched in each field at the instant t4 (t7, t10, etc.) of the approximate end of each field, i.e., at the timing of the rising of a latch pulse (labeled OB LATCH PULSE) from the latch pulse generator 701-6. During the operation in the view-finder mode noted above, the shutter 2 is always held open to drive the solid-state image sensor element 4 in the exposed state and in the thinning-down mode noted above in order to maintain as high field rate as possible.

The signal charge accumulation time (labeled VIEW-FINDER MODE EXPOSURE TIME) of the solid-state image sensor element 4 is the exposure time noted before, i.e., a portion from t1 to t4 (as well as from t4 to t7, from t7 to t10, and so forth), and the amount of dark charge in the OB portion is dependent on this time.

Figure 17:
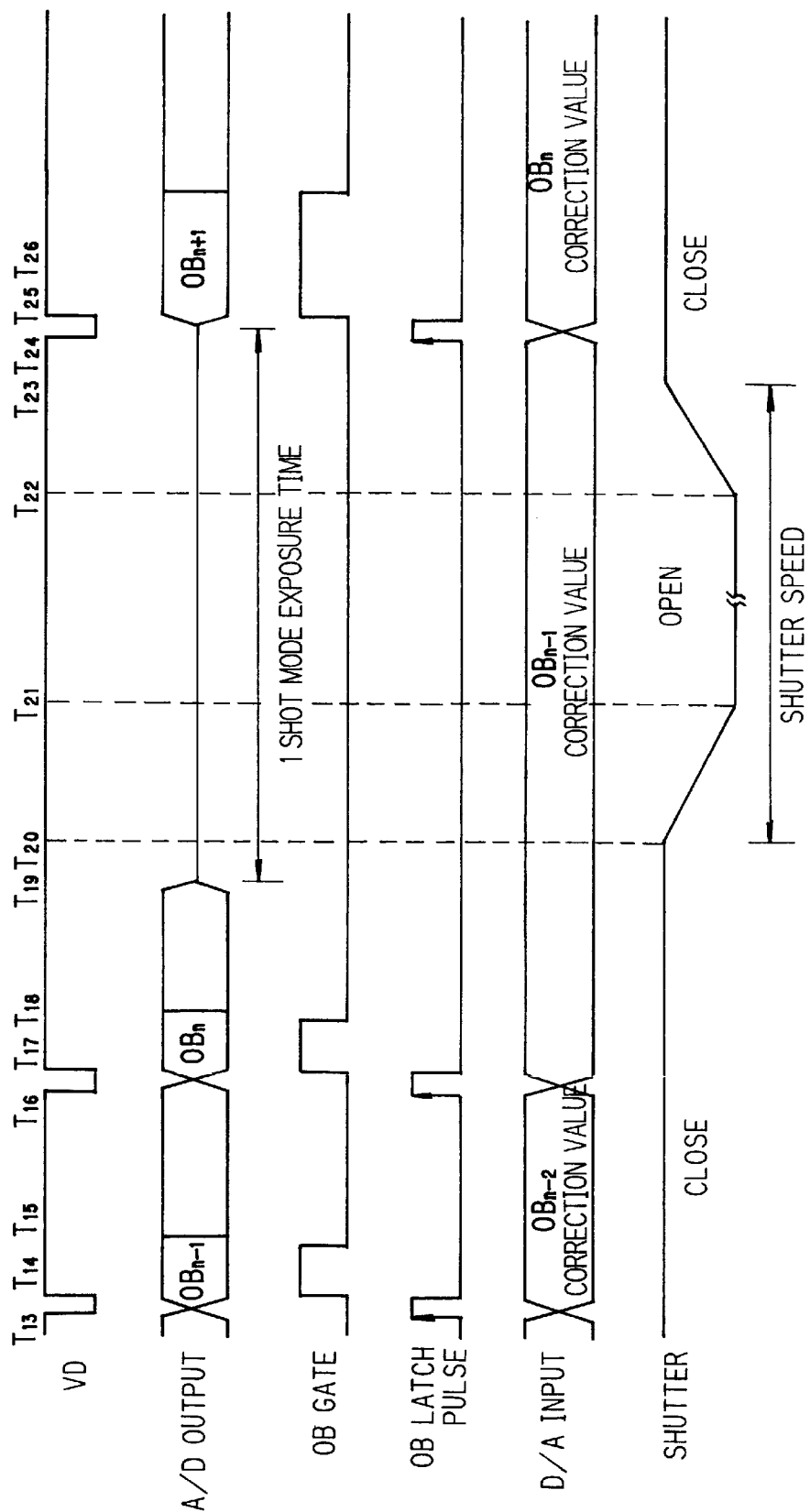

FIG. 17 is a timing chart illustrating the operation of the system described before in connection with FIGS. 13 to 15 when the view-finder mode shown in FIG. 16 is switched over to a one-shot mode for still photography or the like. In FIG. 17, signals labeled by VD, A/D INPUT, OB GATE, OB LATCH PULSE, and D/A INPUT (CORRECTED OB VALUE) are like those in FIG. 16.

The shutter 2 is once closed at the time of the switching of the operation shown in FIG. 16 over to the operation over to FIG. 17 caused by the setting of the still photography mode (or one-shot mode) in the system controller 11 from the host PC 13. The same operation as in the case of FIG. 16 is executed initially up to instant t16 except for that the shutter 2 is closed.

After one frame image data has been read out by the thinned-down pixel reading from the solid-state image sensor element 4, the signal charge transfer therefrom is interrupted at instant t19. At subsequent instant t19, the shutter 2 which has been held closed at instant t20, turns to be opened in response to a command from the system controller 11, and is completely opened at instant t21. At subsequent instant t22, the shutter 2 in the completely open state turns to be closed in response to a command from the system controller 11, and completely closed again at instant t23. At instant t25 subsequent to the complete closing of the shutter 2, the reading of image data stored during the exposure time, during which the shutter was "on", is started. The time interval from instant t19 till instant t24, including the time interval from instant t20, from which the shutter 2 turns to be opened, till instant t23, at which the shutter is completely closed, is the exposure time in the still photography mode (labeled ONE-SHOT MODE EXPOSURE TIME).

In the operation shown in FIG. 16 (view-finder mode) described above, the exposure time is from t1 to t4 (as well as from t4 to t7, from t7 to t10, and so forth). As is seen, the view-finder mode and the still photography mode are different in the exposure time.

Since the accumulated OB dark charge is dependent on the exposure time, OBn+1 and OBn are different in level. The detected OB level is substantially fixed from OBo to OBn because of the fixed exposure time provided by the continued view-finder mode. As described before in connection with FIG. 13, this detected OB level is converged by the feedback system to a level close to the desired OB level set by the desired OB level generator 701-2 shown in FIG. 14.

However, OBn+1 in the time interval from instant t25 to instant t26 right after the end of the one-shot mode exposure time shown in FIG. 17, corresponds to an exposure time which is different from the previous ones, and hence it usually takes a different level from the previous detected OB levels up to OBn. When such a change in OBn to the different level of OBn+1 after becoming steady up to OBn is caused in the operation shown FIG. 13 (view-finder mode), the level of OBn+1 may be more apart from the desired level. This may result in commonly termed floated black image which is detested.

To cope with this problem, it is conceivable to switch the view-finder mode over to the still photography mode as follows. During a period from instant t16 till instant t24 in FIG. 17, the detected OB level in the still photography mode is controlled by pseudo repeated feedback control, and actual exposure is made for the still photography when a steady detected OB level is obtained. This method, however, dictates sacrifice of the fast operation of the electronic imaging apparatus (or camera).

Figure 18:
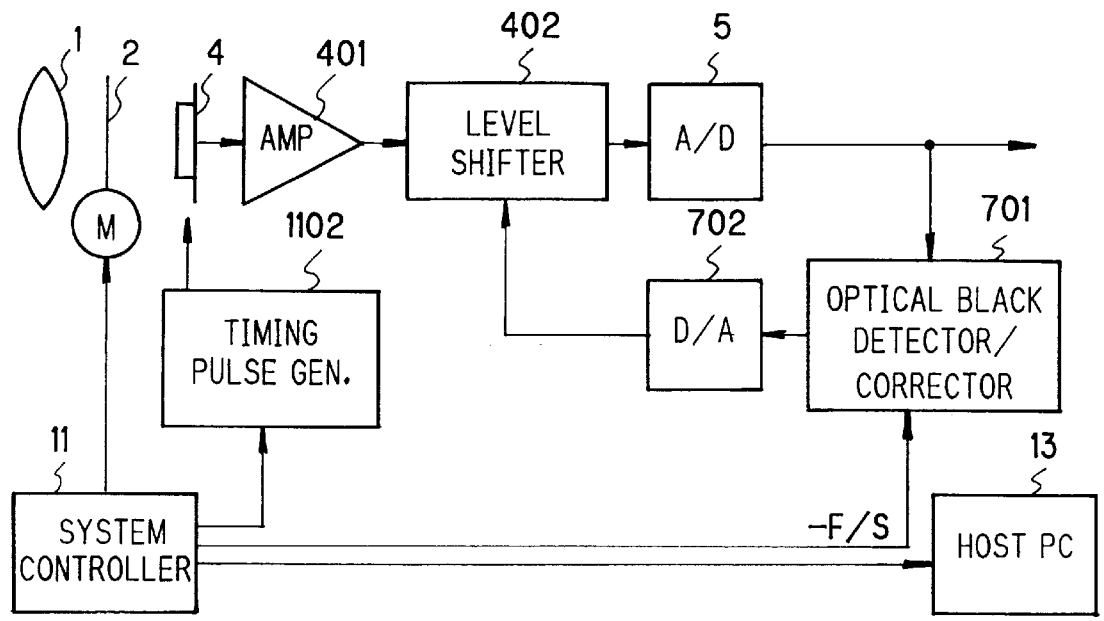
FIG. 18 is a block diagram showing one form of the invention which can solve the above problem in the usual electronic imaging apparatus of the pertaining type as described before in connection with FIGS. 13 to 17.

FIG. 18 is a block diagram showing one embodiment of the invention which can solve the above problem in the usual electronic imaging apparatus of the pertaining type as described before in connection with FIGS. 13 to 17.

In FIG. 18, parts like those in FIG. 13 are designated by like reference numerals. The system shown in FIG. 18 is the same as the system shown in FIG. 13 except for that its OB level detector/corrector 701 can receive a discrimination signal from the system controller 11. The discrimination signal –F/S is for discriminating the view-finder mode or the still photography mode as the prevailing operating mode. The expression –F means F (designating the view-finder mode) is of negative logic.

In the system shown in FIG. 18, the OB level detector/corrector 701 can recognize, from the discrimination signal –F/S from the system controller 11, that the shutter speed (or exposure time) has been changed by the switching of the view-finder mode over to the still photography mode.

Figure 19:
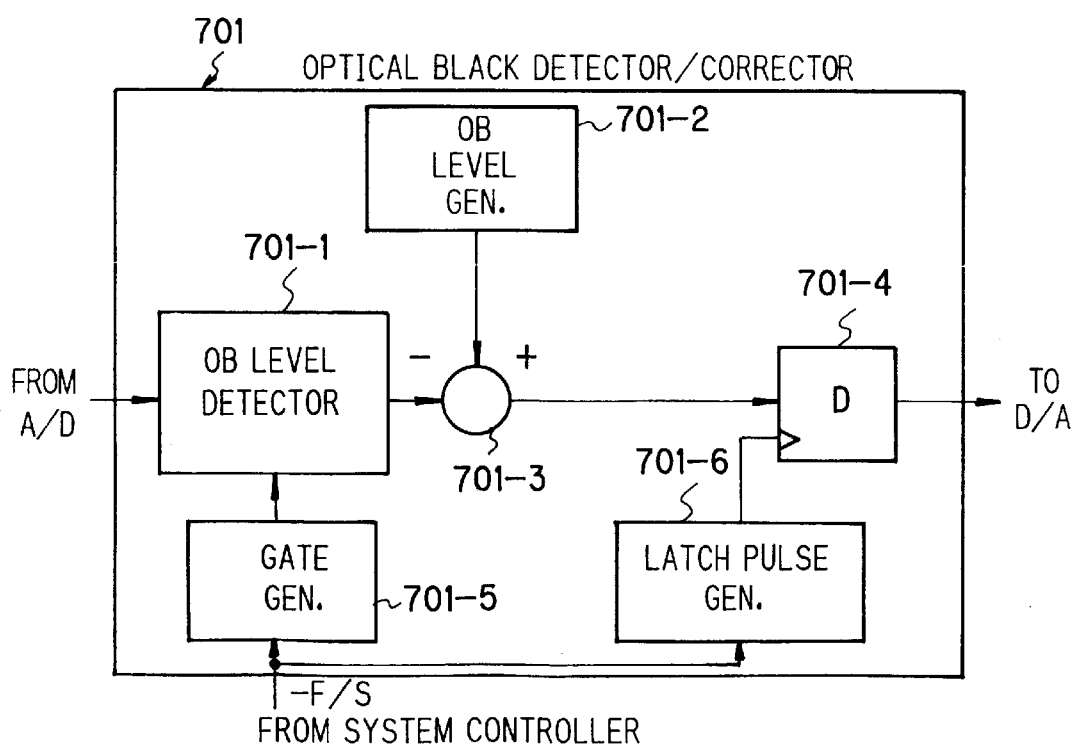
FIG. 19 is a block diagram showing the inner construction of the OB level detector/corrector 701 in the system shown in FIG. 18.

FIG. 19 is a block diagram showing the inner construction of the OB level detector/corrector 701 in the system shown in FIG. 18. In FIG. 19, parts like those in FIG. 14 are designated by like preference numerals or symbols. The circuit shown in FIG. 19 is the same as the circuit shown in FIG. 14 except for that it can receive a control signal –F/S from the system controller 11, that is, the above discrimination signal –F/S can be inputted to a gate pulse generator 701-5 and also to a latch pulse generator 701-6. In the circuit shown in FIG. 19, the timings of output pulses from the gate pulse generator 701-5 and the latch pulse generator 701-6 are selected according to the control signal –F/S.

Figure 20:
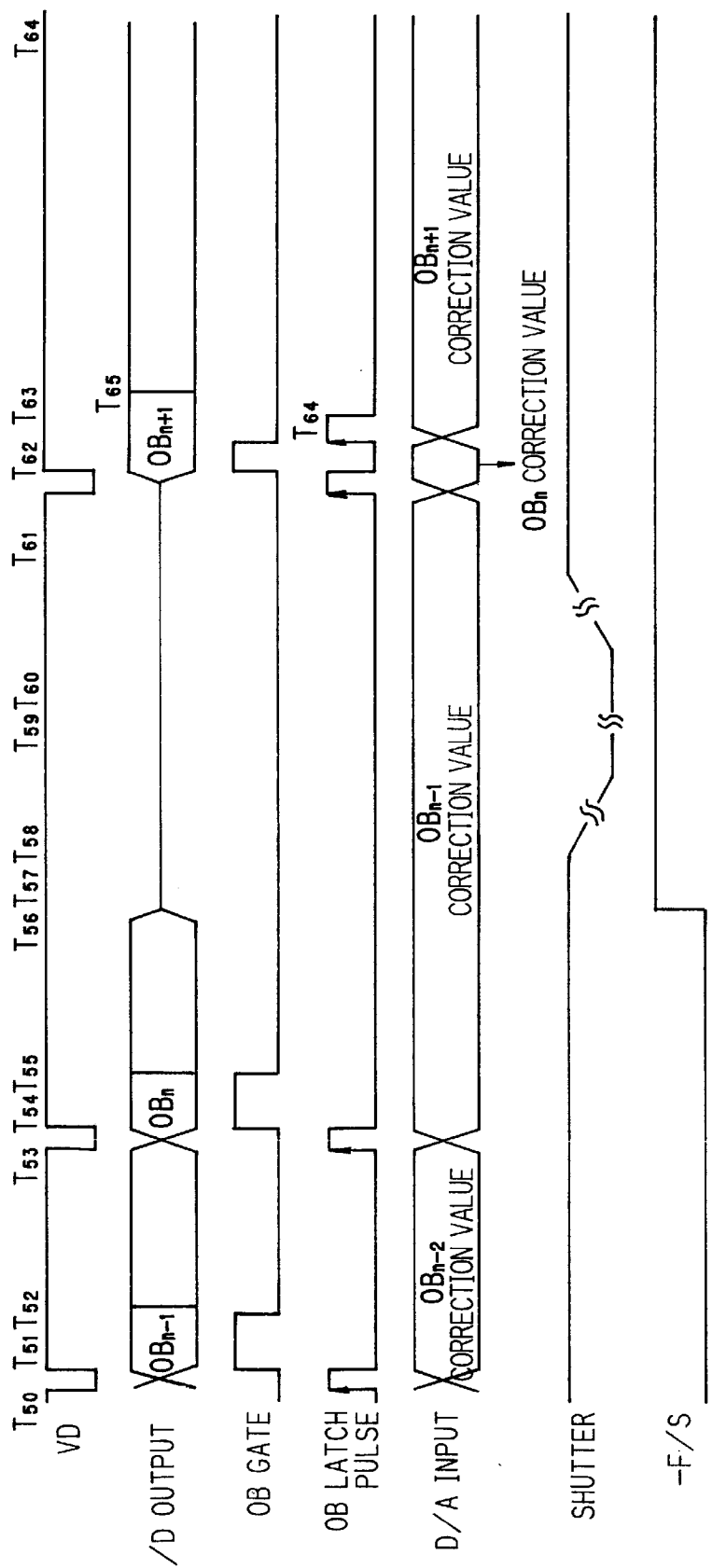
FIG. 20 is a view similar to FIG. 17 but showing the operation of the system shown in FIGS. 18 and 19 when the view-finder mode is switched over to the one-shot mode.

FIG. 20 is a timing chart similar to FIG. 17 but showing the operation of the system shown in FIGS. 18 and 19 when the view-finder mode is switched over to the one-shot mode. In FIG. 20, signals like those in FIGS. 16 and 17 are labeled likewise. Labeled –F/S is the discrimination signal from the system controller 11. The expression –F means that F (designation of the view-finder mode) is of negative logic.

Up to instant t56, the detected OB level, i.e., the black in image, has been made steady through its repeated feedback control by reading the image data by thinned-down pixel reading from the solid-state image sensor element in the view-finder mode. From instant t54 till instant t56, the detected OB level of OBn approaches the desired level owing to the function as described before in connection with FIG. 17.

After one frame image data has been read out by thinned-down pixel reading from the solid-state image sensor element 4, the signal charge transfer therefrom is interrupted at instant t56. At subsequent instant t57, the shutter 2 having been held closed turns to be opened in response to a command from the system controller 11, and is completely opened at instant t58. At instant t59, the shutter 2 having been held completely open turns to be closed in response to a command from the system controller 11, and is completely closed at instant t60. At subsequent instant t61, the reading of image data stored during the exposure period, during which the shutter was "on", is started. The time interval from instant t56 till instant t60, including the time interval from instant t57 of the turning of the shutter 2 to be opened till instant t60 when the shutter is completely closed, is the exposure time in the still imagery mode.

At subsequent instant t61, an OB latch pulse is outputted, whereby a correction value of OBn which has gained a steady level up to this moment, is outputted. Owing to a function like that described before in connection with FIG. 17, the correction value of OBn substantially requires no correction; for instance, it is "0" or "1".

However, during a period from instant t62 till instant t63, OBn+1 which is based on dark charge in the exposure time in the still imagery mode, is changed from the previous OB level in correspondence to the difference of the exposure time.

During the period from t62 till t63, the OB level is detected and latched in the latch 701-1 shown in FIG. 9 under control of an OB gate pulse. During this time, the difference of OBn+1, i.e., the correction value of OB, outputted to the A/D converter 702 shown in FIG. 18 under control of an OB latch pulse. In this way, the correction data is obtained which is the difference of the present OB level from the desired level. This correction data is converted in the D/A converter 702 shown in FIG. 18 into analog data and supplied to the level shifter 402. At this moment, the image data is level corrected for the actual float from black before it is inputted to the A/D converter 5. In the above operation, the OB level is corrected with respect to the float (from the desired level) during the period from instant t63 till instant t65 by the function of the feedback system, and subsequent to instant t65 satisfactory image data free from float from black can be obtained.

In one viewpoint, the operation of the system shown in FIGS. 18 and 19, which has been described above in connection with FIG. 20, is summarized as follows. The OB level detection is corrected in different ways in the view-finder mode and in the still photography mode. In the view-finder mode, it is corrected to an adequate level through a feedback control according to its difference from a desired level. In the still photography mode, the detected OB level in a field in which the switching is caused, is made up for with respect to its level difference from the following effective pixel part in that field.

Figure 21:
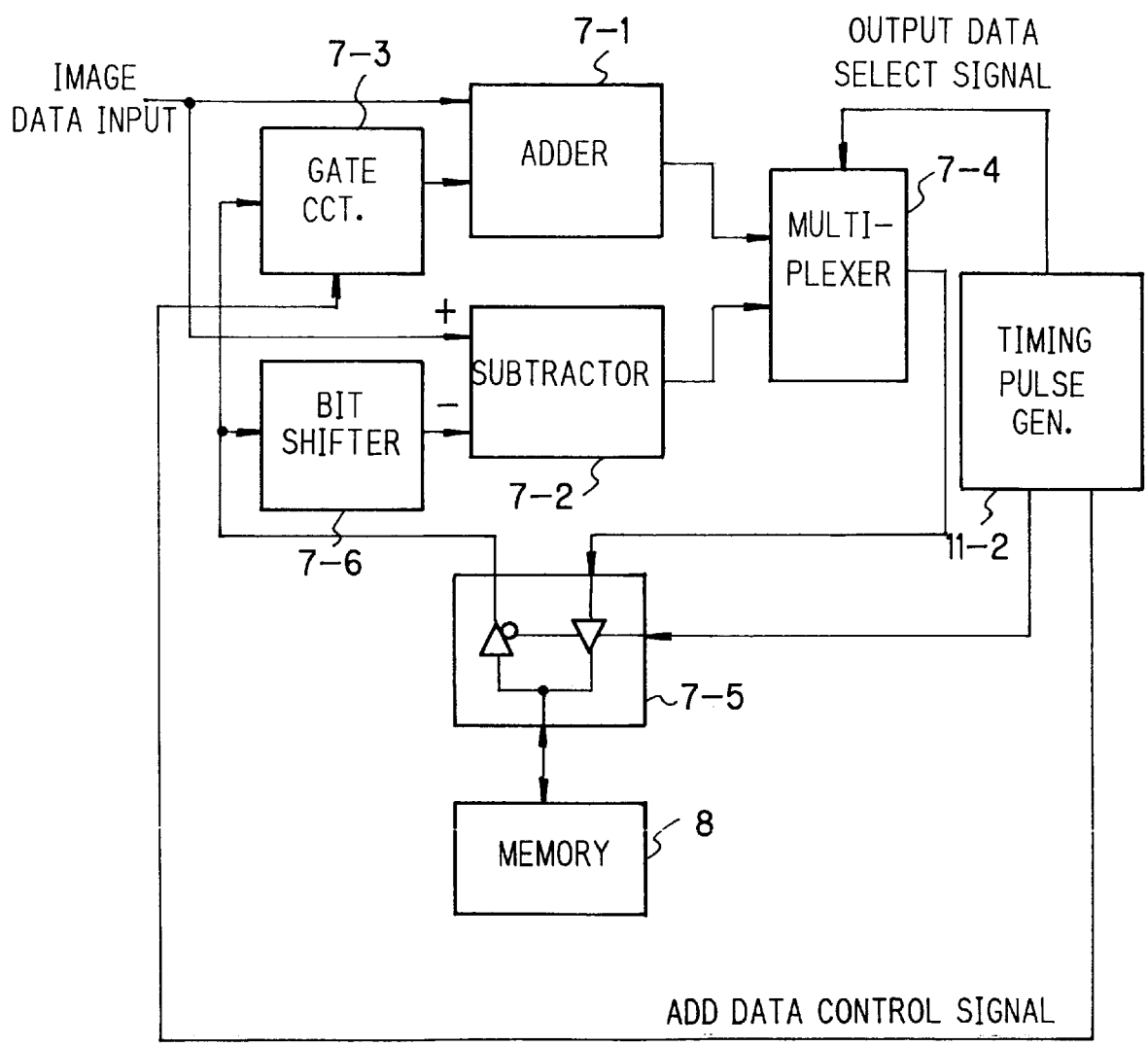
FIG. 21 is a block diagram showing the general construction of electronic imaging apparatus system pertaining to the invention, which is able to remove FPN in the view-finder mode.

FIG. 21 is a block diagram showing the general construction of electronic imaging apparatus system pertaining to the invention, which is able to remove FPN in the view-finder mode.

In the system of FIG. 21, the dark image data of the output of the image element in the light-blocked state are read out a plurality of times and accumulated. The accumulated value is subtracted from the exposed image data read out corresponding to following exposure for the cancellation of the FPN.

The construction and function of the system shown in FIG. 21 will now be described in conjunction of the operation of the system in the still photography mode. In this mode, the dark image data, i.e., the light-blocked state image data, is supplied as the sensor element output through an image data input line to an adder 7-1. The output of the adder 7-1 is supplied through a subsequent multiplexer 7-4 and also through a subsequent bi-directional data switch 7-5 and written in a memory 8. The above sequence of operations is executed repeatedly to accumulate the dark image data a plurality of times. Specifically, the dark image data having been written in the memory 8 is read out upon arrival of the next dark image data, and is supplied through a gate circuit 7-3 to the adder 7-1 for addition to the next dark image data noted above.

The first and second dark image data are thus added together. This sum data is written again in the memory 8. The memory 8 is operated bi-directionally, that is, the data is written in the memory 8 while the data is read out therefrom. This means that one pixel cycle is effected at double the operation speed compared to the uni-directional operation. Exposed state image data which appears subsequently, is supplied to a positive input terminal of a subtracter 7-2. The accumulated dark image data in the memory 8 noted above, is effectively divided through a bit shifter 7-6 and then supplied to a negative input terminal of the subtracter 7-2 for subtraction from the exposed state image data supplied to the positive input terminal.

The effective division in the bit shifter 7-6 is to down-shift the accumulated dark image data, obtained as a result of accumulation four times, for instance, by two bits. The difference data obtained in the subtracter 7-2, obtained as a result of the bit matching noted above, is selectively passed through the bi-directional multiplexer 7-4 and written in the memory 8. The above sequence of operations is executed in the still photography mode. In connection with this sequence of operations, the multiplexer 7-4 is controlled by an output data select signal from a timing pulse generator 11-2. The timing pulse generator 11-2 also generates an add control signal for controlling the switching of the gate circuit 7-3.

Figure 22:
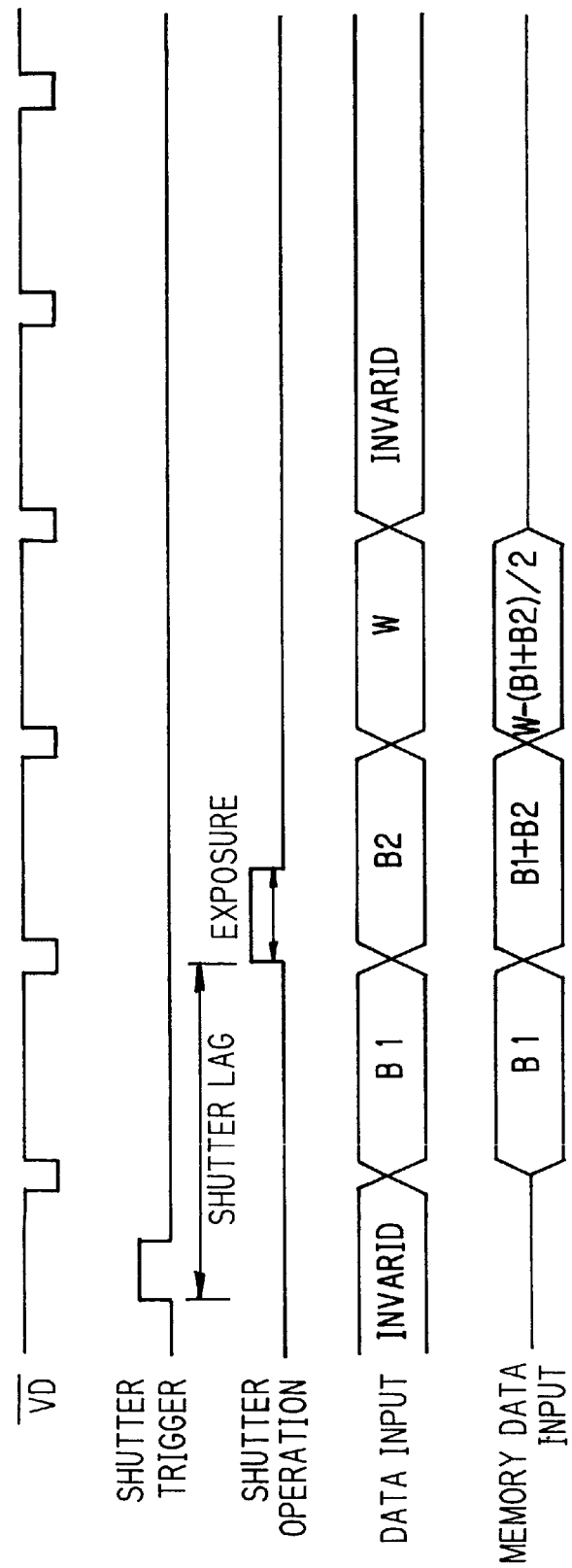
FIG. 22 is a timing chart for sequentially describing the operation of the system shown in FIG. 21 in the still photography mode.

FIG. 22 is a timing chart for sequentially describing the operation of the system shown in FIG. 21 in the still photography mode. The system is operated in synchronism with vertical sync signal VD. In the still photography, upon a shutter trigger the photography of dark image is started from the next VD. In this example, the light-blocked state photography is executed twice for the dark image data accumulation. Upon appearance of VD for the first time after the shutter trigger switch operation, dark image data B1 corresponding to the light-blocked state photography, as labeled DATA INPUT in FIG. 22, appears on an image data input line. In synchronism to the next VD, dark image data B2 corresponding to the light-blocked state photography appears on the image data input time.

In FIG. 22, Labeled MEMORY DATA INPUT is data written in the memory 8 in FIG. 21. The additional result of the adder 7-1 and the subtract result of the subtracter 7-2 are written in the memory 8 as the memory data input. The dark image data B1 which has appeared as DATA INPUT on the image data line in synchronism to the first or previous VD, is directly written through the adder 7-1 and so forth in the memory 8. The dark image data B2 appearing on the image data input line in synchronism to the next VD, is added in the adder 7-1 to the preceding dark image data B1, and the resultant sum data (B1+B2) is written in the memory 8. When the sum data (B1+B2) has been written in the memory 8, exposed state image data W appears on the image data input line. The exposed state image data W is inputted to the positive input terminal of the subtracter 7-2. In the subtracter 7-2, the average (B1+B2)/2 of the sum data (B1+B2) noted above, supplied to the negative input terminal, is subtracted from the data W. The resultant difference data W−(B1+B2)/2, which has now been corrected with respect to FPN, is written again in the memory 8. The average (B1+B2)/2 of the sum data (B1+B2) is obtained from the bit shifter 7-6.

Figure 23:
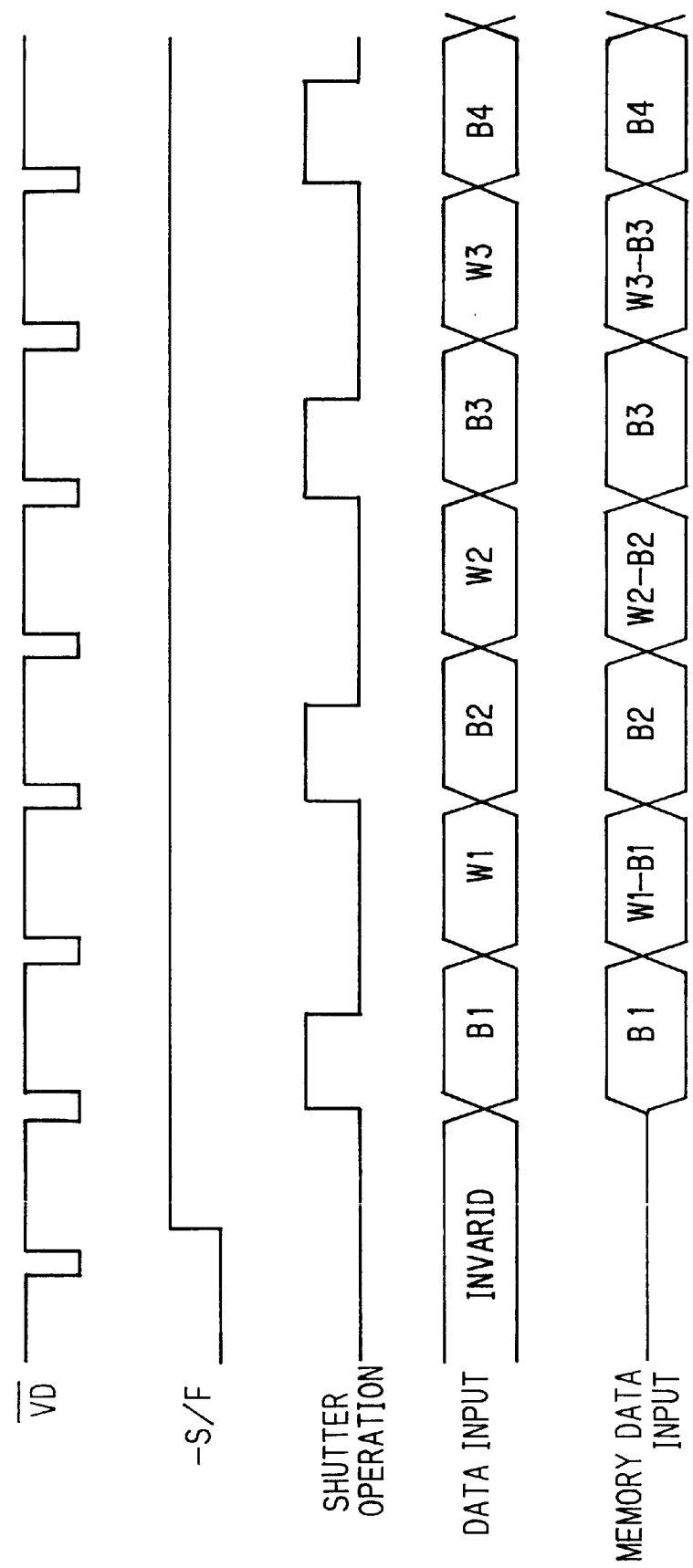
FIG. 23 is a timing chart for sequentially describing the operation of the system shown in FIG. 21 in the view-finder mode.

FIG. 23 is a timing chart for sequentially describing the operation of the system shown in FIG. 21 in the view-finder mode. Like FIG. 22, VD labels the vertical sync signal. Labeled −S/F is a discrimination signal for discriminating whether the prevailing operation mode is the view-finder mode or the still photography mode. The expression −S means that S (designating the still photography mode) of negative logic. Labeled SHUTTER OPERATION is the state of the shutter, the "on" state thereof being shown by the raised level. Labeled DATA INPUT is the image data appearing in the image data input line in FIG. 21 and MEMORY DATA the memory data input to be written in the memory 8.

The system controller recognizes the prevailing operation mode to be the view-finder mode or the still photography mode on the basis of the state of a mode switch which is monitored. That is, on the basis of this recognition, the system controller generates the discrimination signal −S/F. When the discrimination signal −S/F becomes "high" in level, the view-finder mode is designated, whereupon the view-finder mode operation as shown in FIG. 23 is brought about. In this case, data INPUT DATA before the shutter is opened for the first time is invalid data (as labeled INVALID). Upon appearance of the second VD as shown, the shutter is opened, and at the timing of the succeeding VD the dark image data B1 appears as INPUT DATA. In the view-finder mode, no dark image data is accumulated in order to eliminate delay time, and the exposed state image data W1 appears at the timing of VD succeeding the dark image data B1.

In SHUTTER OPERATION as shown, the shutter is repeatedly held "on" or "off" for a predetermined time period for every two VD periods, whereby the dark image data and exposed state image data are outputted as alternate data B2, W2, B3, W3, . . . Like the case described before in connection with FIG. 22, as MEMORY DATA INPUT the initial dark image data B1 is directly written in the memory 8, and in the next VD period difference data (W1−B1), which is obtained as a result of the subtraction of the dark image data B1 from the exposed state image data W1 in the subtracter 7-2, is written in the memory 8. Likewise, data B2, (W2−B2), B3, (W3−B3), B4, . . . are written alternately in the memory B. As is seen, the operation is the repetition of the sequence of taking dark (or black) image data and then taking exposed state (or white) image data. This means that it is possible to take out FPN corrected image data only for one half of the total time elapsed, thus imposing a limitation on the rate of transfer of image data to the host PC for display on the view-finder (i.e., monitor), i.e., the rate of image display on the monitor.

Figure 24:
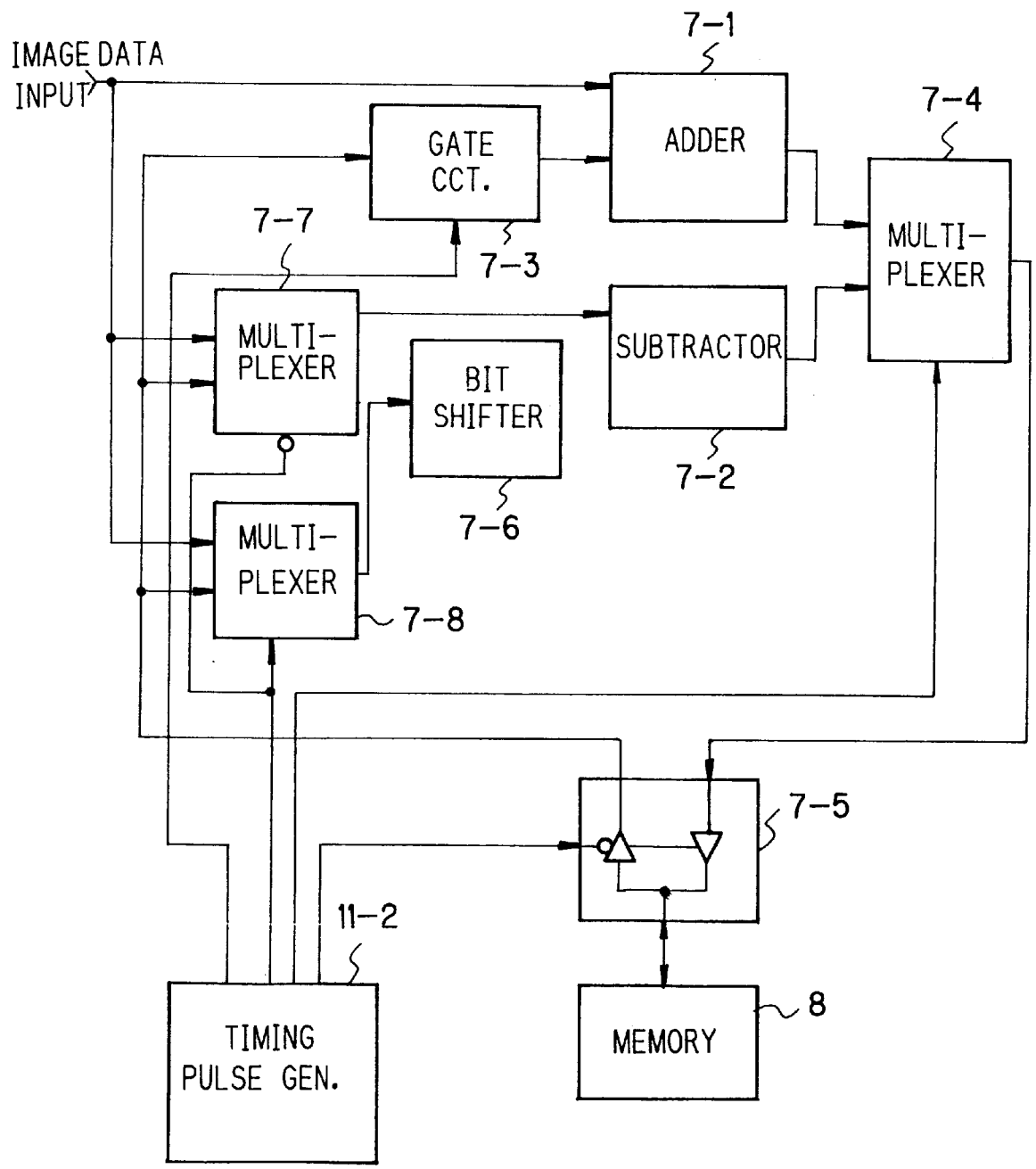
FIG. 24 is a block diagram showing an embodiment of the invention, which can improve the output rate of the system described before with reference to FIGS. 21 to 23.

FIG. 24 is a block diagram showing an embodiment of the invention, which can improve the output rate of the system described before with reference to FIGS. 21 to 23.

In this system, the image data input line is branched into three lines, one led directly to one input terminal of an adder 7-1, another led through a multiplexer 7-7 to the positive input terminal of a subtracter 7-2, and the remaining one led through a multiplexer 7-8 and a bit shifter 7-6 to the negative input terminal of the subtracter 7-2. The outputs of the adder 7-1 and subtracter 7-2 are led to the input terminals of the multiplexer 7-4, and the output thereof is supplied to the memory 8 through a bi-directional data switch 7-5.

The memory 8 is connected to the bi-directional data switch 7-5, the output side of which is branched into three branches, one led through a gate circuit 7-3 to the one input terminal of the adder 7-1, another led through the multiplexer 7-7 to the positive input terminal of the subtracter 7-2, and the remaining one led through the multiplexer 7-8 and the bit shifter 7-6 to the negative input terminal of the subtracter 7-2. The signal select or on-off operations of the gate circuit 7-3, the multiplexers 7-7 and 7-8, a further multiplexer 7-4, and the bi-directional data switch 7-5, are controlled by control pulses from a timing pulse generator 11-2.

The system shown in FIG. 24 is operable such that exposed state image data is taken first in the still photography mode, while dark (i.e., light-blocked state) image data is taken first in the view-finder mode.

Figure 25:
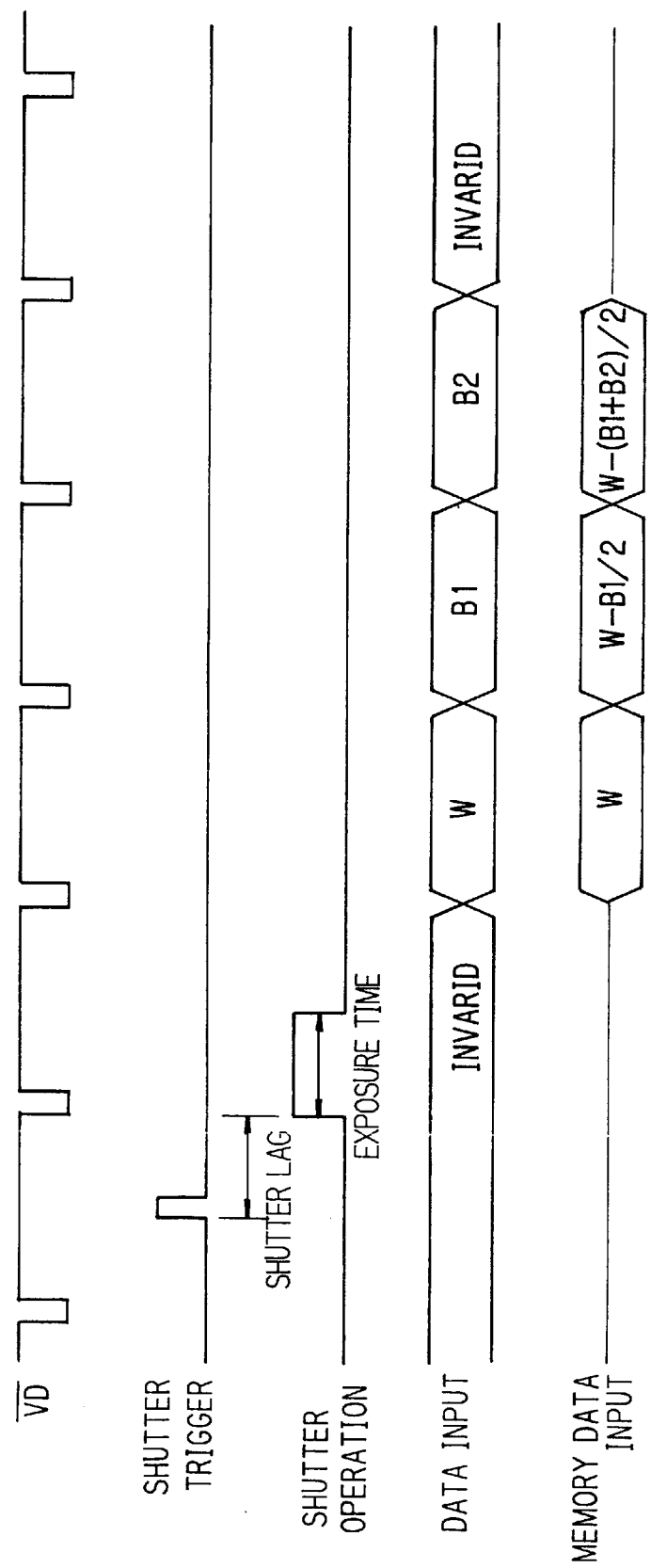
FIG. 25 is a timing chart illustrating the above operation of the system shown in FIG. 24 as sequential operation.

FIG. 25 is a timing chart illustrating the above operation of the system shown in FIG. 24 as sequential operation. In FIG. 25, like FIG. 22, VD labels the vertical sync signal, SHUTTER TRIGGER labels the state of a shutter trigger switch, with the raised level representing the "on" state, SHUTTER OPERATION labels the shutter state, with the raised level representing the "on" state, DATA INPUT labels image data appearing from the image data input line, and MEMORY DATA INPUT labels data written in the memory 8. The operation of the system shown in FIG. 24 will now be described with reference to this timing chart.

In the still photography mode, the exposed state image data is taken first to avoid delay in the photographing operation. Specifically, the exposed state image data W appearing as MEMORY INPUT from the image data input line at the outset of the still photography mode, is supplied through the adder 7-1 and the multiplexer 7-4 and written as MEMORY DATA INPUT W in the memory 8. A plurality of successive dark image data to be accumulated appear as DATA INPUT data B1 and B2 on the image data input line. The plurality of successive dark image data are accumulated via the adder 7-1 in a circulatory subtracting operation in the subtracter 7-2 as will be described later. The successive accumulated data are averaged through a bit shift equivalent to a division in the bit shifter 7-6 by a value corresponding to the number of times of accumulation. The average dark image data thus obtained is supplied to the subtracter 7-2 for subtraction from the exposed state image data. In this way, the FPN correction is executed. In the case where, for instance, two successive dark image data are accumulated, the bit shift is equivalent to a division by 2, that is, it is executed by one bit in the bit shifter 7-6. Where four successive dark image data are accumulated, the bit shift is equivalent to a division by 4 and is thus executed by two bits. Since the average dark image data of successive accumulated dark image data is used for the FPN correction, it is possible to reduce the influence of random noise components and obtain satisfactory signal-to-noise ratio of image.

The subtraction in the subtracter 7-2 is executed as follows. For the first time, the exposed state image data W which has been written first in the memory 8, is read out and supplied through the bi-directional data switch 7-5 and the multiplexer 7-7 to the positive input terminal of the subtracter 7-2. Meanwhile, the dark image data B1 which appears at this time is supplied through the multiplexer 7-8 to the bit shifter 7-6 to obtain one half data B½. The data B½ is supplied to the negative input terminal of the subtracter 7-2 for subtraction from the exposed still image data W inputted to the positive input terminal, thus obtaining a difference data (W–B½). The difference data (W–B½) thus obtained is written as MEMORY DATA INPUT in the memory 8.

For the second time of subtraction, the first difference data (W–B½) having been written in the memory 8 in the first time of subtraction, is supplied through the bi-directional data switch 7-5 and the multiplexer 7-7 to the positive input terminal of the subtracter 7-2. The dark image data B2 which appears at this time is supplied through the multiplexer 7-8 to the bit shifter 7-6, thus obtaining one half data which is supplied to the negative input terminal of the subtracter 7-2 for subtraction from the first time difference data (W–B½) as the input to the positive input terminal. Thus obtained second time difference data W–(B1+B2)/2 is stored as MEMORY DATA INPUT in the memory 8.

Figure 26:
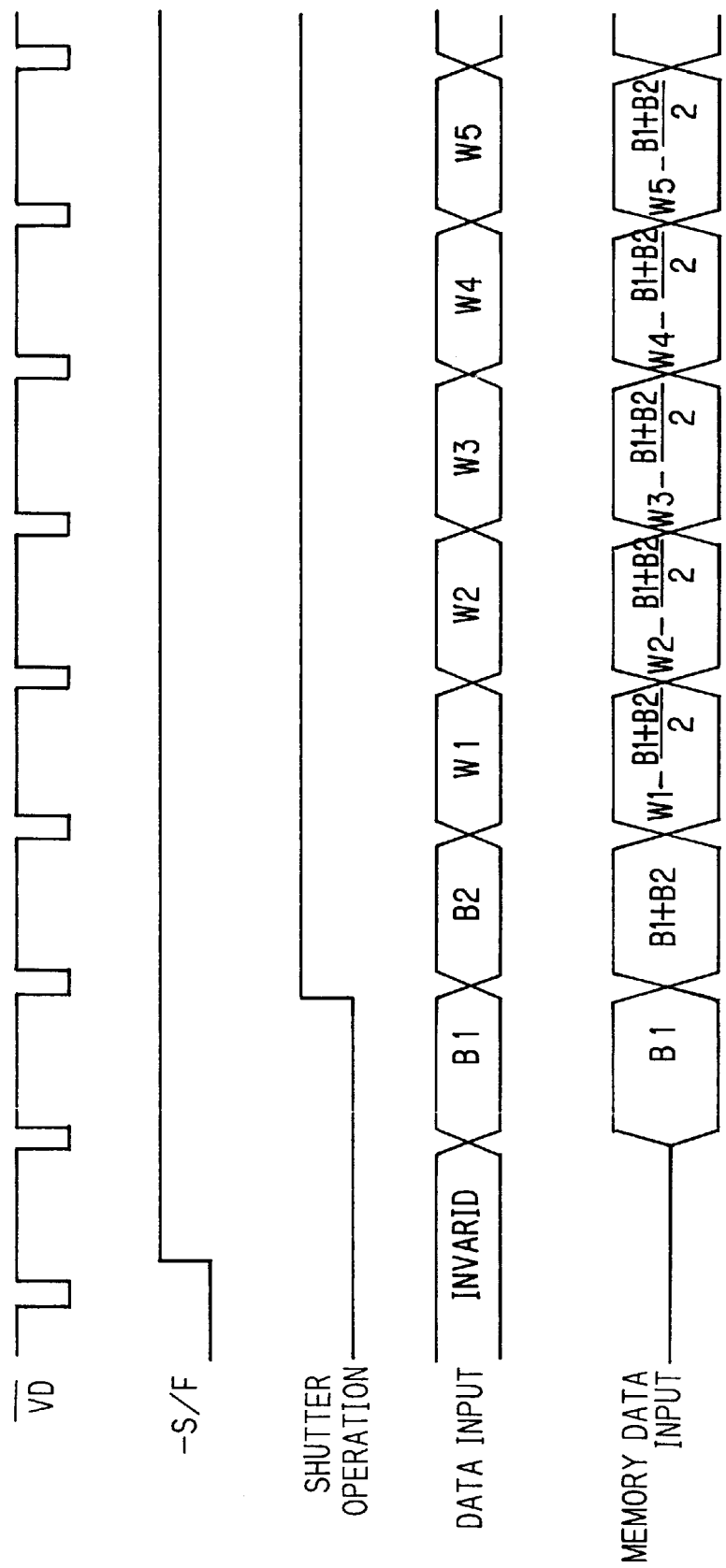
FIG. 26 is a timing chart illustrating the operation of the system shown in FIG. 24 in the view-finder mode.

FIG. 26 is a timing chart illustrating the operation of the system shown in FIG. 24 in the view-finder mode. In FIG. 26, like FIG. 22, VD labels the vertical sync signal, SHUTTER TRIGGER labels the state of a shutter trigger switch, with the raised level representing the "on" state, SHUTTER OPERATION labels the state of a shutter, with the raised level representing the "on" state, DATA INPUT labels the image data appearing from the image data input line, and MEMORY DATA INPUT labels the data written in the memory 8. Like FIG. 23, –S/F labels a discrimination signal for discriminating whether the prevailing mode is the view-finder mode or the still photography mode.

While in the still photography mode as described above the exposed state image data is taken first, in this view-finder mode the dark image data is taken first. The "high" level of the discrimination signal –S/F represents the period of operation in the view-finder mode. After the mode switching over to the view-finder mode, the shutter is "off" until the next VD appears. During this time dark image data is taken as first data. In the illustrated example, first two successive dark image data B1 and B2 are accumulated to obtain data (B1+B2), which is written as MEMORY DATA INPUT in the memory 8 and held while the view-finder mode is continued. The shutter is opened at a timing synchronized to the VD right before the output of the dark image data B2. When the exposed state image data W1 according to the shutter "on" are outputted as DATA INPUT, the dark image data (B1+B2), i.e., the accumulation of two successive data held in the memory 8, is averaged in the bit shifter 7-6, and the average data (B1+B2)/2 is subtracted form the exposed state image data W1 to obtain data W1–(B1+B2)/2.

Since the shutter is held "on", the exposed state image data W2, W3, W4, W5, . . . are obtained successively subsequent to the data W1 as DATA INPUT. From these successive data as DATA INPUT successive difference data W2−(B1+B2)/2, W3−(B1+B2)/2, W4−(B1+B2)/2, W5−(B1+B2)/2, . . . are obtained.

As shown above, by holding the average of a plurality of successive image data, which has been obtained in the first FPN cancellation operation (i.e., subtraction), and using this average data commonly to obtain the successive difference data, it is possible to increase the output image rate. The view-finder (or monitor) image motion is thus not intermittent and unlike strobe motion, thus permitting correct visual recognition. In addition, the picture angle setting or focus adjustment or exposure adjustment can be executed in a reduced time, thus providing improved convenience of handling.

Figure 27:
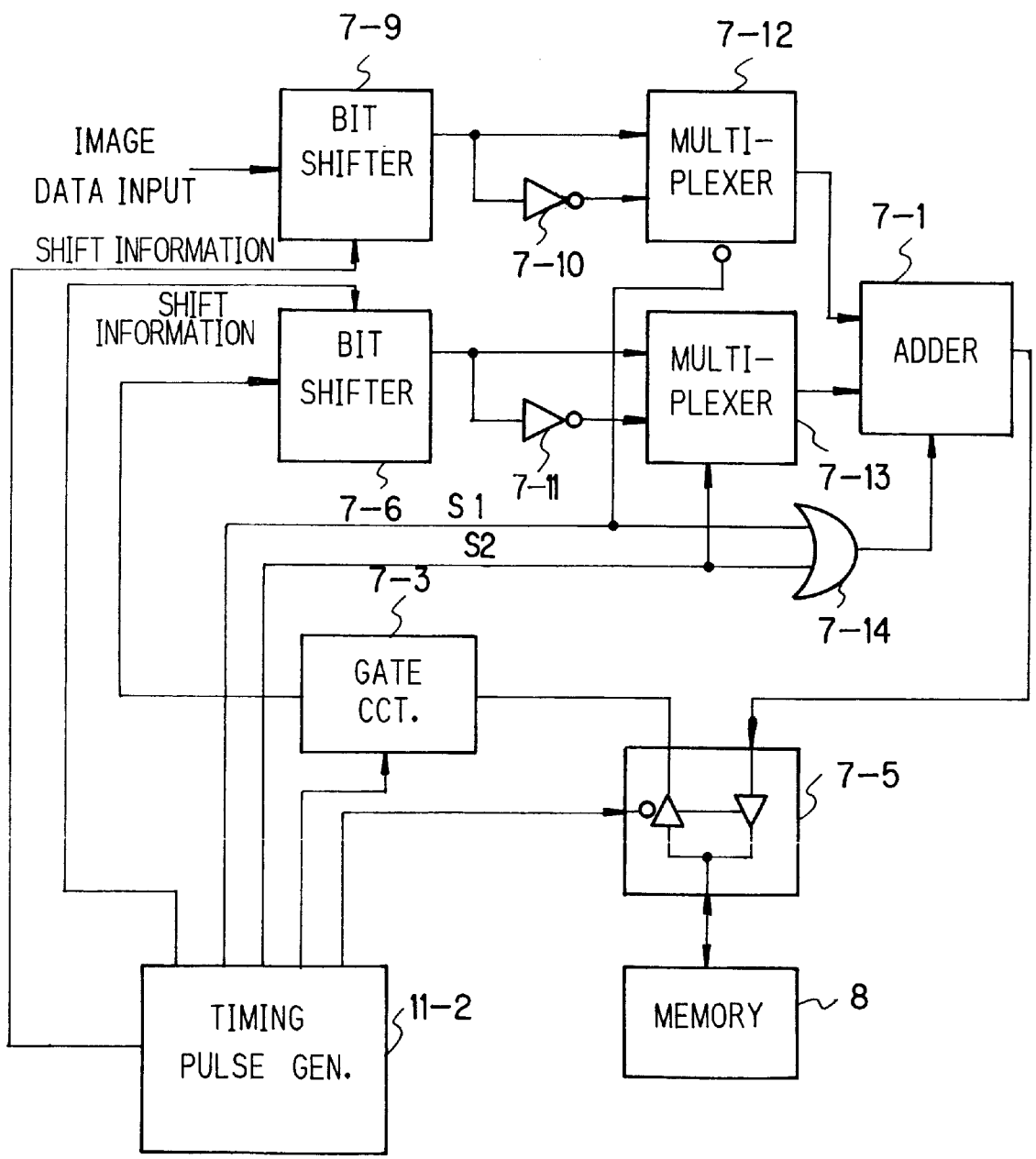
FIG. 27 is a block diagram showing a simplified form of the construction corresponding to the processing part in the circuit shown in FIG. 24.

FIG. 27 is a block diagram showing a simplified form of the construction corresponding to the processing part in the circuit shown in FIG. 24.

In this system, the image data input line data is supplied to a bit shifter 7-9 and thence supplied directly to one input terminal of a multiplexer 7-12 and also through an inverter 7-10 to the other input terminal of the multiplexer 7-12. The output of the multiplexer 7-1 is supplied one input terminal of an adder 7-1. The output of the adder 7-12 is supplied through a bi-directional data switch 7-8 to a memory 8. Data read out form the memory 8 is supplied through a bi-directional data switch 7-5 and a gate circuit 7-3 to a bit shifter 7-6 and thence supplied directly to one input terminal of a multiplexer 7-13 and also supplied through an inverter 7-10 to the other input terminal of the multiplexer 7-13. The output of the multiplexer 7-13 is supplied to the other input terminal of the adder 7-1. The adder 7-1 thus adds together the output of the multiplexer 7-12 inputted to one input terminal and the output of the multiplexer 7-13 inputted to the other input terminal. A timing pulse generator 11-2 supplies switching control signals S1 and S2 to the multiplexers 7-12 and 7-13, respectively, the signals S1 and S2 being also supplied to an OR gate 7-14 to provide a carry signal C1 supplied to the adder 7-1. The timing pulse generator 11-2 further supplies shift pulses to the bit shifters 7-9 and 7-6.

In this embodiment of FIG. 27, negative data is added in the adder for subtraction. More specifically, the subtraction data to be inputted to the adder for the subtraction is obtained by inversion to the negative data.

Generally, negative data is represented by a 2's complement, and can be obtained by adding one to the inversion of positive data. In the processing part of the circuit shown in FIG. 27, the negative data is obtained through the inversion of positive data in the inverter 7-10 or 7-11, while it is recognized that a subtraction process is in force in that the switching control signal S1 or S2 is provided to the multiplexer 7-12 or 7-13 to designate the selection of the negative data. The signal S1 or S2 that is provided is supplied through the OR gate 7-14 as the carry signal C1 to the adder 7-1. Using this carry signal C1, one is added to the inverted input image data in the adder 7-1, that is, the negative data to be inputted to the adder 7-1 is obtained from the subtraction data. In this way, both adding and subtracting operations are realized by using a single adder, i.e., the adder 7-1, in the processing, thus permitting circuit scale reduction.

Figure 28:
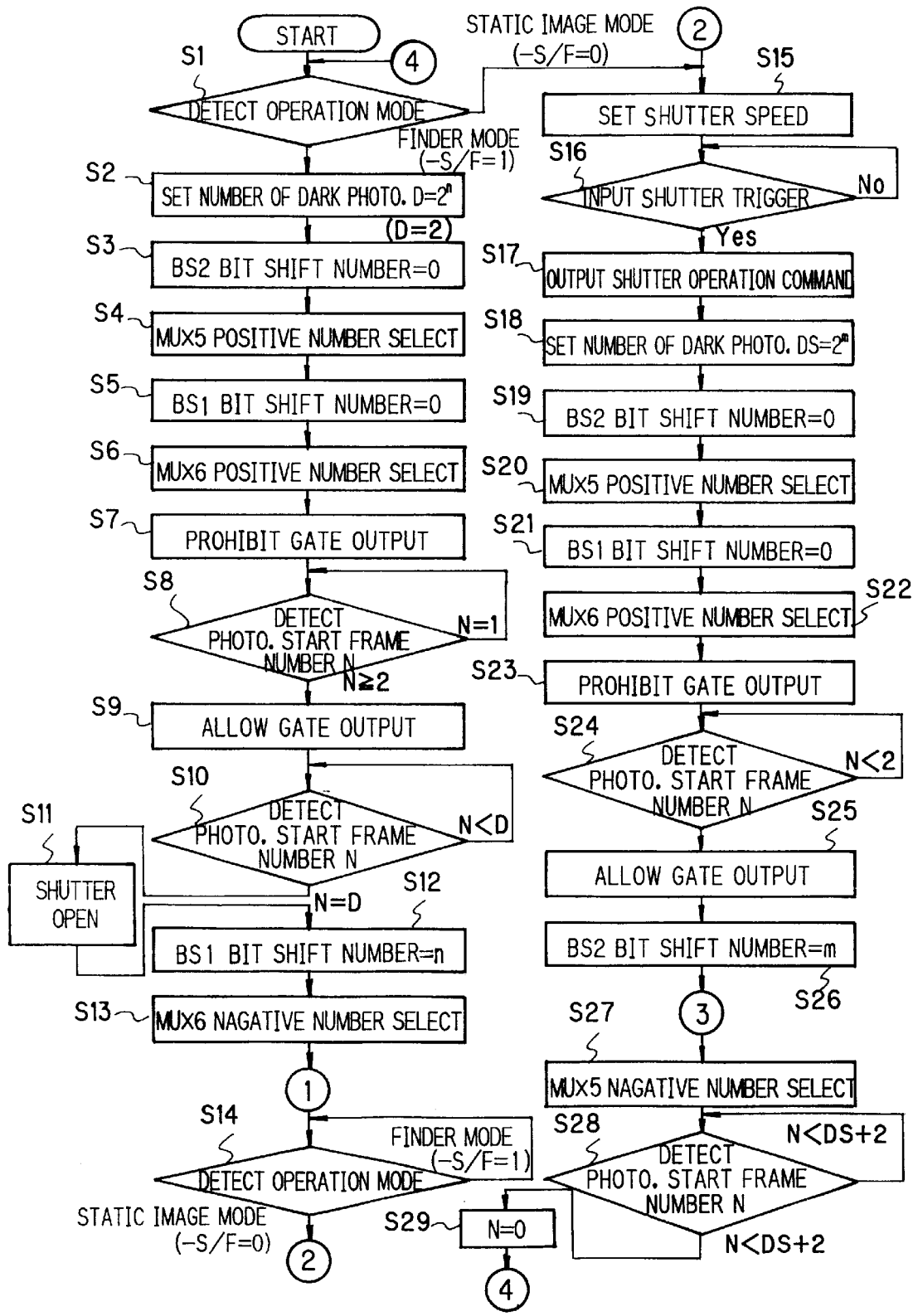
FIG. 28 is a flow chart illustrating the operation in the system shown in FIG. 27.

FIG. 28 is a flow chart illustrating the operation in the system shown in FIG. 27. When the system is started, a check is made as to whether the prevailing mode is the view-finder mode or the still photography mode (step S1). When it is detected that the prevailing mode is the view-finder mode (−S/F=1), the number D of times of taking out dark image data is set (step S2). The number D is set as an n-th power of 2. While the number D is set as such, the bit shift value in the bit shifter 7-9 which receives the image data input line data, is initialized to "0" (FIG. 3). The multiplexer 7-12 after the bit shifter 7-9 is set such as to select positive data (step S4). The bit shift value in the bit shifter 7-6 is also set to "0" (step S5), and the multiplexer 7-1 after the bit shifter 7-6 is also set such as to select the positive data (step S6). The gate circuit 7-3 is set in an output prohibition state (step S7).

After the above initializing operations (steps S2 through S7), a photography start timing (or image data take-out start timing) which is set as an instant N frames after a reference instant, is detected (step S8). When the frame number N is "1", that instant is meant, and N is detected once again (step S8). When N is 2 or above, the gate circuit 7-3 is released from the output prohibition state so that it can provide output (step S9). In the view-finder mode, the dark image data is first taken out repeatedly and accumulated. Initially, however, it is necessary to have the input to from the memory 8 to the adder 7-1, i.e., the output of the multiplexer 7-13, set to "0", and the gate circuit 7-3 is enabled to provide output at the above timing (step S9).

When the gate circuit 7-3 is enabled to provide output (step S9), the dark image data that has been written in the memory 8 is outputted through the multiplexer 7-13 to the adder 7-1. When this state is brought about, the frame number N representing the photography start timing is detected once again (step S10). When N is less than the set number D, the number of times of light-blocked state photographing, i.e., the number of times of taking out the dark image data, has not yet reached the set number D, and the operation of detecting the frame number N is repeated (step S10). When N reaches the set number D, the shutter is opened to take out the exposed state image data (step S11).

While the exposed state image data is taken out with the opening of the shutter (step S11), the bit shift value n in the bit shifter 7-6 corresponding to the divisor in the division, is set with the reading of the dark image data having been written in the memory 8 (step S12). The multiplexer 7-13 is set such as to select the negative data for the subtraction in the adder 7-1 as described above (step S13). Then, a check is made as to whether the prevailing mode is the view-finder mode or the still photography mode (step S14).

Successive exposed image data appear until the state of the step S14 is brought about, and the process of subtracting dark image data from each of the successive exposed image data is executed as described above. This repetitive operation is continued while the view-finder mode is in force. When it is detected in the step S14 that the mode is switched over to the still photography mode, the operation is switched to the routine in this mode (−S/F=0).

When the mode is switched from the view-finder mode over to the still photography mode, or when the still photography mode is detected at the outset, the shutter speed (or exposure time) is set first (step S15). Then, a shutter trigger input is waited (S16). When the shutter trigger input is confirmed, a shutter operation command for opening the shutter is issued at the timing of the next VD (step Sly). Also, the number DS of times of taking out dark image data is set. The number DS is set as an m-th power of 2 (STEP S17).

Further, the bit shift value in the bit shifter 7-9 is initialized to "0" (step S19). The multiplexer 7-12 after the bit shifter 7-9 is set to select positive data (step S20). The bit shift value in the bit shifter 7-6 is initialized to "0" (step S21). The multiplexer 13 subsequent to the bit shifter 7-6 is set to select the positive data (step S22). The gate circuit 7-3 is set to the output prohibition state at the outset (step S23). Up to the step S23 is the basic initialization in the still photography mode.

Then, the photographing start timing (i.e., the number N of frames until the image data take-out start) as described before in connection with the step S8 in the view-finder mode, is detected (step S24). When the frame number N is 2 or above, photography of one frame has been ended, and the gate circuit 7-3 is thus released from the output prohibition state set at the outset, so that it can provide output (step S25). When N is below 2, photography of one frame has not been ended, that is, the first exposed image data has not yet been taken out in the memory 8. The detection of N is repeated until the data has been taken out (step S24).

When the number N of frames up to the image data take-out start becomes 2 or above so that the gate circuit 7-3 can provide output, the bit shift value m in the bit shifter 7-9 corresponding to the divisor in the division is set through reading of the dark image data having been written in the memory 8 (step S26). Also, the multiplexer 7-12 is set to select negative data for the subtraction in the adder 7-1 as described above (step S27). In this state, the frame number N representing the photography start timing is detected again (step S28). When N is less than the sum of the set number D set in the step S18 and 2, the number of times of the light-blocked state photographing, i.e., the number of times of taking out the dark image data, has not yet reached the set number DS as described later, and the detection of the frame number N is repeated (step S28). When N has reached the sum of the set number Ds and 2, it is cleared to "0", thus bringing an end to the still photography routine (step S29). Then, the state right after the start of the system is restored.

The set number DS set in the step S18 is number of times of taking out dark image data. This means that the number of times of photography (i.e., number of times of taking out image data) is (DS+1), i.e., the sum of the number of times of taking out dark image data and the number of times of taking out exposed state image data. When the data has been taken out this number of times, the next number is (DS+2). In the step S29, a check is made as to whether N is (DS+2).

Figure 29:
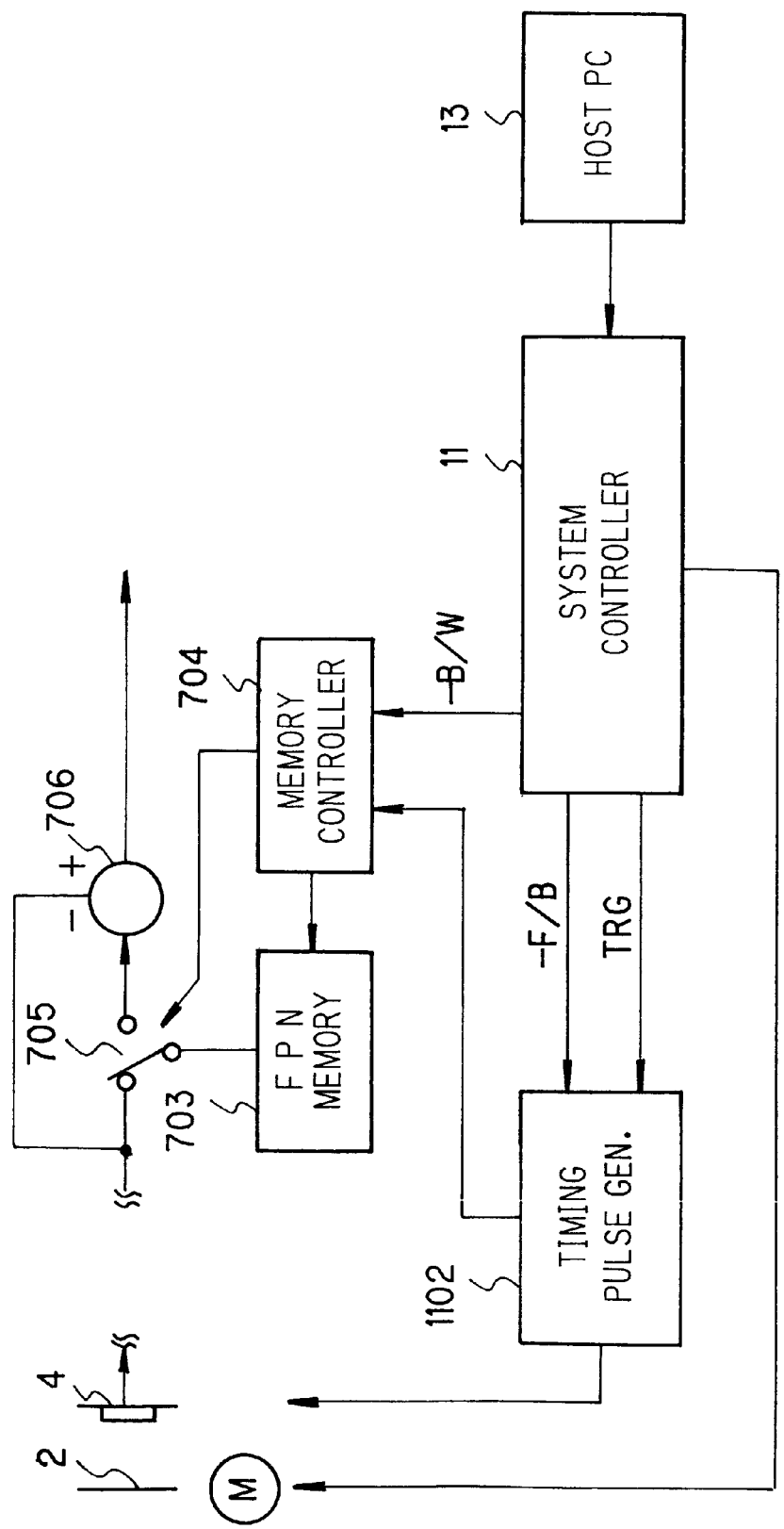
FIG. 29 is a block diagram showing the construction of a system, which utilizes the function part as in the circuit described before in connection with FIG. 24 for FPN cancellation (or FPN correction).

FIG. 29 is a block diagram showing the construction of a system, which utilizes the function part as in the circuit described before in connection with FIG. 24 for FPN cancellation (or FPN correction).

When a system controller 11 receives a command for selecting the view-finder mode from a host PC 13, it controls the shutter 2 and sets the view-finder mode in a timing pulse generator 1102. The timing pulse generator 1102 thus drives the solid-state sensor element 4 for thinned-down pixel reading of data as described in connection with FIG. 4 or partial reading of data as described before in connection with FIG. 5.

Under control of the timing pulse generator 1102, the image data is obtained through the process including digitalizing as described above on the output of the solid-state sensor element, and stored through a switch 705 controlled by a memory controller 704 in a FPN data memory 703 for storing FPN data, i.e., dark image data from the sensor element 4 in the light-blocked state thereof. The image data is also supplied directly to the negative input terminal of a subtracter 706. When the system controller 11 controls the shutter 2 to be closed for the first time, it commands the memory controller 704 to take out the dark image data with a control signal −B/W at "low" level. In response to this command, the memory controller 704 sets the switch 705 in the illustrated state that appearing data is stored in the FPN data memory 703. Thus, the dark image data from the sensor element 4 in the light-blocked state thereof is written in the FPN data memory 703.

The system controller 11 then controls the shutter 2 to be opened and causes exposed state image data to be read out from the solid-state sensor element 4 under control of the timing pulse generator 1102. At this time, the system controller 11 commands the memory controller 704 to switch the switch 705 to the other state than the illustrated state by setting the control signal −B/W to "high" level, thus causing the dark image (or FPN ) data in the FPN data memory 703 to be read out and supplied to the negative input terminal of the subtracter 706. In the subtracter 706, the FPN data is subtracted from the exposed state image data supplied to the positive input terminal to obtain the difference data as FPN corrected image data.

Subsequently, the shutter is continually held "on", and subsequent successive exposed state image data are read out from the sensor element 4. Every time the exposed image data is read out, FPN cancellation is executed with repeated use of the FPN data which is held at the outset in the FPN data memory 703. Since the exposed state image data are read out continuously without taking out the FPN data after FPN data has once been stored in the FPN data memory 8, it is possible to obtain the image display on monitor without reducing the output image rate.

Figure 30:
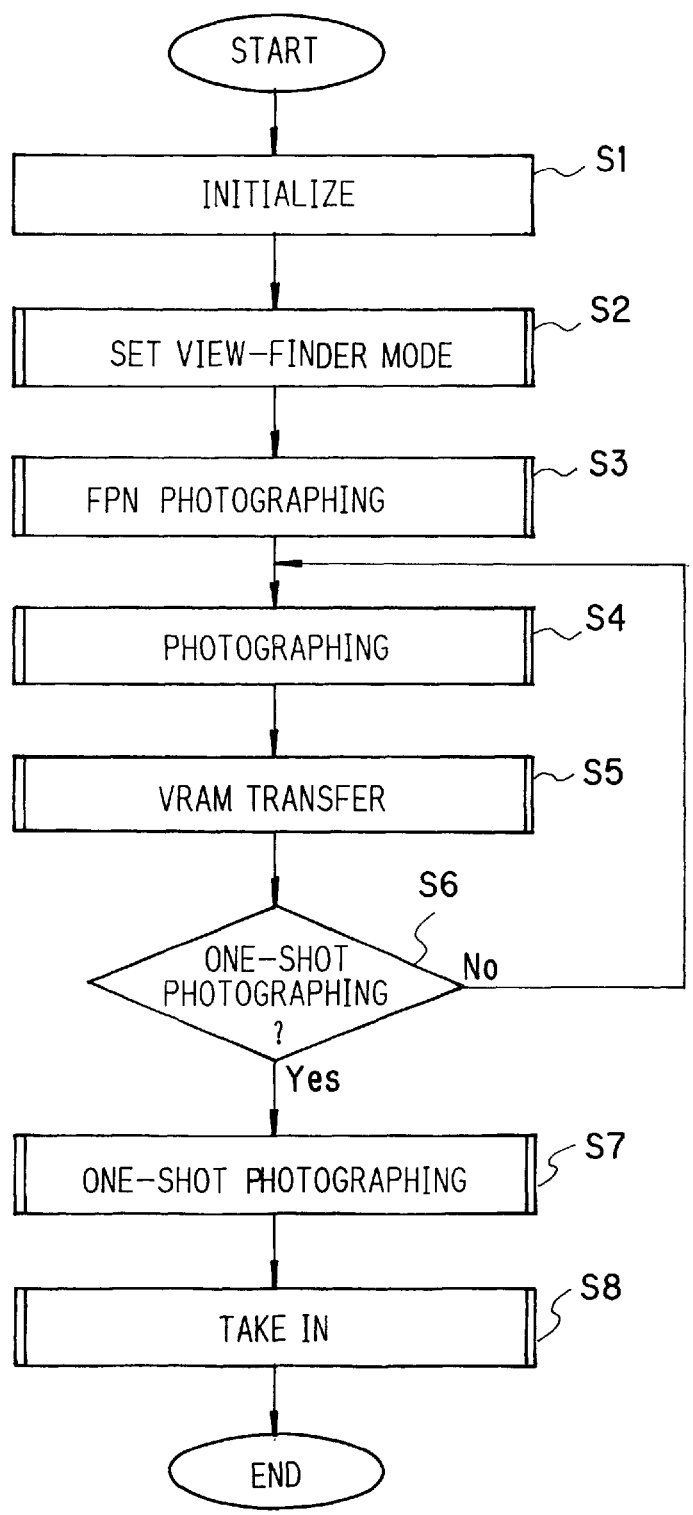
FIG. 30 is a flow chart illustrating the above view-finder mode routine in view of the control operation of the host PC 13 and the system controller 11.

FIG. 30 is a flow chart illustrating the above view-finder mode routine in view of the control operation of the host PC 13 and the system controller 11. At the start of the view-finder mode, initialization is executed (step S1), and the host PC 13 sets the view-finder mode in the system controller 11 (step S2). Then, a command for FPN photography (i.e., reading out dark image (or FPN) data) is issued (step S3), and then a command for reading out the exposed state image data in the normal photography is issued (step S4).

Subsequently, the FPN corrected image data is obtained and temporarily stored in a frame memory as shown in FIG. 1, which is provided on the output side of the subtracter 706 shown in FIG. 29, and it is then transferred to a VRAM (video RAM) in the host PC 13 (step S5). According to the image data stored in the VRAM in the host PC 13, the image is displayed on the monitor 400 as shown in FIG. 1, connected to the host PC 13 (or 200 in FIG. 1).

The host PC 13 then makes a check as to whether the view-finder mode has been switched over to the one-shot data mode (i.e., still photography mode) (step S6). While the view-finder mode prevails, the routine goes back to the step S4. With the repeat of the steps S4 through S6, FPN cancellation corrected image data obtained with the FPN data obtained at the outset in the step S3, is displayed on the monitor 400.

When the host PC 13 detects in the step S6 that the mode has been switched over to the one-shot data mode (or still photography mode), one-shot photographing (or still image photographing) is executed (step S7). Then, the image data taken in the frame memories (8-R, 8-G and 8-B in FIG. 1), is taken in the host PC 13 (or 200 in FIG. 1) (step S8).

Figure 31:
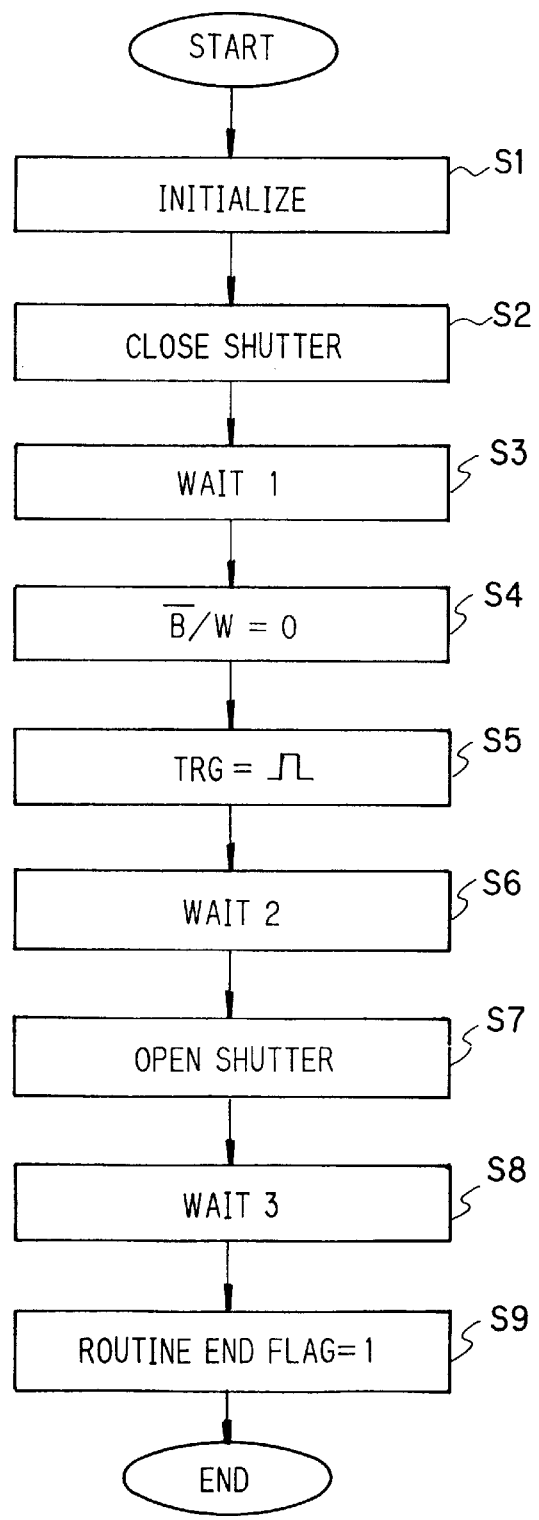
FIG. 31 is a flow chart illustrating the routine of the system controller 11 in the FPN photography (step S3) in the flow chart of FIG. 30.

FIG. 31 is a flow chart illustrating the routine of the system controller 11 in the FPN photography (step S3) in the flow chart of FIG. 30.

After the start, a CPU in the system controller 11 in FIG. 29 is initialized first (step S1). The shutter 2 is initially controlled to be closed (step S2). After the lapse of time until the closing of the shutter 2 (step S3), the system controller 11 commands the memory controller 704 to take out the dark image data by setting the control signal −B/W noted above to "low" level (−B/W=0) (step S4). When the signal −B/W is set to the "low" level, the memory controller 704 switches the switch 705 to the side of the FPN memory 703.

When the system controller 11 commands the memory controller 704 to take out the dark image data in the step S4, it issues a trigger signal TRG to the timing pulse generator 1102 (step S5). In response to this trigger signal TRG, the timing pulse generator 1102 drives the solid-state image sensor 4 in the view-finder mode. After the lapse of wait time until dark image (or FPN) data has been read out for one frame from the image sensor 4 in the light-blocked state thereof (step S6), the shutter 2 is opened (step S7). The FPN data is taken in the FPN data memory during subsequent wait time until the shutter 2 is opened again, whereupon a routine end flag is set (step S9) to bring an end to the routine.

Figure 32:
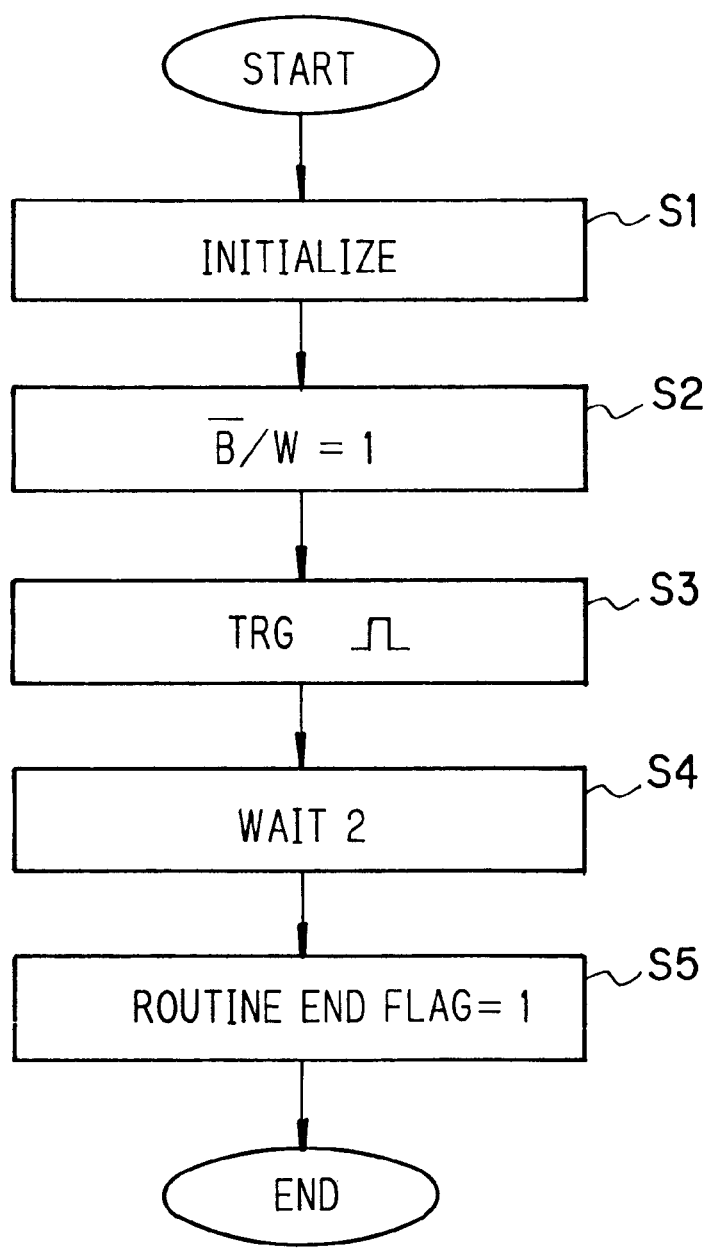
FIG. 32 is a flow chart illustrating the routine of the system controller 11 in the usual exposed state photography (step S4) in the flow chart of FIG. 30.

FIG. 32 is a flow chart illustrating the routine of the system controller 11 in the usual exposed state photography (step S4) in the flow chart of FIG. 30.

After the start, the CPU in the system controller 11 shown in FIG. 29 is initialized first (step S1). The system controller 11 then commands the memory controller 704 to set the control signal −B/W to "high" level (−B/W=1) to take out the exposed state image data so as to let the memory controller 704 recognize the image data that will appear as exposed state image data (step S2). In response to the −B/W signal at the "high" level, the memory controller 704 switches the switch 705 to the side of the subtracter 706.

When the system controller 11 issues the command for taking out the dark image data to the memory controller 704 in the step S2, it issues the trigger signal TRG to the timing pulse generator 1102 (step S3). In response to this trigger signal TRG, the timing pulse generator 1102 drives the solid-state sensor element 4 in the exposed state photography mode. After the lapse of a wait time until exposed state image data of one frame has been read out from the sensor element 4 in the exposed state thereof (step S4), the exposed state image data is supplied as an add input to the subtracter 706, while the FPN data held in the FPN data memory 703 is read out and supplied as a subtract input to the subtracter 706. As a result, the subtracter 706 outputs the corrected image data. Then, a routine end flag is set (step S5) to bring an end to this routine.

In the above way, the corrected exposed state image data, corrected according to the FPN data once taken at the outset in the FPN data memory 703, is obtained as the output of the subtracter 706.

However, in the routine described above in connection with FIG. 32, the FPN data that is once taken out at the outset is held in the FPN data memory 703. This means that the FPN data may be deviated from the actual FPN due to the subsequent system temperature changes or the like, making it difficult to obtain proper correction.

Figure 33:
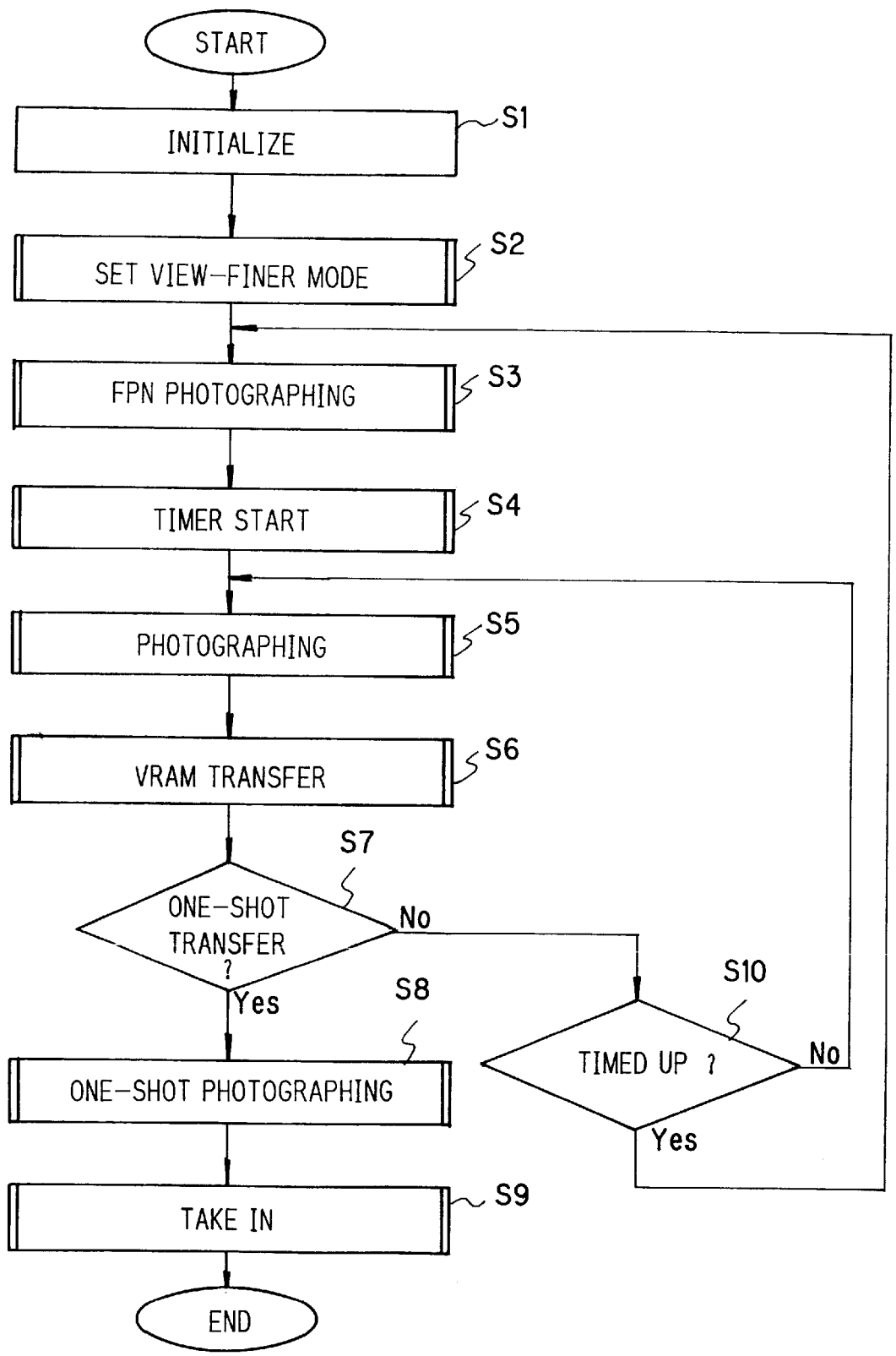

FIG. 33 is a flow chart illustrating a routine of the system, which is adapted to permit proper correction of data concerning the FPN irrespective of system temperature changes or the like.

The routine shown in FIG. 13 is a view-finder mode routine viewed as an operation of the host PC 13.

After the start, the CPU in the system controller 11 shown in FIG. 29 is initialized first (step S1). The view-finder mode is then set in the system controller 11 (step S2). With this setting, the system controller 11 starts the FPN photography, i.e., the operation of taking out FPN data from the solid-state sensor element in the light-blocked state thereof (step S3). A timer is then started for time counting up to a predetermined time (step S4). The system controller 11 then causes an operation of obtaining the normal image data, i.e., the exposed state image data, from the sensor element in the exposed state thereof and obtaining the corrected image data through data correction of the step S3 according to the FPN data (step S5). The host PC 13 causes the transfer of the above corrected image data, once stored in the frame memories as shown in FIG. 1, to its VRAM (step S6). Image display on the monitor 400 shown in FIG. 1 is thus made according to the FPN cancelled image data stored in the VRAM in the host PC 13.

The host PC 13 thus makes a check as to whether the view-finder mode has been switched over to the one-shot data mode (i.e., still photography mode) (step S7). When the view-finder mode still prevails (i.e., "NO" is provided in the step S7), a check is made as to whether the timer started in the step S4 has been timed up (step S10). When the timer has not been timed up, the FPN correction in the step S5 is continually made on the exposed state image data taken out at this moment using the FPN data taken out in the step S3 (steps S7, S10 and S5).

When it is detected in the step S10 that the timer has been timed up, the step S3 is executed again to update the FPN data taken out at the outset in that step. The FPN data is thus updated for every predetermined time corresponding to the predetermined value noted above, as determined by the timer operation check in the step S10.

Proper correction of data with respect to the FPN, is thus obtainable irrespective of temperature changes in long continuous operation or like cases.

Figure 34:
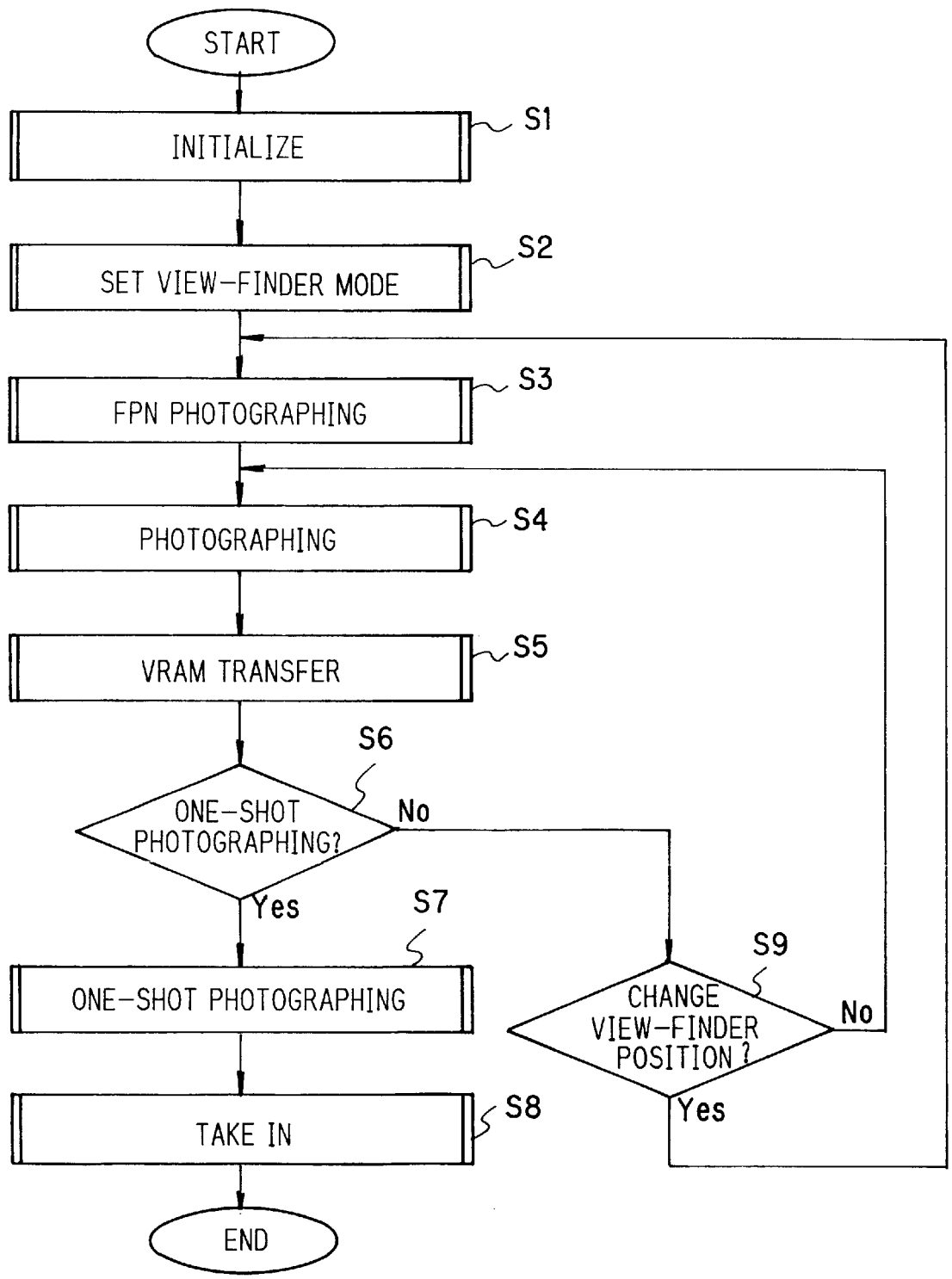
FIG. 34 is a flow chart illustrating a routine, which permits proper data correction with respect to the FPN irrespective of temperature changes in the system in which the solid-state sensor element is read out by thinned-down reading out partially reading.

FIG. 34 is a flow chart illustrating a routine, which permits proper data correction with respect to the FPN irrespective of temperature changes in the system in which the solid-state sensor element is read out by thinned-down reading out partially reading.

The routine shown in FIG. 34 is again a view-finder mode operation viewed as an operation of the host PC 13.

The partial reading of data in the view-finder mode is effective for making focus adjustment or like cases. The focus adjustment is difficult at a low output image rate (i.e., field rate), and it is desired to avoid the image output date reduction as much as possible. Usually, for the focus adjustment the user designates a desired screen area for focusing. The designated area is not always at the center of the screen. In the instant routine, FPN data updating is made once when a partial display area is set in the screen.

After the start, the CPU in the system controller 11 as shown in FIG. 29 is initialized first (step S1). Then, the view-finder mode is set in the system controller 11 (step S2). With this setting, the system controller 11 starts the FPN photography, i.e., the operation of taking out the FPN data from the solid-state sensor element in the light-blocked state thereof (step S3). The system controller 11 then causes the operation of the normal photography, i.e., obtaining the exposed state image data from the sensor element in the exposed state thereof and obtaining corrected image data through data correction according to the FPN data obtained in the step S3 (step S4). The host PC 13 then causes transfer of the corrected exposed state image data, once stored in the frame memories as shown in FIG. 1, to its VRAM (step S5). Image display on the monitor 400 as shown in FIG. 1, is thus made according to the FPN corrected image data stored in the VRAM of the host PC 13.

Then, a check is made as to whether the view-finder mode has been switched over to the one-shot data mode (or still photography mode) (step S6). When the view-finder mode still prevails (i.e., "NO" is provided in the step S6), the user makes a check as to whether the area set for viewing in the view-finder (i.e., view-finder position) has been changed (step S9). When it is found in the step S9 that the previous view-finder position prevails, the FPN correction in the step S4 is made continually at this moment using the FPN data taken in the step S3 (steps S6, S9 and S4).

When it is found in the step S9 that the view-finder position has been changed, the FPN data taken at the outset in the step S3 is updated by executing this step again. The FPN data is updated whenever the view-finder position is changed.

Since the FPN data is updated in this routine whenever the view-finder position is changed for focus adjustment or the like, proper data correction with respect to the FPN can be obtained. It is thus possible to obtain satisfactory image display with facilitated focus adjustment or like operation.

Figure 35:
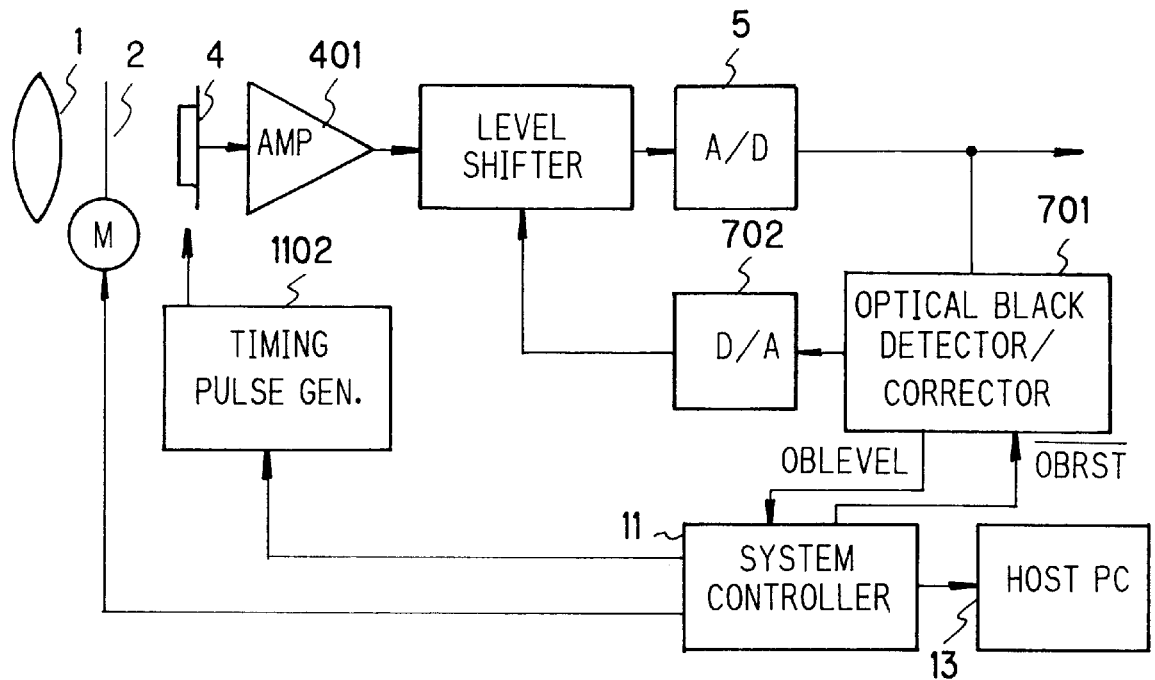
FIG. 35 is a block diagram showing a system, in which the FPN data is updated when a change of the FPN is recognized by FPN change detecting means in a pseudo fashion. In this system, the FPN change is detected in a pseudo fashion according to a change in the OB data level which is highly correlated to the actual FPN change.

FIG. 35 is a block diagram showing a system, in which the FPN data is updated when a change of the FPN is recognized by FPN change detecting means in a pseudo fashion. In this system, the FPN change is detected in a pseudo fashion according to a change in the OB data level which is highly correlated to the actual FPN change.

Referring to FIG. 35, the output of the solid-state sensor element 4 which photoelectrically converts a light image appearing through the lens 1 and the shutter 2, is supplied to an amplifier 401 for gain adjustment and then supplied to a level shifter 402. The level shifter 402 shifts the DC level according to correction data from an OB level corrector 701, which is supplied with the output of the A/D converter 5 which is connected subsequent to the level shifter 402. The level shift is executed in order to match the OB level of data to a reference lower limit of the A/D conversion in the A/D converter 5, so that the output of the level shifter 402, i.e., the input to the A/D converter 5, is within a dynamic range thereof. The OB level corrector 701 detects the OB part of the output of the solid-state sensor element 4, and it supplies the digital data as its detection output to a D/A converter 702 for conversion to analog data which is supplied as a level shift amount control signal to the level shifter 402.

As shown, the level shifter 402, the A/D converter 5, the OB level detector 701 and the D/A converter 702 form together a feedback system, which controls the level of digital data as the detection output of the OB level corrector 701 to a desired level close to the zero level of video signal and thus stabilizes the OB level of video.

The on-off operation of the shutter 2 and the driving of the solid-state sensor element 4 by a timing pulse generator 1102 are controlled by control signals from the system controller 11. The system controller 11 issues an OB reset signal (–OBRST) to the OB level corrector 701, and receives digital data as OB level detection output (OBLEVEL) from the OB level corrector 701.

Figure 36:
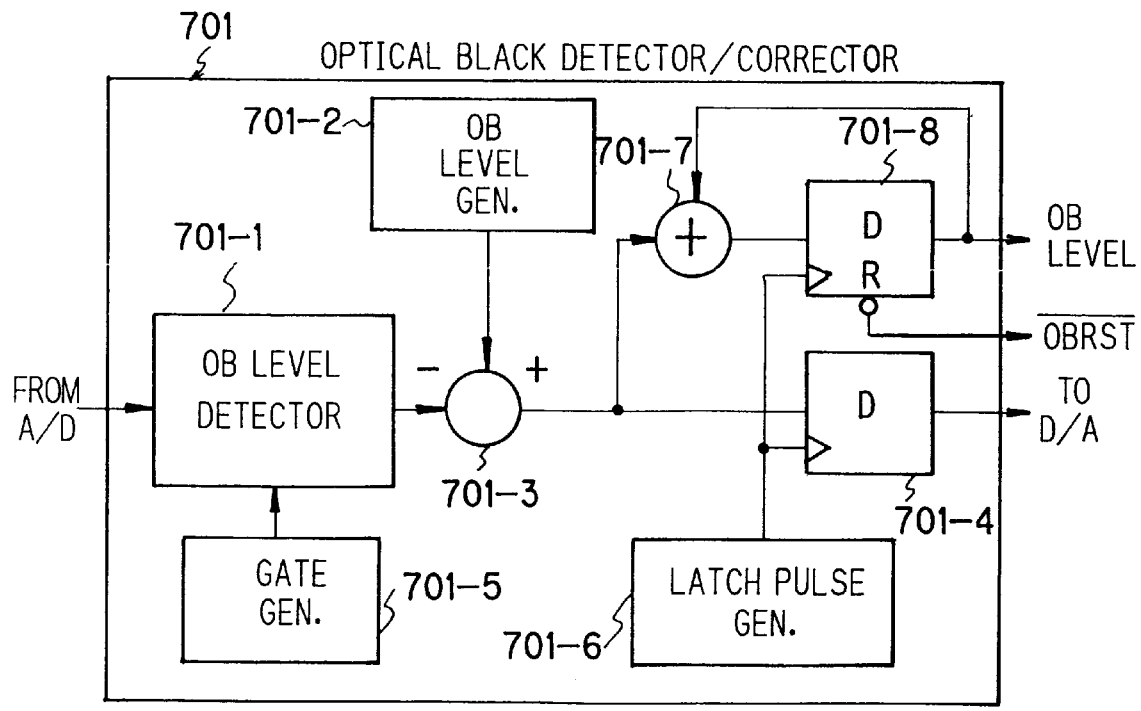
FIG. 36 is a block diagram showing the construction of the OB level corrector 701 in FIG. 35.

FIG. 36 is a block diagram showing the construction of the OB level corrector 701.

Digital video signal supplied from the A/D converter shown in FIG. 35 is inputted in an OB level detector 701-1. The OB level detector 701-01 derives a portion of the output of the solid-state sensor element 4 for a predetermined time section, i.e., OB portion of the output, under control of a gate pulse signal form a gate pulse generator 701-5. Under control of this gate pulse signal, an OB portion signal is detected as detected OB level, specifically average detected level, from the supplied digital video signal.

The detected OB level data is supplied to the negative input terminal of a subtracter 701-3, and subtracted from a desired level signal which is supplied from a desired level setting circuit 701-2 to the positive input terminal of the subtracter 701-3. The difference data is latched in a latch 701-4 at the timing of a latch pulse signal, which is provided in a field cycle from a latch pulse generator 701-6. The output of the latch 701-4 is supplied as the output of the OB level corrector 701 to the D/A converter 70 shown in FIG. 35.

The output of the subtracter 701-3 is also supplied to one input terminal of an adder 701-7. The output of the adder 701-7 is supplied to a data input terminal of a register 701-8. The output of the register 701-8 is also supplied to the other input terminal of the adder 701-7. The adder 701-7 and the register 701-8 thus cooperate to accumulate successive differences between the detected OB level output of the adder 701-3 and the desired level. The accumulated difference data is supplied as the digital OB level detection output OBLEVEL to the system controller 11.

The latch pulse signal which is supplied from the latch pulse generator 701-6 to the latch 701-4, is also supplied to a latch input terminal of the register 701-8. To a reset input terminal of the register 701-8 is supplied the OB reset signal (–OBRST) which is active-in-"low" signal from the system controller.

As shown, the OB level corrector 701 provides two outputs, one of which is the difference between the desired level data provided from the desired level setting circuit 701-2 as a reference OB level and the level of a portion of the solid-state sensor element 4 for the OB time internal. This output is updated in field cycle and provided from the latch 701-4.

The other output of the OB level corrector 701 is the digital signal OBLEVEL, i.e., the accumulation of successive difference between the detection OB level and the desired level. This output is supplied to the system controller 11. The system controller 11 monitors the digital accumulated difference data OBLEVEL and, when this level exceeds a predetermined level, causes updating of the dark image data (or FPN data).

Figure 37:
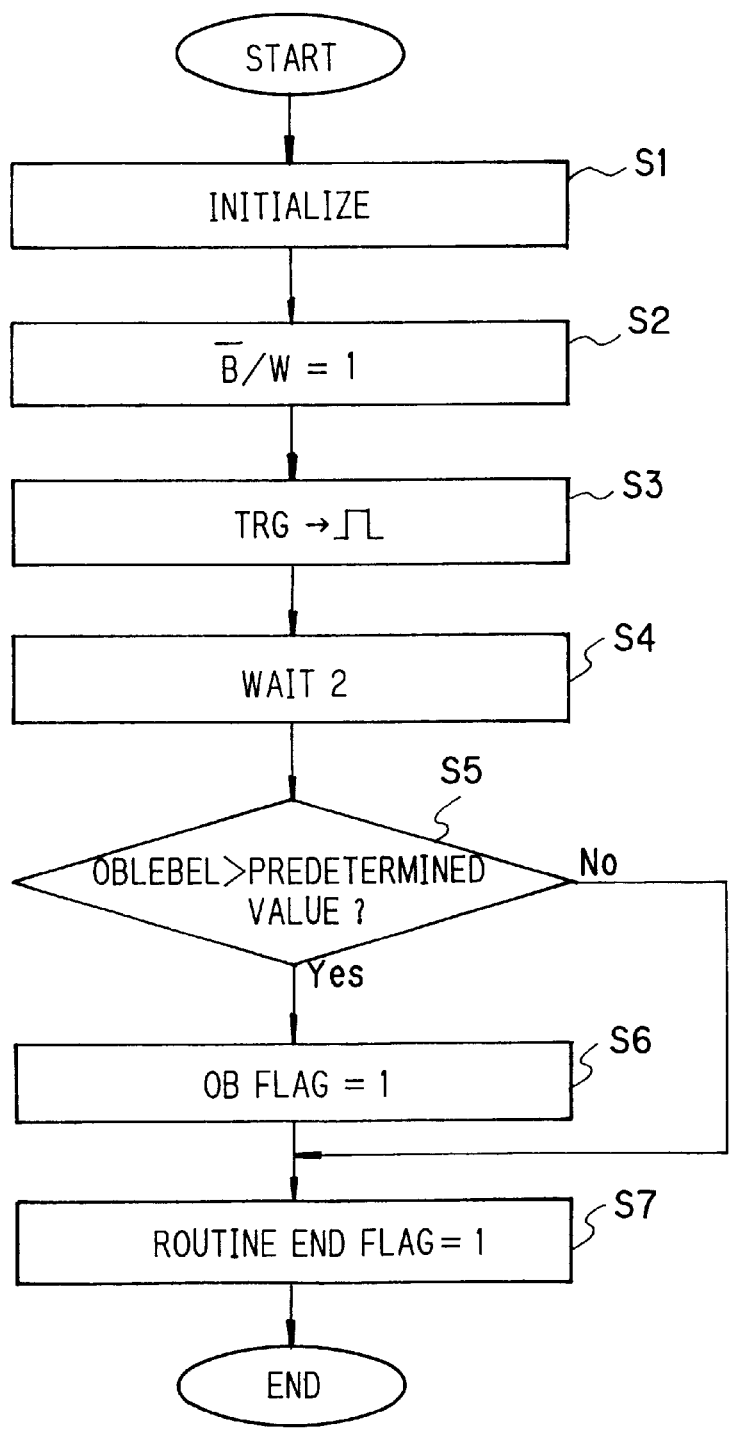
FIG. 37 is a flow chart illustrating the routine of the system controller 11 for controlling the operation of the system shown in FIGS. 35 and 36.

FIG. 37 is a flow chart illustrating the routine of the system controller 11 for controlling the operation of the system shown in FIGS. 35 and 36. After the start, the CPU is initialized first (step S1). Then, the discrimination signal –B/W for taking out the light-blocked or exposed state image data is set to –B/W=1 for taking out the exposed state image data (step S2). Then, a trigger signal TRG is outputted by a trigger operation (step S2). Then, the exposed state image data obtained in the open state of the shutter is written in a memory (which, although not shown, is provided on the output side of the A/D converter 5 shown in FIG. 35). When a wait time concerning the above operation has been passed (step S4), a check is made as to whether the digital accumulated difference data OBLEVEL noted above has exceeded a predetermined value (step S5). When the predetermined value has not been exceeded, an end is brought to the routine. When the value has been exceeded, an OB flag described later is set (step S6), thus bringing an end to the routine.

Figure 38:
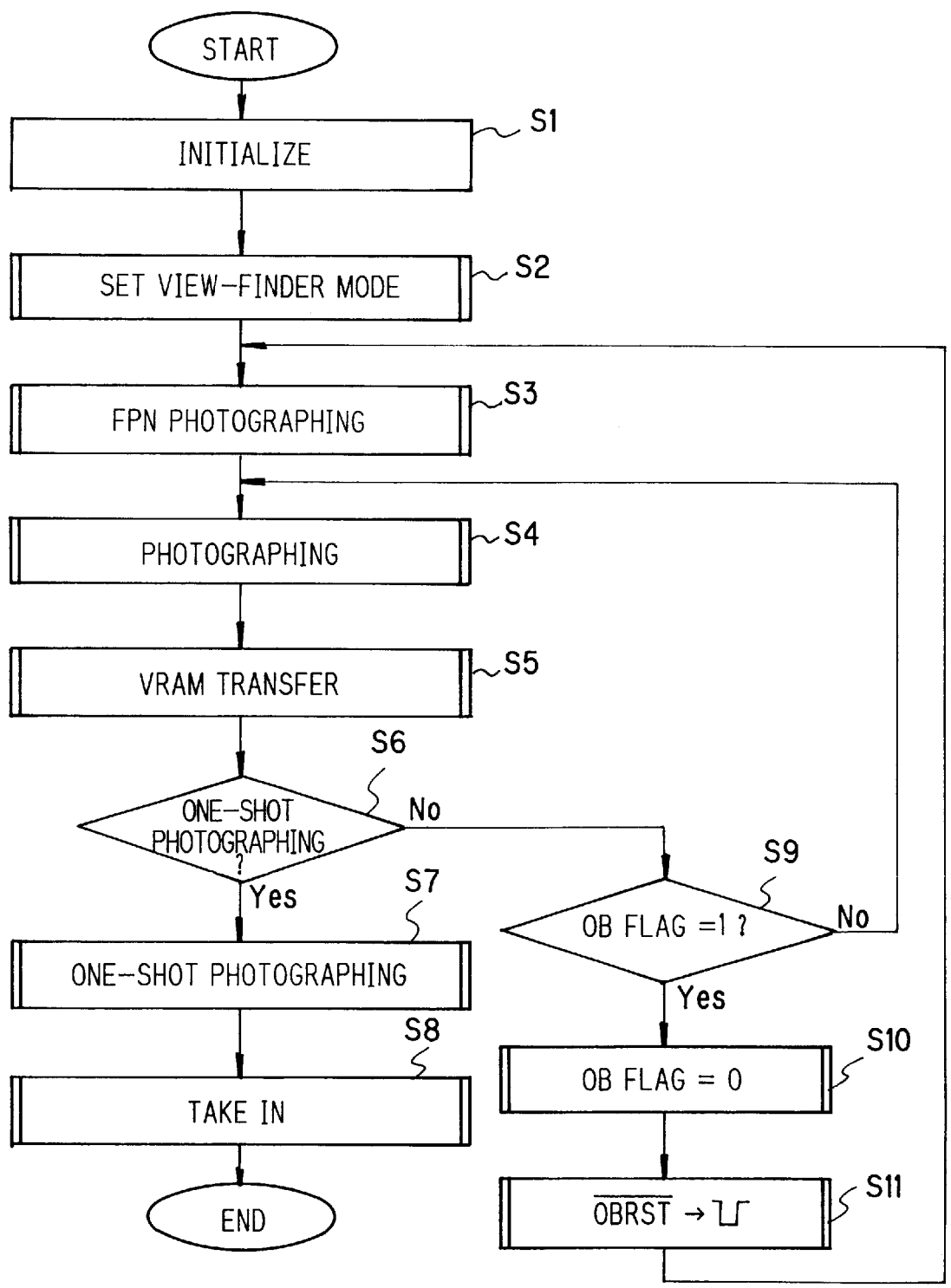
FIG. 38 is a flow chart illustrating the operation of the host PC 13 in the routine shown in FIG. 37.

FIG. 38 is a flow chart illustrating the routine of the host PC 13 in the routine shown in FIG. 37. After the start, the CPU is initialized first (step S1) and the view-finder mode is set (step S2). Then, the dark image data (i.e., FPN data) is taken out once (step S3). The host PC 13 then commands the system controller 11 to cause normal photography, i.e., obtaining the exposed state image data from the solid-state sensor element in the exposed state thereof, and correction of this data according to the FPN data obtained in the step S3 to obtain the corrected image data (step S4).

The host PC 13 then causes transfer of the FPN corrected image data, having once been stored in the memory noted above, to the VRAM therein (step S5). Image display is made on the monitor 400 as shown in FIG. 12 according to the corrected image data in the VRAM of the host PC 13.

The host PC 13 then makes a check as to whether the view-finder mode has been switched over to the one-shot data mode (i.e., still photography mode) (step S6). When the view-finder mode prevails (i.e., "NO" is provided in the step S6), the OB flag is checked (step S9).

The OB flag is provided for checking whether the digital accumulated difference data OBLEVEL, based on the difference between the detected OB level and the desired level, has exceeded a predetermined value. When the accumulated difference data OBLEVEL has exceeded the predetermined value, it is estimated that the difference of the FPN data which is highly correlated to the detected OB level from the actual value has been substantially increased. In this case, the OB flag is set (B=1) and an index of FPN data updating. When the data OBLEVEL is below the predetermined level, it is not estimated that the difference has not been substantially increased. In this case, the flag is not set (OB=) and an index of defemination that no FPN data updating is necessary.

When it is not found in the step S9 in FIG. 38 that the OB flag is "1", the routine goes back to the step S4 of obtaining the corrected image data by correcting the exposed state image data from the solid-state sensor element in the exposed state thereof according to the FPN data obtained in the preceding step S4.

When the OB flag is found to be "1", it is reset (step S10), and the active-in-"low" OB black reset signal (−OBRST) is issued to clear the accumulated difference data register 701-8 (step S1). The routine then goes back to the step S3 to update the FPN data by taking the dark image data (i.e., FPN data) afresh. The routine subsequently goes through the step S4 and following steps repeatedly.

In the above routine shown in FIG. 38, the extent of the difference of the FPN data held for the FPN correction from the actual FPN, is detected in a pseudo fashion from changes in the detected OB level data which is sufficiently correlated to the FPN, and the FPN data is updated on the basis of the result of detection. It is thus possible to obtain very adequate FPN correction of data without field rate reduction.

Figure 39:
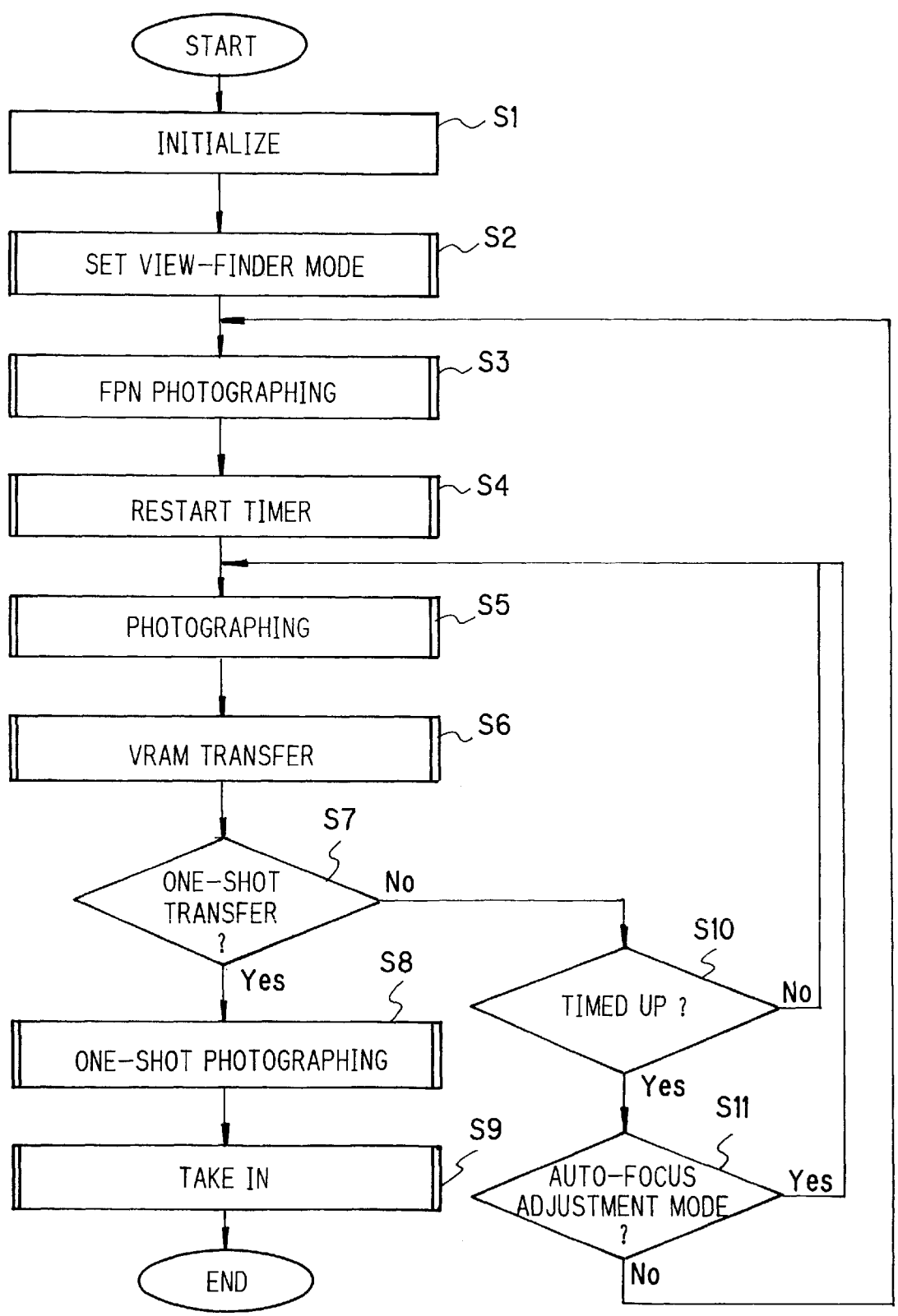
FIG. 39 is a flow chart illustrating a routine such that the FPN data updating is not made when a focus adjustment mode is in force.

FIG. 39 is a flow chart illustrating a routine such that the FPN data updating is not made when a focus adjustment mode is in force.

After the start, the CPU in the system controller 11 shown in FIG. 29 is initialized first (step S1). Then, the view-finder mode is set in the system controller 11 (step S2). With this setting, the system controller 11 starts FPN photography, i.e., taking out FPN data in the light-blocked state of the sensor element (step S3). Then, the timer is started for time counting up to a predetermined time (step S4). The system controller 11 then causes the operation of obtaining exposed state image data in normal photography, i.e., in the exposed state of the sensor element, and correcting this data according to the FPN data obtained in the step S3 to obtain the corrected image data (step S5). The host PC 13 commands causes transfer of the corrected exposed state image data, having once stored in the frame memories as shown in FIG. 1, to its VRAM (step S6). Image display on the monitor 400 shown in FIG. 1 is made according to the FPN corrected image data stored in the VRAM of the host PC 13.

Then, the host PC 13 makes a check as to whether the view-finder mode has been switched over to the one-shot data mode (still photography mode) (step S7). When the view-finder mode is held (i.e., when "NO" is provided in the step S7), a check is made as to whether the timer started in the step S4 has been timed up (step S10). When the timer has not yet been timed up, the FPN correction in the step S5 is executed continually on the exposed state image data taken at this moment using the FPN data having been taken in the step S3 (steps S7, S10 and S5).

When it is detected in the step S10 that the timer has been timed up, a check is made as to whether an auto-focus adjustment mode is in force (step S11). When the auto-focus adjustment mode is in force, the FPN correction in the step S5 is executed continually on the exposed state image data taken at this moment using the FPN data having been taken in the step S3 (steps S7, S10, S11 and S5).

When the auto-focus adjustment mode is in force, the updating of the FPN data having been taken out in the step S3 is prohibited.

In the auto-focus adjustment mode, the focus adjustment is executed by turning a focus ring. In this case, unless the field rate of the image output is sufficiently increased, the result of the adjustment may appear after a delay, thus giving rise to difficulties of handling. With the prohibition of the FPN data updating, the field rate can be sufficiently increased to ensure convenient handling, although the FPN cancellation may be slightly sacrificed.

When it is not detected in the step S11 that the auto-focus adjustment mode is in force, the FPN data having been taken out at the outset in the step S3 is updated by executing the step S3 afresh. In other words, while the auto-focus adjustment mode is not in force, the FPN data is updated for every period of time until the time-up of the timer as checked in the step S10.

It is thus possible to obtain adequate FPN correction irrespective of temperature changes in long continuous operation or like cases.

The technique as described in connection with FIG. 39, or the technique described in connection with FIG. 38, in which the FPN data updating is made according to the result of the pseudo fashion detection of FPN changes on the basis of changes in detected OB level which is sufficiently correlated to the FPN, may be taken into considerations when making a decision as to whether the FPN data updating is to be made.

Figure 40:
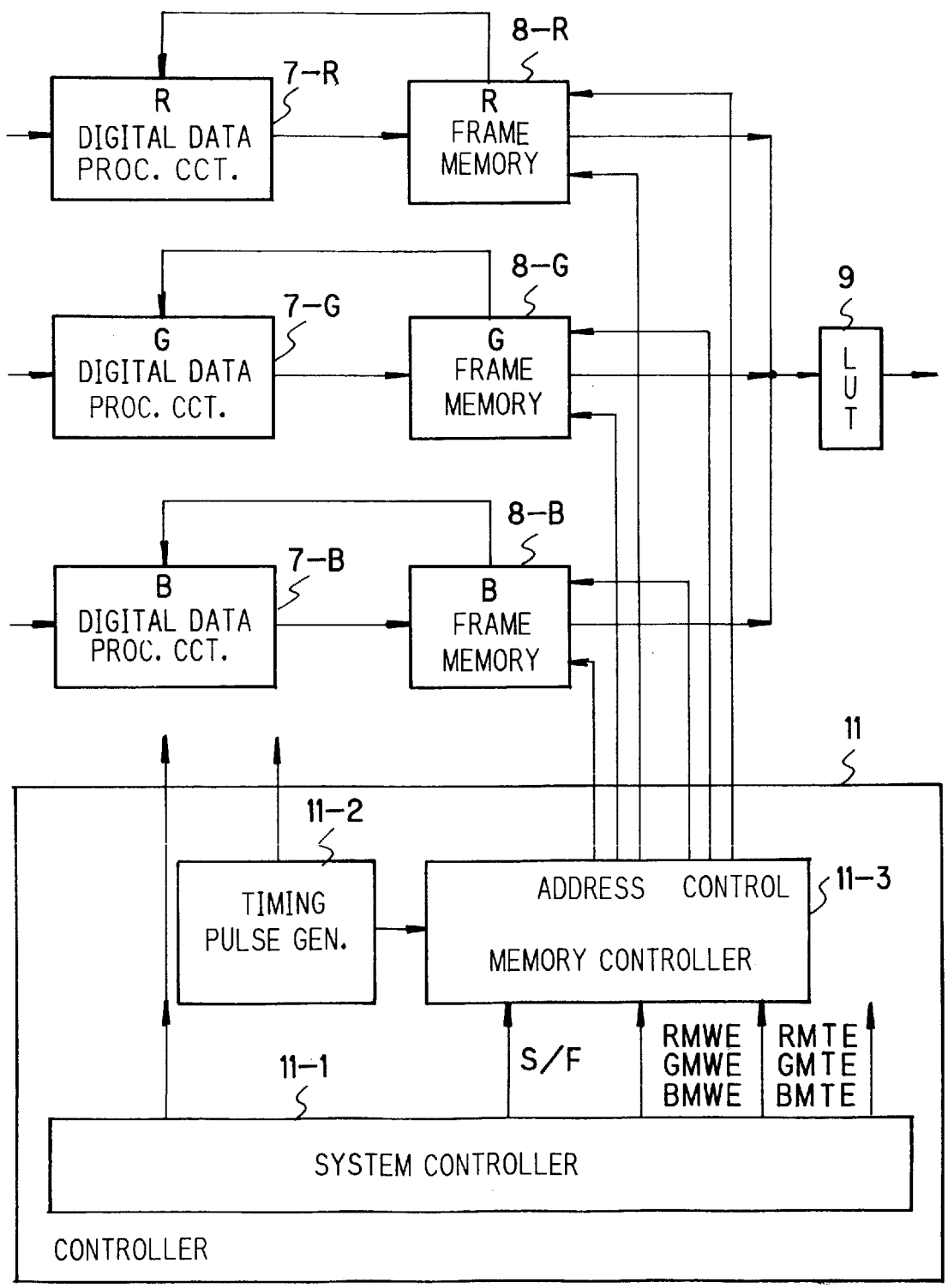
FIG. 40 is a block diagram showing the essential part of a general electronic imaging apparatus of the pertaining type which may be used as a memory for taking out the exposed state image data therein is also used for storing FPN data.

FIG. 40 is a block diagram showing the essential part of a general electronic imaging apparatus of the pertaining type which may be used as a memory for taking out the exposed state image data therein is also used for storing FPN data.

The stage preceding the circuit part shown in the block diagram of FIG. 40, up to obtaining digital image data, may be of the studio digital camera construction as shown in FIG. 1. More specifically, the process up to the stage, in which the digital data of the individual colors are supplied to the R. G and B digital data processors 7-R, 7-G and 7-B, may be the same as described before in connection with FIG. 1, although it is not shown in FIG. 40. In the process described before in connection with FIG. 1, a foreground scene light image from the optical system 1 is passed through the opening in the shutter 2 and incident on the dichroic prism 3. The dichroic prism 3 disassembles the incident light into the ordinal colors, i.e., R (red), G (green) and B (blue) colors. The disassembled color light images are focused on the photoelectric surfaces of the solid-state sensor elements 4-R, 4-G and 4-B provided at the end of the respective blocks, thus obtaining photoelectric conversion outputs of the individual colors from the sensor elements 4-R, 4-G and 4-B. These photoelectric conversion outputs are supplied to the R, G and B analog data processors 5-G, 5-G and 5-B for such process as the OB level clamping defining the OB level, and then supplied to the A/D converters 6-R, 6-G and 6-B provided for the respective colors for conversion into digital data.

These digital data of the individual colors are supplied through the data switch 12 to the R, G and B digital data processors 7-R, 7-G and 7-B, which are also shown in FIG. 40. In the R, G and B digital data processors 7-R, 7-G and 7-B, the digital data of the individual colors are subjected to such processes as noise cancellation, shading correction, etc. The processed data are stored in the frame memories 8-R, 8-G and 8-B provided for the respective digital data processors. The stored data are supplied through the LUT 9 to the SCSI driver 10. The LUT table 9 varies the input image tones through gradation conversion according to tables which have been preliminarily set. The image data supplied to the SCSI driver 10, are transferred to the host PC 200 via the SCSI bus 300, which connect the studio digital camera 100 and the host PC 200. The host PC 200 displays the images of the image data transferred from the studio digital camera 100 on the monitor 400 connected to it.

The R. G and B digital data processors 7-R, 7-G and 7-B and the frame memories 8-R, 8-G and 8-B in FIG. 40 are all controlled by a controller 11. The controller 11 includes a system controller 11-1, a timing pulse generator 11-2 and a memory controller 11-3. The system controller 11-1 supplies various signals shown as S/F, RMWE, GMWE, RMTE, GMTE and BMTE, to be described later, to the memory controller 11-3.

Figure 41:
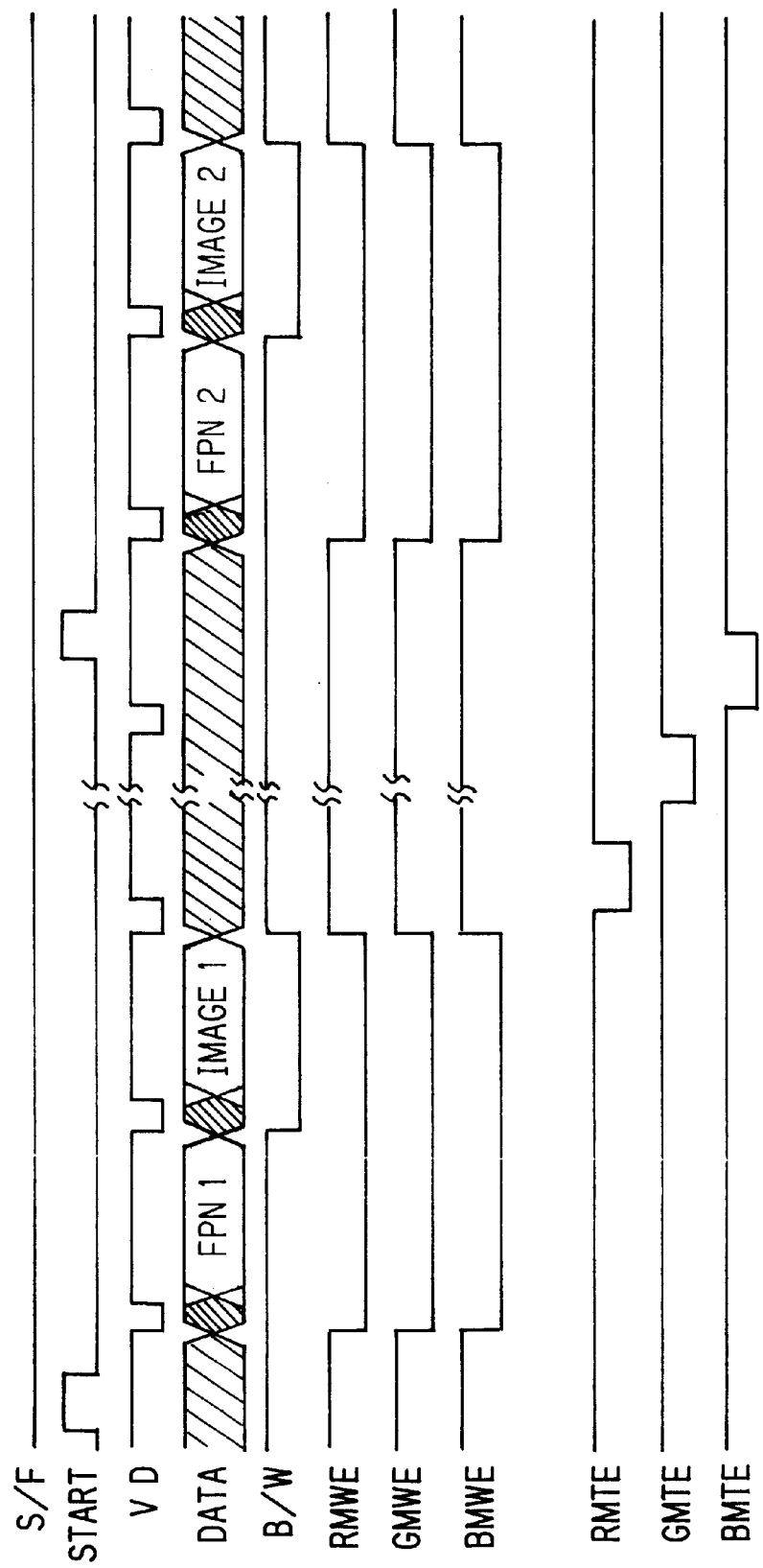
FIG. 41 is a timing chart illustrating the operation of the circuit shown in FIG. 40 in the still photography mode.

FIG. 41 is a timing chart illustrating the operation of the circuit shown in FIG. 40 in the still photography mode. In the figure, symbols label the following signals.

S/F: signal for switching the still photography mode and the view-finder mode ("high": still photography mode, "low": view-finder mode)

START: system operation start signal ("high": active)

VD: vertical sync signal

DATA: digital image data

B/W: signal for discriminating FPN data and view-finder image data ("high": FPN data, "low": view-finder image data)

RMWE: R data frame memory (8-R) write permit signal ("low": active)

GMWE: G data frame memory (8-G) write permit signal ("low": active)

BMWE: B data frame memory (8-B) write permit signal ("low" active)

RMTE: R data frame memory (8-R) transfer permit signal ("low": active)

GMTE: G data frame memory (8-G) transfer permit signal ("low": active)

BMTE: B data frame memory (8-B) transfer permit signal ("low": active)

As shown in FIG. 41, after generation of a pulse START before a still image pick-up, FPN data is outputted as DATA from the preceding stage camera section (with reference to FIG. 1) and written in the frame memories 8-R, 8-G and 8-B. Subsequently, the exposed state image data are outputted from the camera section and stored in the frame memories 8-R, 8-G and 8-B. After these data have been written, the R, G and B data are processed in the LUT 9 on a time division basis and then outputted from the LUT 9 under control of signals from the controller 11.

Figure 42:
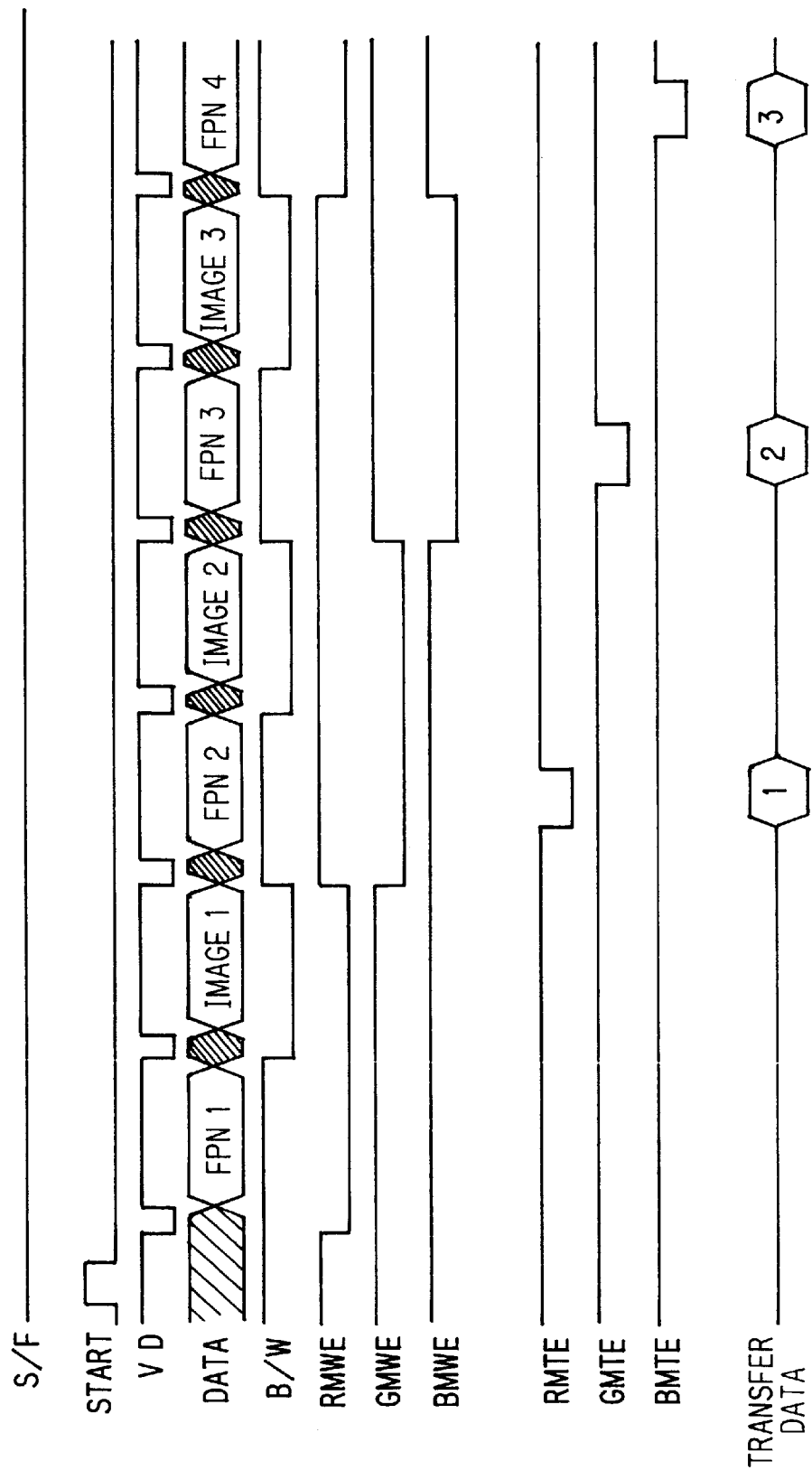
FIG. 42 is a timing chart illustrating the operation of the circuit shown in FIG. 40 in the view-finder mode.

FIG. 42 is a timing chart illustrating the operation of the circuit shown in FIG. 40 in the view-finder mode. In the figure, symbols like those in FIG. 41 label like signals.

As shown in FIG. 42, in the circuit shown in FIG. 40 in which the memories for taking out exposed state image data are also used for storing FPN data, it is necessary to take out the FPN data before taking out the exposed state image data each time. Consequently, the view-finder rate (i.e., output image rate) is low, as is obvious from the illustrated TRANSFER DATA output rate.

Figure 43:
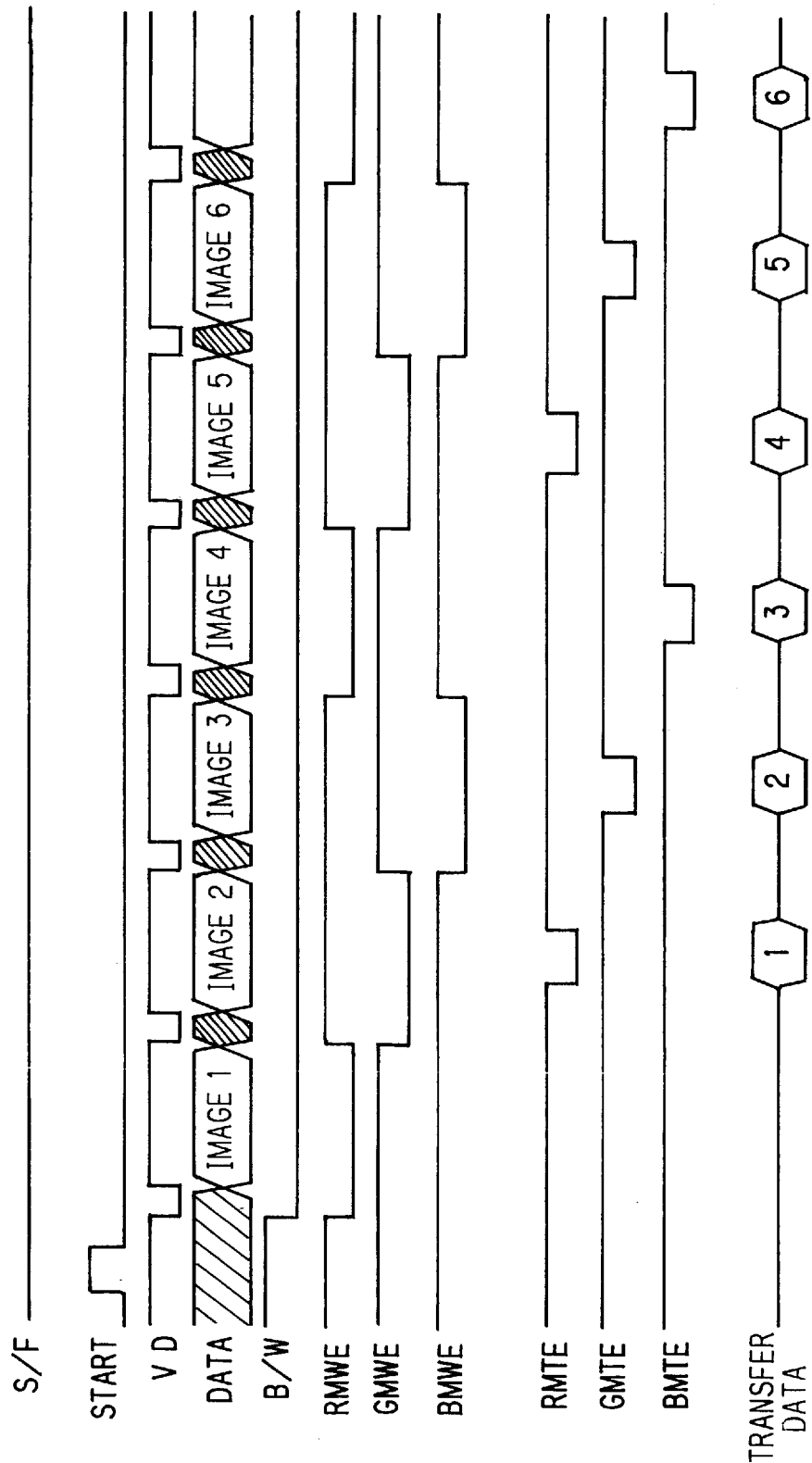
FIG. 43 is a timing chart illustrating a view-finder mode operation of the circuit shown in FIG. 40 at a view-finder mode, which is increased by dispensing with the FPN correction.

FIG. 43 is a timing chart illustrating a view-finder mode operation of the circuit shown in FIG. 40 at a view-finder mode, which is increased by dispensing with the FPN correction. In the figure, symbols like those in FIG. 41 label like signals.

Since this mode of operation is free from the FPN correction, it is not necessary to take out the FPN data before taking out the exposed state image data each time, and it is thus possible to increase the view-finder rate compared to the case of FIG. 42, as is obvious from the illustrated TRANSFER DATA output rate. On the demerit side, the image quality is inferior because image display is made without cancelling FPN.

Figure 44:
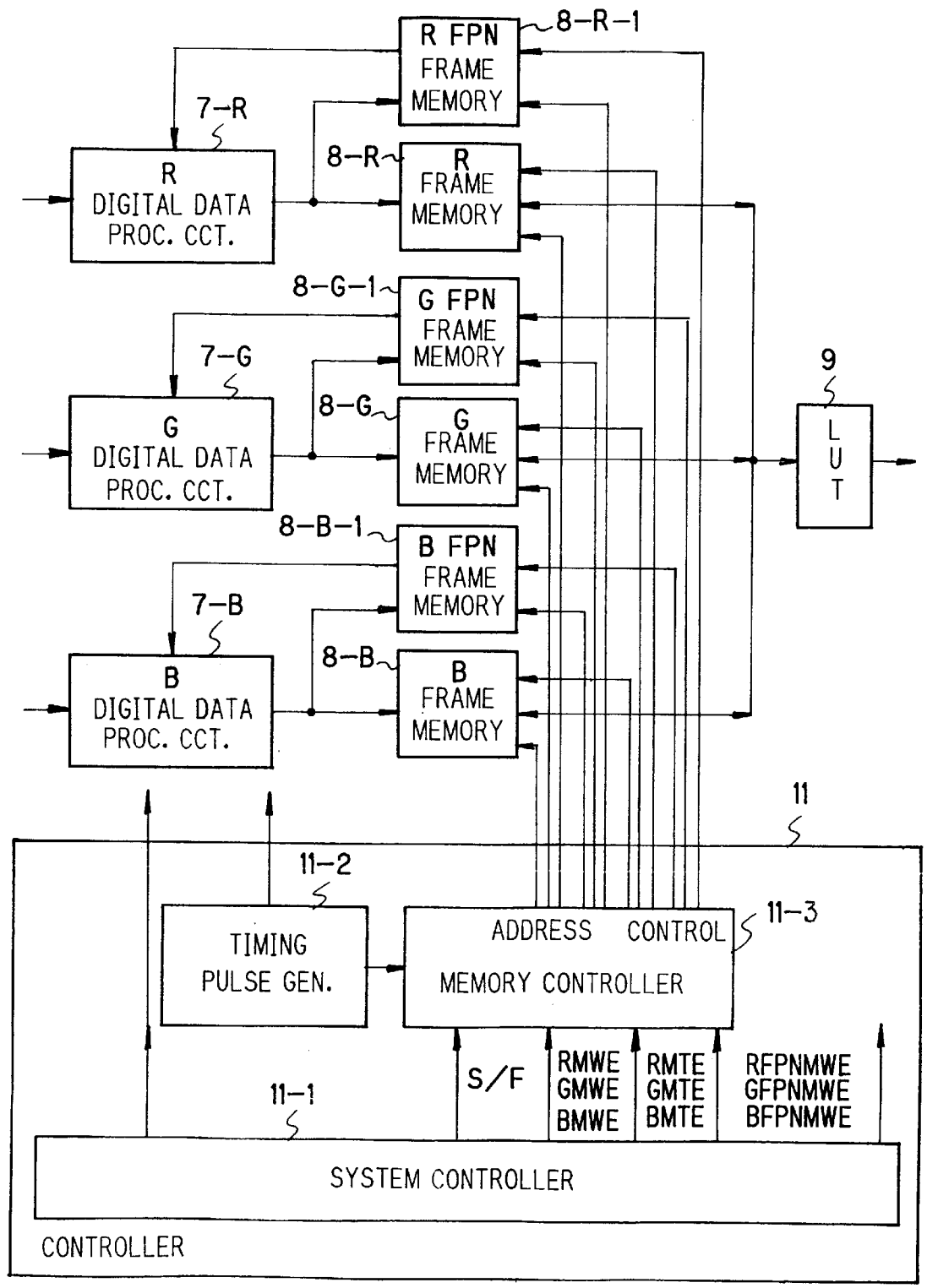
FIG. 44 is a block diagram showing the essential part of an electronic imaging apparatus according to the invention, in which memories or memory areas for storing the FPN data are provided separately from the memories or memory areas for taking out the exposed state image data.

FIG. 44 is a block diagram showing the essential part of an electronic imaging apparatus according to the invention, in which memories or memory areas for storing the FPN data are provided separately from the memories or memory areas for taking out the exposed state image data.

Again in this circuit part shown in FIG. 44, the preceding part of the system up to the process of obtaining digital image data, may have a construction like the studio digital camera as shown in FIG. 1. More specifically, the process until digital data of the individual colors are supplied to the R. G and B digital data processors 7-R, 7-G and 7-B, may be implemented by a system like that shown in FIG. 1 but not shown in FIG. 44. Referring to FIG. 1, in an example of the process a foreground scene light image from the optical system 1 is passed through the opening in the shutter 2 and incident on the dichroic prism 3. The dichroic prism 3 disassembles the incident light into original colors, i.e., R (red), G (green) and B (green) colors. Color images are thus focused on photoelectric surfaces on block ends of the solid-state sensor elements 4-R, 4-G and 4-B to obtain the photoelectric conversion outputs of the individual colors from the sensor elements. The photoelectric conversion outputs are supplied to the R, G and B analog data processors 5-R, 5-G and 5-R for such processes as OB level clamping which defines a black level, and then supplied to the A/D converters 6-R, 6-G and 6-B provided in the respective processing circuits for conversion into digital data.

These color digital data are supplied through the data switch 12 to the R, G and B digital data processors 7-R, 7-G and 7-B as shown in FIG. 44 as well. In the R. G and B digital data processors 7-R, 7-G and 7-B, these digital data are subjected to such processes as noise cancellation, shading correction, etc., and the resultant processed data are stored in the frame memories 8-R, 8-G and 8-B.

In the system shown in FIG. 44, R, G and B the FPN data frame memories 8-R-1, 8-G-1 and 8-B-1 are provided as exclusive FPN data memories in parallel with the respective frame memories 8-R, 8-G and 8-B. Data read out from the R, G and B FPN frame memories 8-R-1, 8-G-1 and 8-B-1 are supplied to the above R, G and B digital data processors 7-R, 7-G and 7-B in the respective channels.

The data stored in the frame memories 8-R, 8-G and 8-B are supplied through the LUT 9 to the SCSI driver 10. The LUT 9 varies the input image tones through the gradation conversion according to preliminarily set tables. The image data supplied to the SCSI driver 10 is transferred to the host CP 200 through the SCSI bus 300, which connects the instant studio digital camera 100 and the host PC 200 to each other. According to the image data thus transferred to the studio digital camera 100, the host PC 200 displays the images on the monitor 400 connected thereto.

The digital data processors 7-R, 7-G and 7-B, the frame memories 8-R, 8-G and 8-B and the R, G and B frame memories 8-R-1, 8-G-1 and 8-B-1 shown in FIG. 44 are all controlled by the controller 11. The controller 11 includes a system controller 11-1, a timing pulse generator 11-2 and a memory controller 11-3. The system controller 11-1 supplies signals S/F, RMWE, GMWE, BMWE, RMTE, GMTE, BMTE, RFPNMWE, GFPNMWE and BFPNMWE which are partly like those shown in FIG. 40 to the memory controller 11-3.

Figure 45:
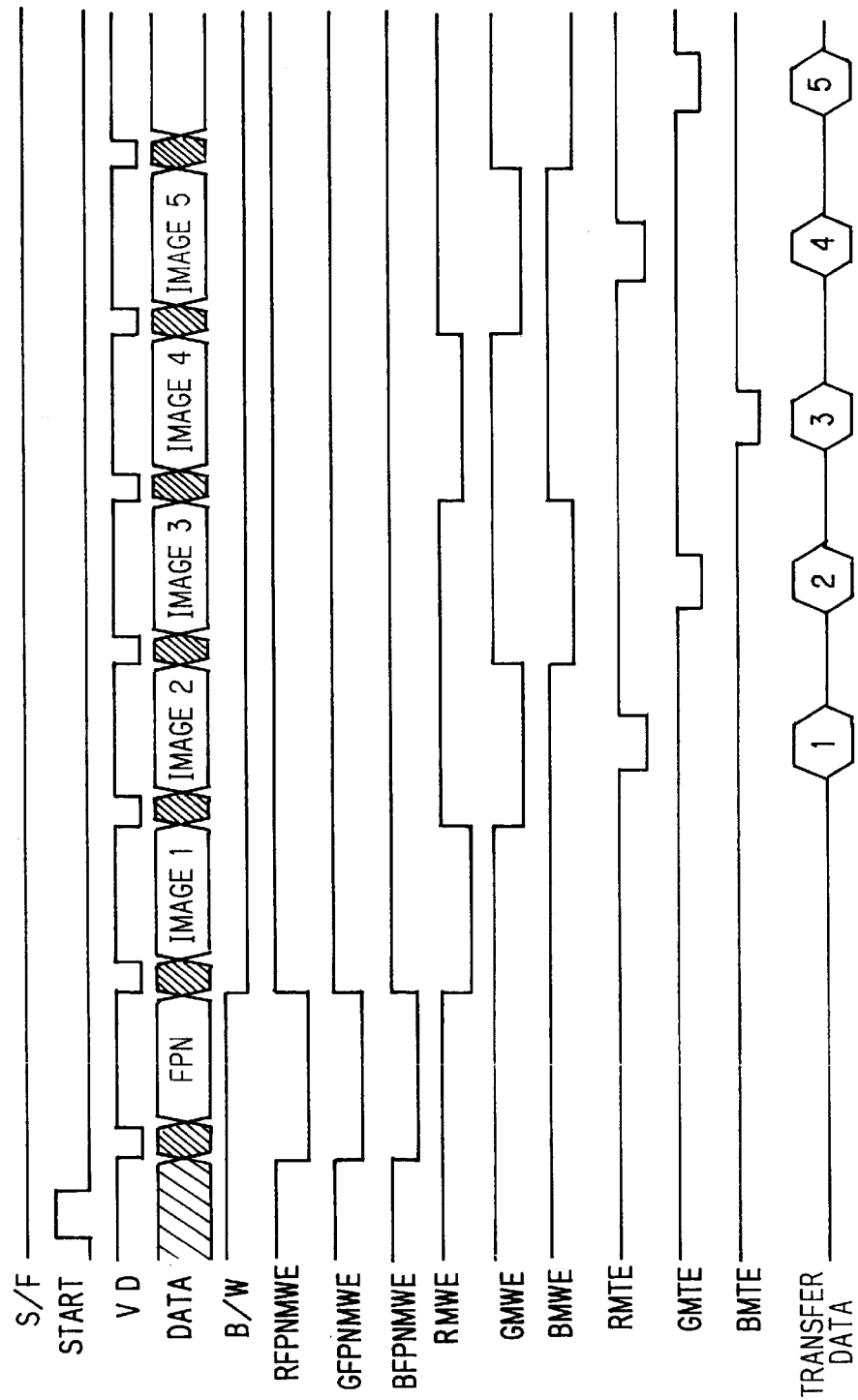
FIG. 45 is a timing chart illustrating the view-finder mode operation in the circuit shown in FIG. 44.

FIG. 45 is a timing chart illustrating the view-finder mode operation in the circuit shown in FIG. 44.

S/F: signal for mode switching of still photography mode and view-finder mode ("high": still photography mode, "low": view-finder mode)

START: system operation start signal ("high": active)

VD: vertical sync signal

DATA: digital image data

B/W: signal for discriminating FPN data and view-finder image data ("high" FPN data, "low": view-finder image data)

RMWE: R data system frame memory (8-R) write permit signal ("low": active)

GMWE: G frame memory (8-G) write permit signal ("low": active)

BMWE: B data frame memory (8-B) write permit signal ("low", active)

RMTE: R data frame memory (8-R) transfer perm signal ("low": active)

GMTE: G data frame memory (8-G) transfer permit signal ("low": active)

BMTE: B data frame memory (8-B) transfer permit signal ("low" active)

RPFNMWE: R FPN data frame memory write permit signal ("low" active)

GFPNMWE: G FPN data frame memory write permit signal ("low": active)

BFPNMWE: B FPN data frame memory write permit signal ("low": active)

As shown in FIG. 45, the FPN data is read out from the FPN frame memories 8-R-1, 8-G-1 and 8-B-1, and the exposed state image data are read out from the frame memories 8-R, 8-G and 8-B.

After the generation of pulse STRT, the FPN data is first outputted from the preceding stage camera section (as shown in FIG. 1) and simultaneously written in the FPN frame memories 8-R-1, 8-G-1 and 8-B-1 under control of the signals RFPNMWE, GFPNMWE and BFPNMWE from the system controller 11-1. Subsequently, the exposed state image data outputted from the preceding stage camera section are stored in the frame memories 8-R, 8-G and 8-B under control of the signals RMWE, GMWE and BMWE from the system controller 11-1.

As shown, as the exposed state image data from the camera section are stored in the frame memories 8-R, 8-G and 8-B, they are subjected to the FPN cancellation in the digital data processors 7-R, 7-G and 7-B using the FPN data having been written in the FPN frame memories 8-R-1, 8-G-1 and 8-B-1. The image data stored in the frame memories 8-R, 8-G and 8-B thus have been FPN corrected. These FPN corrected image data are transferred from the frame memories 8-R, 8-G and 8-B under control of the signals RMTE, GMTE and BATE from the frame controller 11-1. It is thus possible to obtain the FPN corrected high quality images at a high rate.

Figure 46:
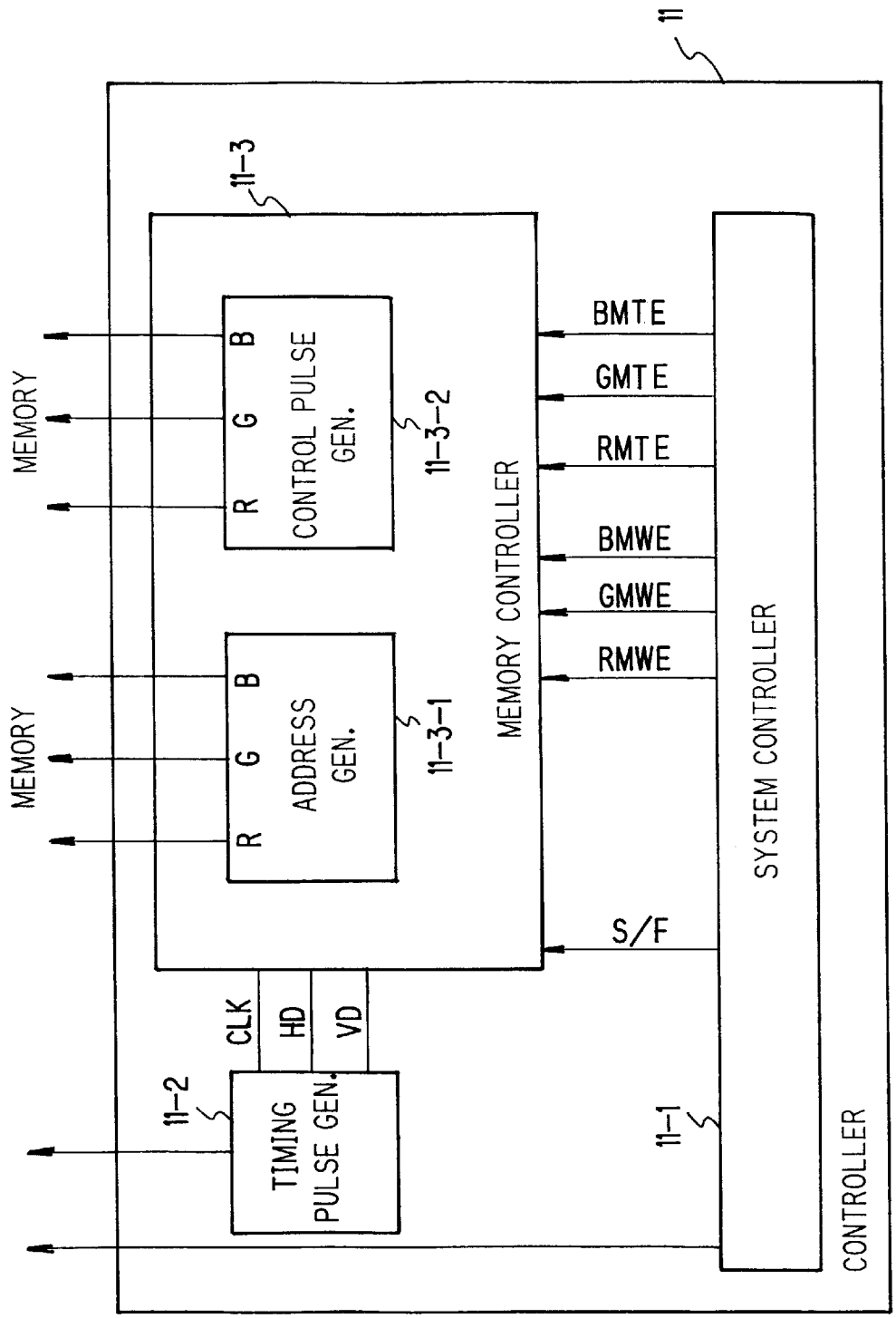
FIG. 46 is a block diagram showing in detail the general construction of the controller 11 in the system described before in connection with FIG. 40.

FIG. 46 is a block diagram showing in detail the general construction of the controller 11 in the system described before in connection with FIG. 40. As described before, in the general system as shown in FIG. 40 the memories for taking out the exposed state image data are also used for storing FPN data. In the general construction as shown in FIG. 46, memory areas for storing the PEN data overlap areas for taking out the exposed state image data.

Referring to FIG. 46, the controller 11 includes a system controller 11-1, a timing pulse generator 11-2, and a memory controller 11-3. The memory controller 11-3 includes an address controller 11-3-2 and a control pulse generator 11-3-9. The system controller 11-1 supplies signals S/F, RMWE, GMWE, BMWE, RMTE, GMTE and BMTE as described before in connection with FIGS. 40 and 41 to the memory controller 11-3.

When the FPN is cancelled by the controller 11 shown in FIG. 46, an FPN data write areas and an image data write area are overlapped as will be described with reference to figures showing a memory area distribution in the pertinent memory.

FIG. 47 is a view showing the distribution of an area of one of the frame memories 8-R, 8-G and 8-B for writing or reading the image data or FPN data under control by the controller 11 shown in FIG. 46, the area distribution being shown in relation to the viewing field of the view-finder in a partial reading view-finder mode.

Figure 47A:
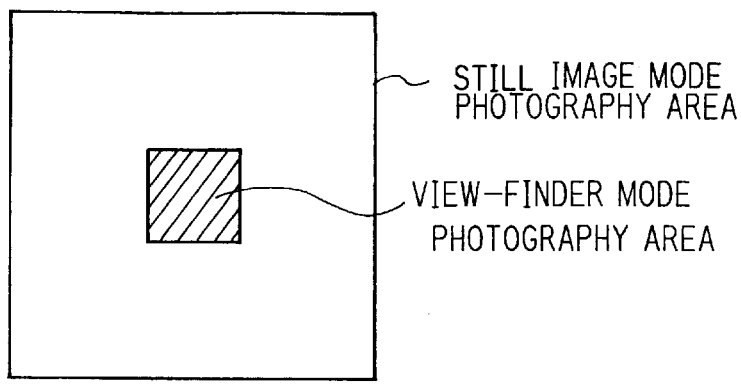
FIGS. 47(A)–47(C) are a view showing the distribution of an area of one of the frame memories 8-R, 8-G and 8-B for writing or reading the image data or FPN data under control by the controller 11 shown in FIG. 46, the area distribution being shown in relation to the viewing field of the view-finder in a partial reading view-finder mode.
Figure 47B:
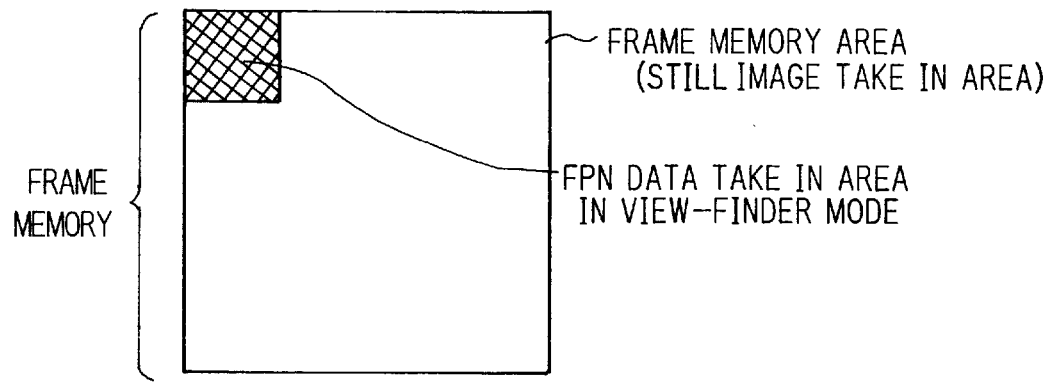
Figure 47C:
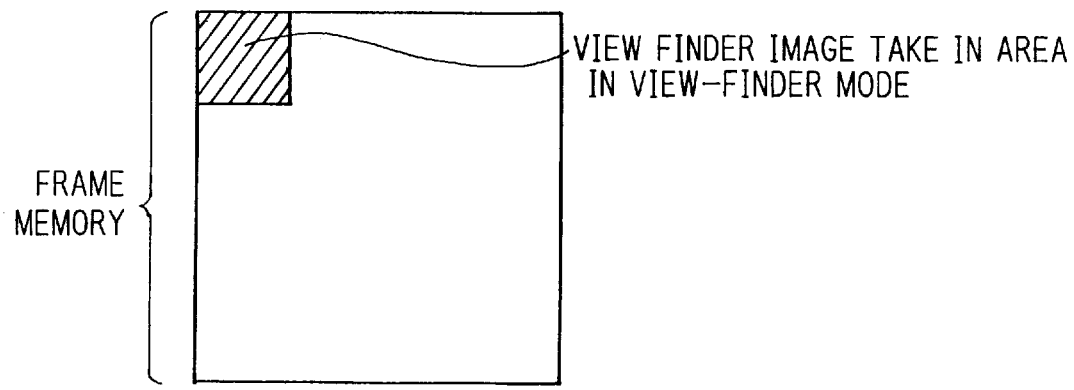

As shown in FIG. 47(A), the area which is the subject of photography in the still photography mode, is a frame area labeled STILL PHOTOGRAPHY MODE AREA. A viewing field in the partial reading view-finder mode, as shown shaded and labeled VIEW-FINDER MODE AREA, is set within the frame area. In the case of FIG. 47(A), the FPN data frame memory area corresponding to the view-finder mode viewing field area, is as shown shaded at the left upper position in FIG. 47(B). When a view-finder image is taken out from the view-finder viewing field area, the FPN data is read out from the above FPN data take-out area and used in the digital data processor as described before in connection with FIG. 40 for the FPN cancellation. As shown in FIG. 47(C), the FPN corrected image data thus obtained is written as view-finder image data in the same area as one, from which the FPN data is to be taken out again. Consequently, the previously taken-out FPN data is erased when the frame memory is re-written to the state shown in FIG. 47(C).

FIG. 48 is a view showing the distribution of the write or read area in each frame memory in the case, in which an area for writing or reading image data and an area for writing or reading FPN data are set separately in the same frame memory, the area distribution being shown in relation to the view-finder viewing field in the partial reading view-finder mode.

Figure 48A:
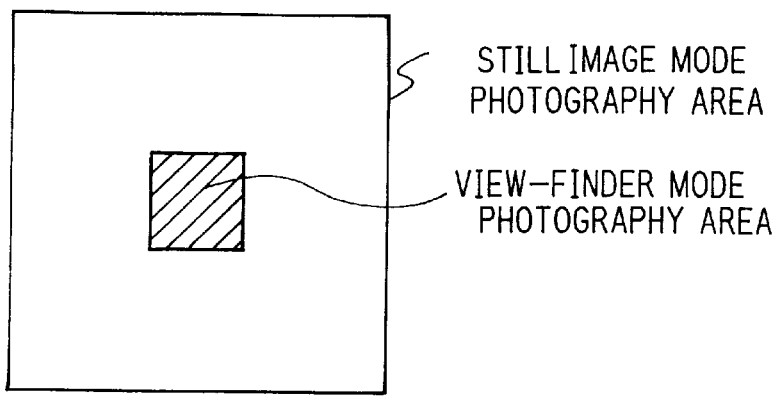
FIGS. 48(A)–48(C) are a view showing the distribution of the write or read area in each frame memory in the case, in which an area for writing or reading image data and an area for writing or reading FPN data are set separately in the same frame memory, the area distribution being shown in relation to the view-finder viewing field in the partial reading view-finder mode.

As shown in FIG. 48(A), the area as the subject of photography in the still photography mode, is a frame area labeled STILL PHOTOGRAPHY MODE AREA. A viewing field in the partial reading view-finder mode, as shown shaded and labeled VIEW-FINDER MODE AREA, is set within the frame area.

Figure 48B:
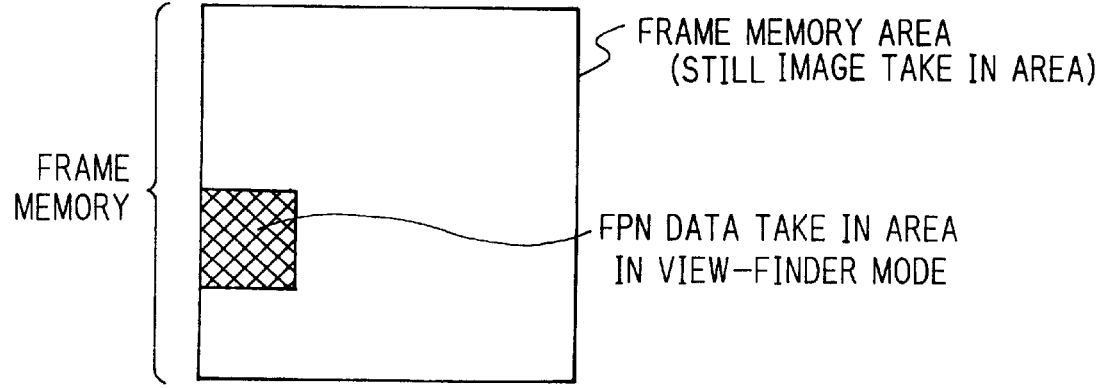

As shown in FIG. 48(B), in this case, the FPN data frame memory area corresponding to the view-finder mode viewing field area in the case of (A), is located at a left position lower than the position in the case of FIGS. 47.

When taking out the view-finder image data from the view-finder viewing field area, the FPN data is read out from the FPN data take-out area as shown in.

Figure 48C:
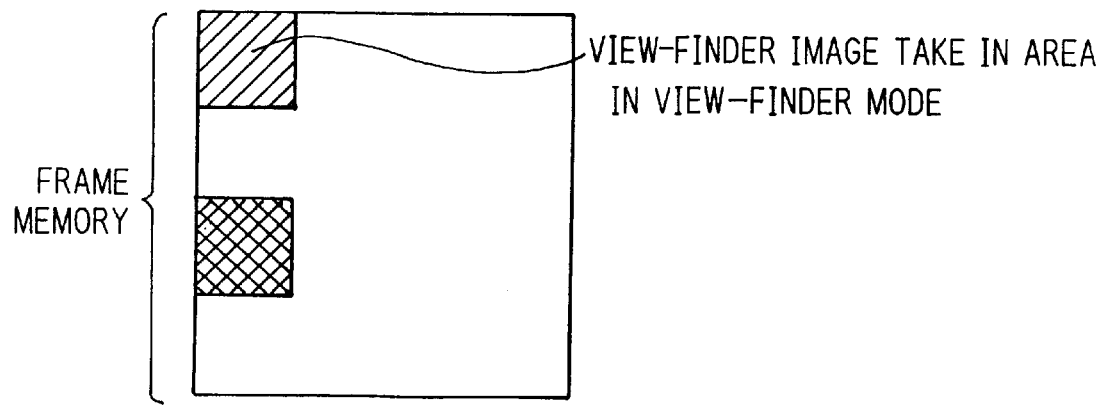

FIG. 48(B) for FPN cancellation in the pertinent digital data processor. As shown in FIG. 48(C), the resultant FPN corrected image data is written in an FPN corrected image data take-out area, which is not overlapped over the FPN data take-out area. Thus, the FPN data taken out at the outset is not erased with the re-writing of the frame memory to the state shown in FIG. 48(C).

Figure 49:
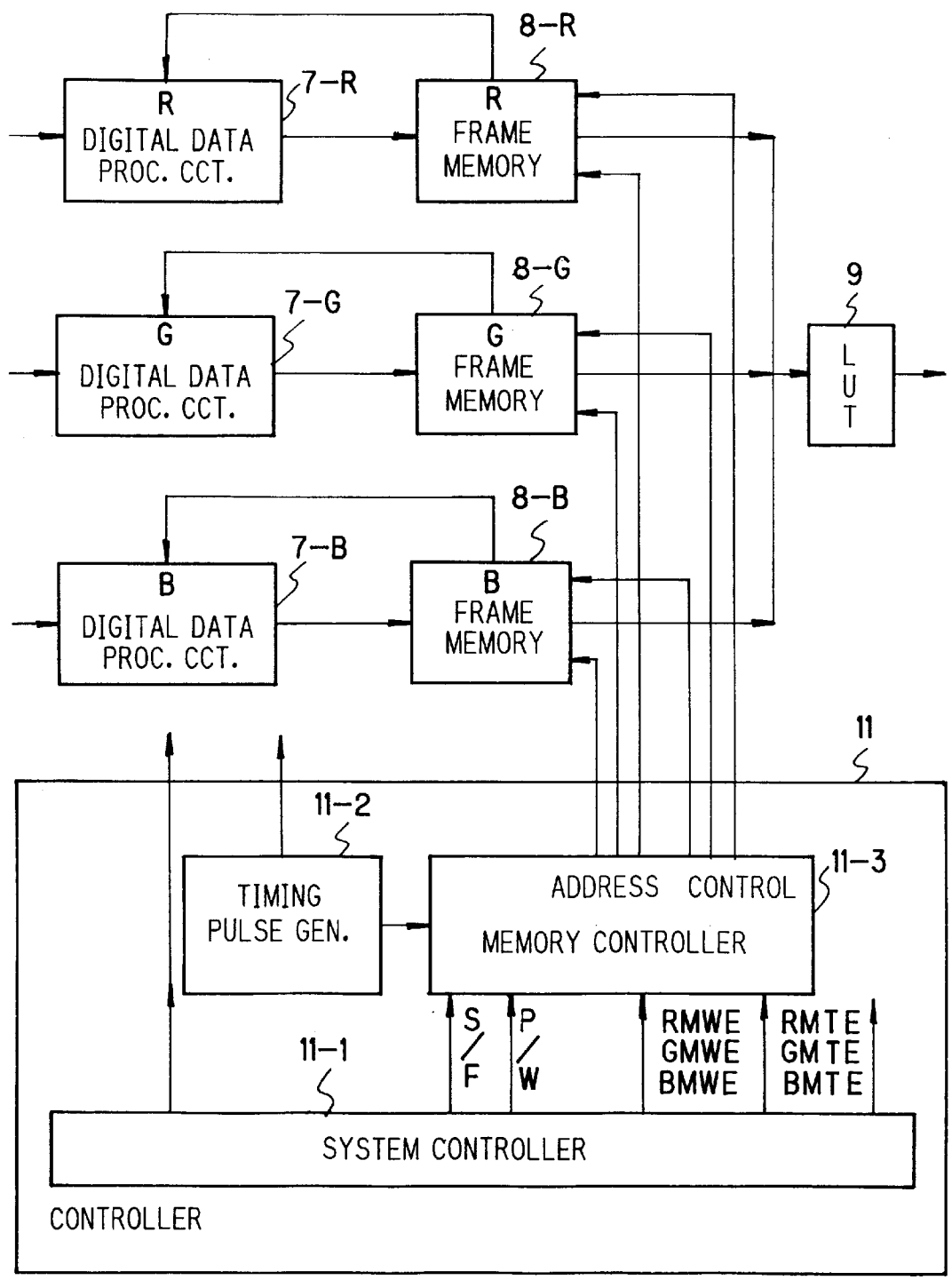
FIG. 49 is a block diagram showing a system using the frame memories as described before in connection with FIG. 48.

FIG. 49 is a block diagram showing a system using the frame memories as described before in connection with FIG. 48.

Referring to the figure, digital image data of the individual colors appearing from the camera section, are supplied to the R, G and B digital data processors 7-R, 7-G and 7-B. In the R, G and B digital data processors 7-R, 7-G and 7-B, the color digital data are subjected to such processes as noise cancellation, shading correction, etc. The processed image data are stored in the frame memories 8-R, 8-G and 8-B provided for the respective process channels. For the FPN cancellation, the FPN data having been written in part of the areas of the frame memories 8-R, 8-G and 8-B is read out and supplied to the R, G and B digital data processors 7-R, 7-G and 7-B.

The image data stored in the frame memories 8-R, 8-G and 8-B are supplied through the LUT 9 to the SCSI driver 10. The LUT 9 varies the input image tones through gradation conversion according to preliminarily set tables. The process subsequent to the LUT 9 is the same as described before in connection with FIG. 1. The image data supplied to the SCSI driver 10 is supplied to the host PC 200 through the SCSI bus 300, which connects the studio digital camera 100 and the host PC 300 to each other. The host PC 200 displays images of the image data transferred form the studio digital camera 100 on the monitor 400 connected to it.

The R, G and B digital data processors 7-R, 7-G and 7-B and the frame memories 8-R, 8-G and 8-B shown in FIG. 49 are all controlled by the controller 11. The controller 11 includes the system controller 11-1, the timing pulse generator 11-2, and the memory controller 11-3. The system controller 11-1 supplies, in addition to the signals S/F, RMWE, GMWE, BMWE, RMTE, GMTE and BMTE described before in connection with FIG. 40, a discrimination signal B/W for discriminating FPN data and view-finder mode image data to the memory controller 11-3.

Figure 50:
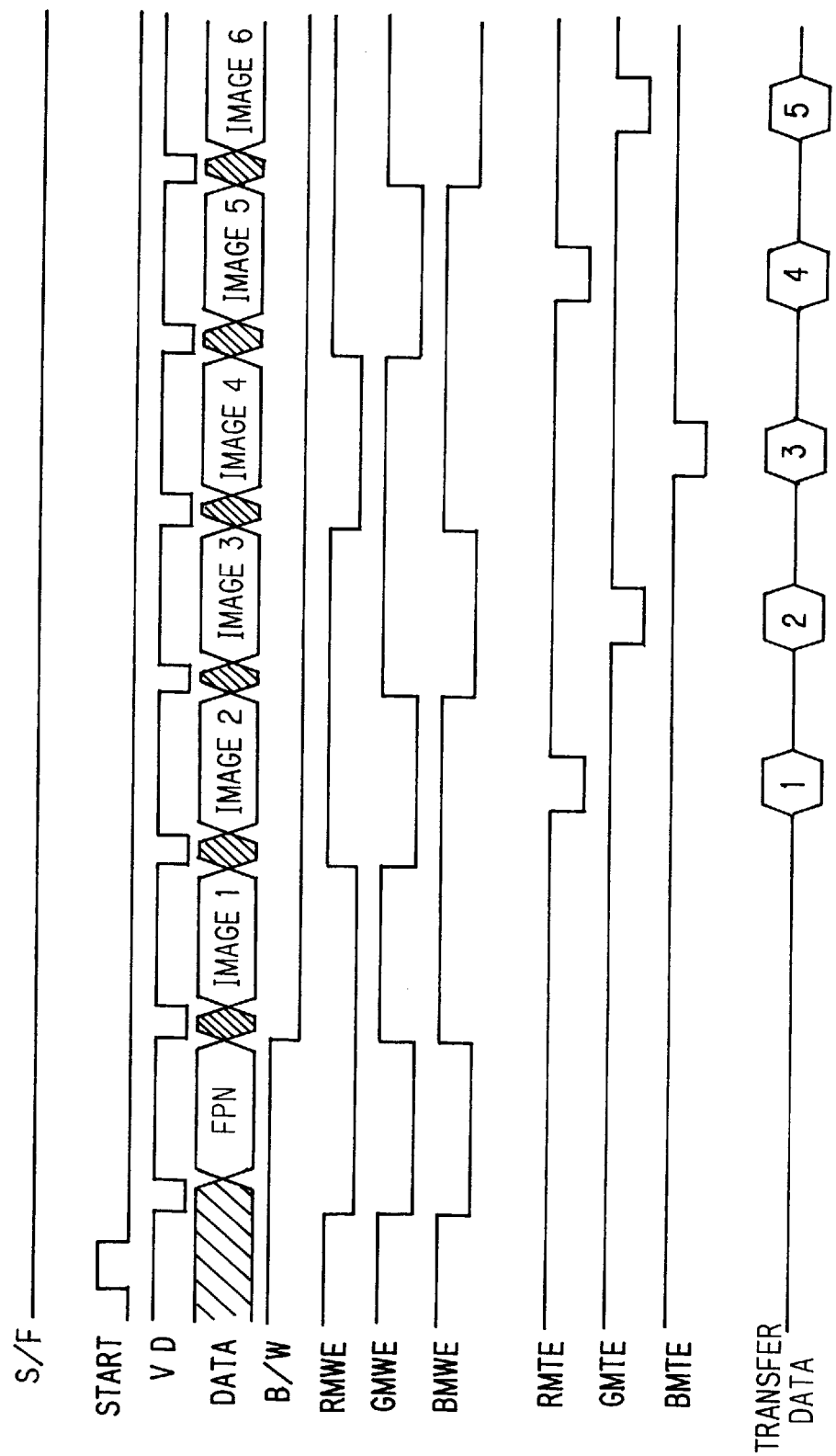
FIG. 50 is a timing chart illustrating the view-finder mode operation in the circuit shown in FIG. 49.

FIG. 50 is a timing chart illustrating the view-finder mode operation in the circuit shown in FIG. 49. In the Figure, like reference symbols label like signals.

As shown in the figure, the FPN data is first read out into the frame memories 8-R, 8-G and □-B with the discrimination signal B/W set to "high" (i.e., B side representing FPN data).

More specifically, after generation of the pulse START the FPN data DATA is first outputted from the preceding stage camera section (with reference to FIG. 1) and written at a time in FPN data storage address areas of the frame memories 8-R, 8-G and 8-B under control of the discrimination signal B/W and the signals RMWE, GMWE and BMWE from the system controller 11-1. Subsequently, the discrimination signal B/W is switched to be "low" (i.e., W side representing image data), and the exposed state image data outputted from the camera section, are stored in the illustrated succession in exposed state image data storage address areas, which are provided in the frame memories 8-R, 8-G and 8-B separately from the FPN data storage address areas.

In the above process of successively storing the exposed state image data in the frame memories 8-R, 8-G and 8-B, the FPN data which has been written in the FPN data storage address areas of the frame memories 8-R, 8-G and 8-B is read out and supplied to the digital data processors 7-R, 7-G and 7-B and used for the FPN cancellation process on the exposed state image data from the camera section. The image data stored in the frame memories 8-R, 8-G and 8-B are thus FPN corrected image data. The FPN corrected image data are transferred from the frame memories 8-R, 8-G and 8-B under control of the signals RMTE, GMTE and BMTE. It is thus possible to obtain FPN corrected high quality images at a high rate.

Figure 51:
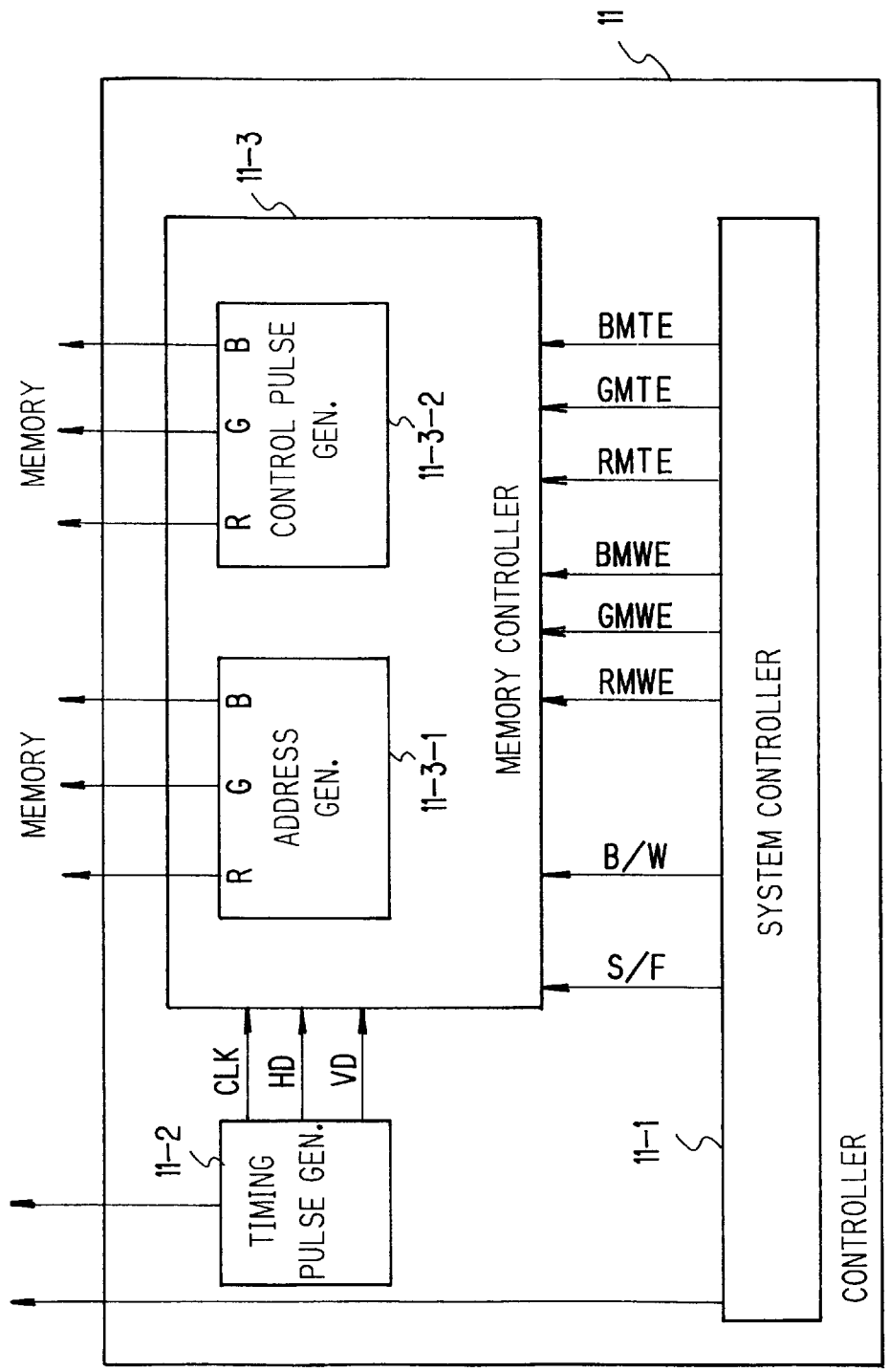
FIG. 51 is a block diagram showing the detailed construction of the controller 11 in the system described before in connection with FIG. 50.

FIG. 51 is a block diagram showing the detailed construction of the controller 11 in the system described before in connection with FIG. 50. As described before, in the system shown in FIG. 49 the memories for taking out the exposed state image data are also used for storing the FPN data such that the FPN and the exposed image data are taken out in separate areas.

Referring to FIG. 51, the controller 11 includes the system controller 11-1, the timing pulse generator 11-2 and the memory controller 11-3. The memory controller 11-3 has an address generator 11-3-1 and a control pulse generator 11-3-2. The system controller 11-1 supplies the signals S/F, B/W, RMWE, GMWE, BMWE, RMTE, GMTE and BMTE as described before in connection with FIG. 40 to the memory controller 1133.

In the FPN cancellation process executed by the controller 11 as shown in FIG. 51, as described before separate memory areas on the same memory are assigned as the FPN data write area and the image data write area.

FIG. 52 is a view of the distribution of areas for writing or reading the image data and FPN data in one of the frame memories 8-R, 8-G and 8-B in a system, in which the FPN data need not be updated whenever the view-finder viewing field is changed, the area distribution being shown in relation to the view-finder viewing field in the partial read view-finder mode.

Figure 52A:
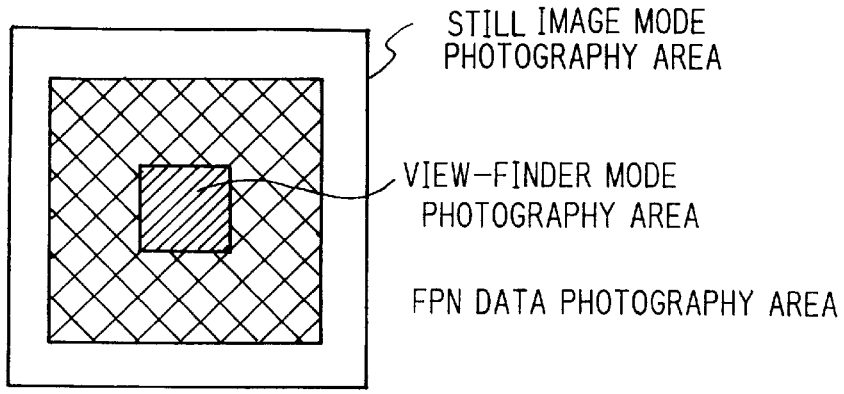
FIGS. 52(A)–52(C) are a view of the distribution of areas for writing or reading the image data and FPN data in one of the frame memories 8-R, 8-G and 8-B in a system, in which the FPN data need not be updated whenever the view-finder viewing field is changed, the area distribution being shown in relation to the view-finder viewing field in the partial read view-finder mode.

As shown in FIG. 52(A), the area as the subject of photography in the still photography mode, is a frame area labeled STILL PHOTOGRAPHY MODE AREA. A viewing field in the partial read view-finder mode, which is a substantially central shaded area labeled, VIEW-FINDER MODE AREA in the frame area is set. On the other hand, the frame memory area for taking-out the FPN data, shown cross-hatched area, is set as VIEW-FINDER MODE FPN DATA AREA which is broader than and contains VIEW-FINDER MODE AREA.

Figure 52B:
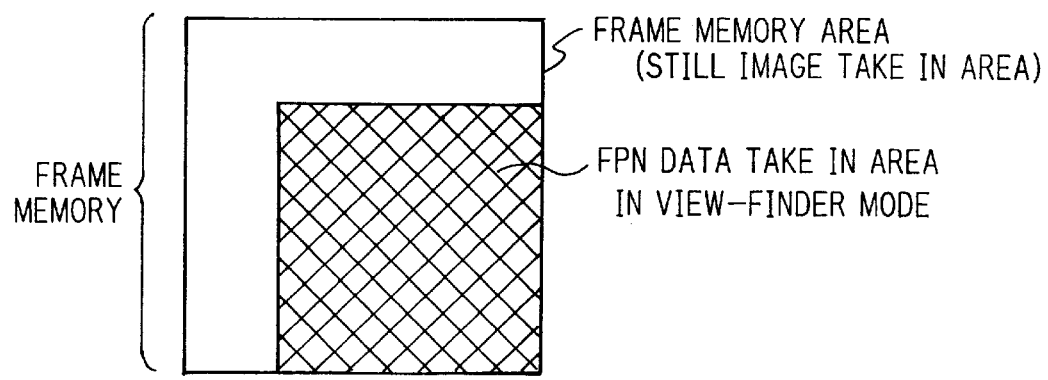
Figure 52C:
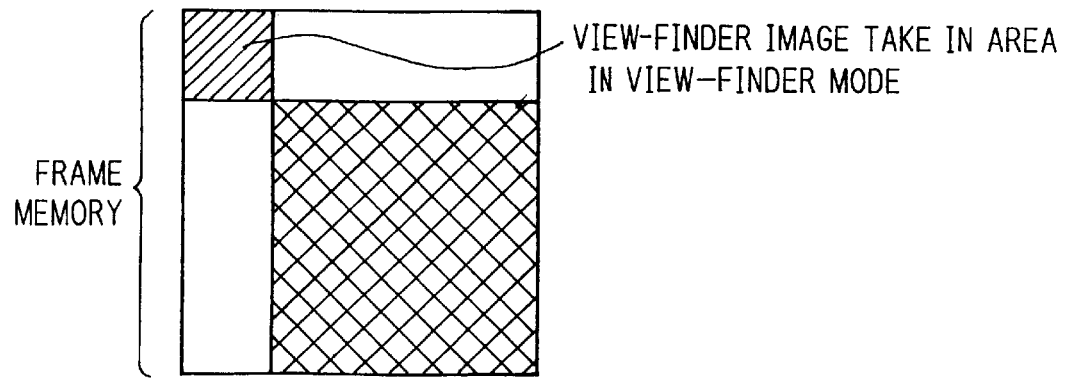

In the case of FIG. 52(A), the area for taking out the FPN data from VIEW-FINDER MODE FPN DATA AREA, i.e., the relatively broad cross-hatched area, is corresponded by a right lower cross-hatched area labeled VIEW-FINDER MODE FPN DATA TAKE-OUT AREA in FIG. 52(B). When taking out the view-finder image data from the view-finder viewing field area, the FPN data is read out from a partial area corresponding to the view-finder viewing field in VIEW-FINDER MODE FPN DATA TAKE-OUT AREA at this moment, and used for the FPN cancellation in the digital data processors described above in connection with FIG. 52(C). As shown in FIG. 52(C), the FPN corrected image data thus obtained is written as view-finder image data in an area separate from VIEW-FINDER MODE FPN DATA TAKE-OUT AREA.

As shown, the data held in VIEW-FINDER MODE FPN DATA TAKE-OUT AREA from the outset, is continually held as FPN data in the area, which is broader than and includes VIEW-FINDER MODE AREA, irrespective of the re-writing of the frame memory to the state as shown in FIG. 52(C). Thus, it is unnecessary to update the FPN data irrespective of a change in the view-finder viewing field in VIEW-FINDER MODE FPN DATA AREA which is such a broad area.

It is thus possible to eliminate the problem that a change in the view-finder viewing field position in VIEW-FINDER MODE FPN DATA TAKE-OUT AREA results in a great delay until the output of the FPN corrected image data.

Figure 53:
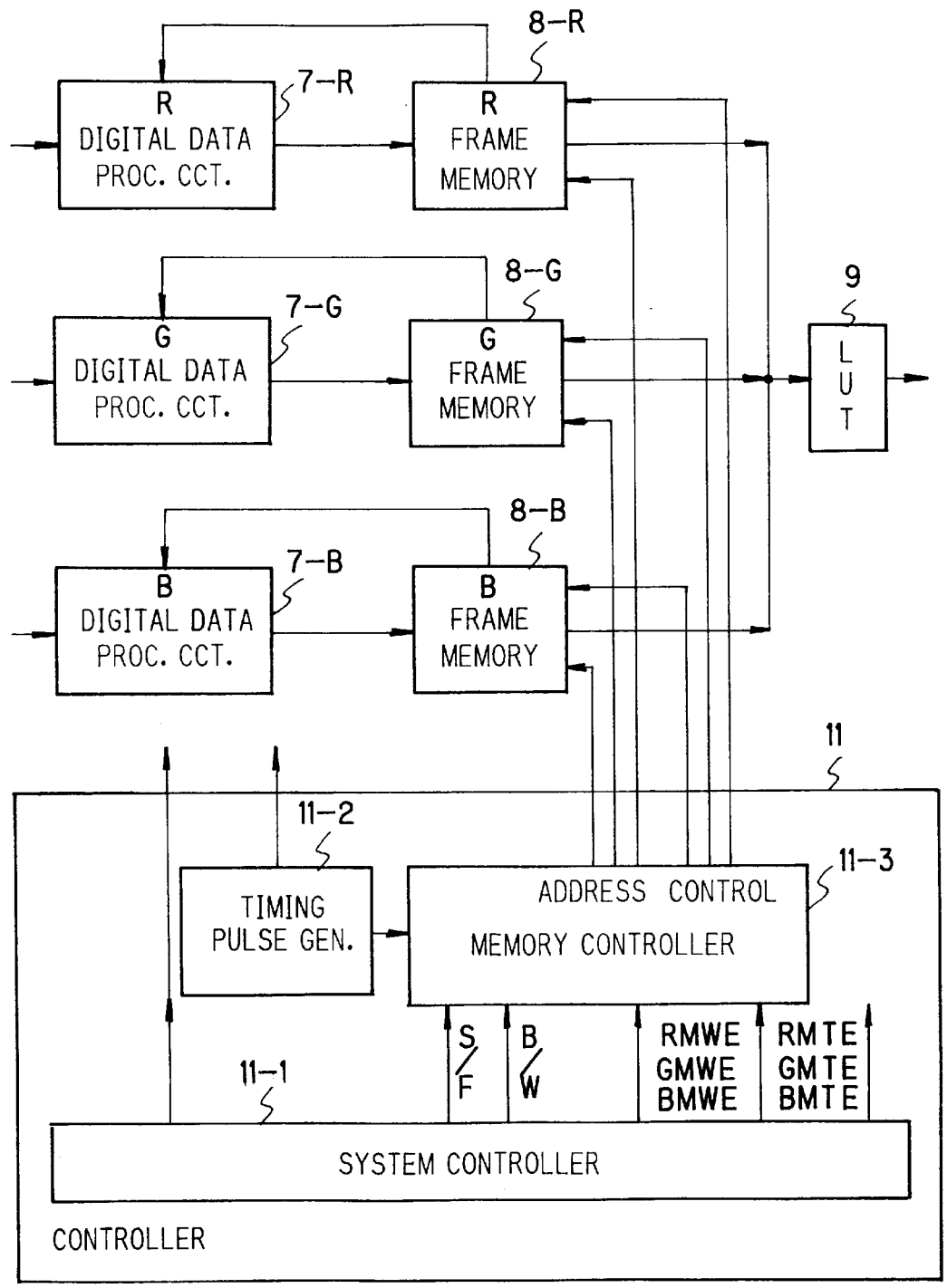
FIG. 53 is a block diagram showing a system, which uses the frame memories as described before in connection with FIG. 52.

FIG. 53 is a block diagram showing a system, which uses the frame memories as described before in connection with FIG. 52. The system shown in FIG. 53 is the same in construction as the system shown in FIG. 49.

Referring to FIG. 53, color digital data appearing from the camera section are supplied to the R, G and B digital data processors 7-R, 7-G and 7-B. In the R, G and B digital data processors 7-R, 7-G and 7-B, the color digital data are subjected to such processes as noise cancellation, shading correction, etc., and the processed image data are stored in the frame memories 8-R, 8-G and 8-B provided in the respective channels. The stored image data are supplied through the LUT 9 to the SCSI driver 10. The LUT 9 varies the input image tones through gradation variation according to the preliminarily set tables.

The process subsequent to the LUT 9 is the same as described before in connection with FIG. 1. The image data supplied to the SCAT driver 10 is transferred to the host PC 13 through the SCSI bus 300, which connects the studio digital camera 100 and the host PC 13. The host PC 13 displays the images of image data transferred from the studio digital camera 100 on the monitor 400 connected thereto.

The R, G and B digital data processors 7-R, 7-G and 7-B and the frame memories 8-R, 8-G and 8-B shown in FIG. 53 are all controlled by the controller 11. The controller 11 includes the system controller 11-1, the timing pulse generator 11-2 and the memory controller 11-3. The system controller 11-1 supplies the signals S/F, B/W, RMWE, GMWE, BMWE, RMTE, GMTE and BMTE as described before in connection with FIG. 49 to the memory controller 11-3.

Figure 54:
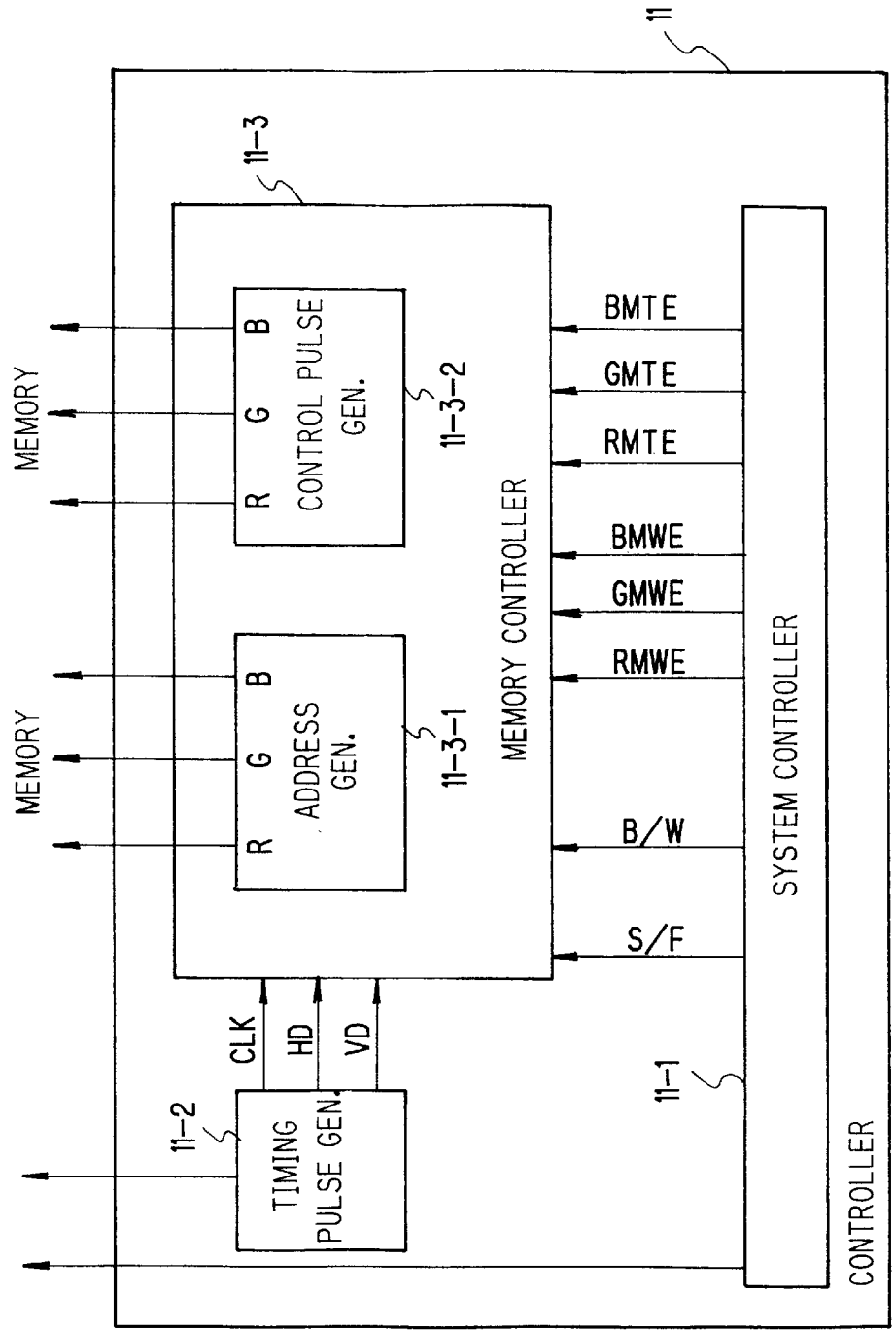
FIG. 54 is a block diagram showing the detailed construction of the controller 11 in the system described before in connection with FIG. 53.

FIG. 54 is a block diagram showing the detailed construction of the controller 11 in the system described before in connection with FIG. 53. The system shown in FIG. 54 is the same in construction as the system shown in FIG. 51. As described before, the system shown in FIG. 53 the memories for taking out the exposed state image data are also used for storing the FPN data. A broad area is set for the FPN data, and the FPN data and view-finder data are taken in separate areas.

In the system shown in FIG. 54, the controller 11 includes the system controller 11-1, the timing pulse generator 11-2 and the memory controller 11-3. The memory controller 11-3 has the address generator 11-3-1 and the control pulse generator 11-3-2. The system controller 11-1 supplies the signals S/F, B/W, RMWE, GMWE, BMWE, RMTE, GMTE and BMTE as described before in connection with FIG. 53 to the memory controller 11-3.

In summary, according to the invention it is possible to provide an electronic imaging apparatus, which is excellent in the convenience of handling and permits high fineness images to be taken out.

Description of Numerals 1 an optical system
2 a shutter
3 a dichroic prism
4-R, 4-G, 4-B solid sensor elements
5-R an R analog data processor
5-G a G analog data processor
5-B a B analog data processor
5-R an R analog data processor
6-R, 6-G, 6-B A/D converters
7-R an R digital data processor
7-G a G digital data processor
7-B a B digital data processor
8-R, 8-G, B-B frame memories
9, a look-up table
10, a SCSI driver
11, a system controller
12, a data switch
200, a host PC
300, a SCSI bus
400, a monitor

What is claimed is:

1. An electronic imaging apparatus comprising:

a solid-state sensor element for converting an image focused by an optical system and composed of an array of pixels into image data;

sensor element drive means selectively operable in a first drive mode for reading at least a large number of pixels of image data out of the solid-state sensor element, and in a second drive mode for reading a second number of selected pixels of image data out of the solid-state sensor element, the second number being smaller than the large number and the selected pixels being suited for foreground scene recognition monitor means employed in the electronic imaging apparatus; and an optical black level correction process changing means for changing a process of detecting an optical black level corresponding to an optical black part of the sensor element and correcting image data according to the detected level, the process being changed according to whether the first drive mode or the second mode is selected by the sensor element drive means, to effect a first correction in the first drive mode and a second correction in the second drive mode, the first correction being achieved on the basis of a presently detected optical black level, and the second correction being achieved by a feedback control based on a difference between a previously detected optical black level and a desired optical black level.

2. The electronic imaging apparatus according to claim 1, wherein the optical black level correction process changing means causes a level shift of an optical black correction value by an amount corresponding to the difference between an optical black level having been set for the second drive mode and an optical level, which is detected when the first drive mode is switched over to the second drive mode by the sensor element drive means.

* * * * *